US012561307B2

(12) United States Patent
Vemuri et al.

(10) Patent No.: US 12,561,307 B2
(45) Date of Patent: Feb. 24, 2026

(54) MEMORY EFFICIENT MULTI-VERSIONED CONCURRENCY FOR A HYPERCUBE MEMORY CACHE USING ANCHOR OBJECT POINTERS

(71) Applicant: Workday, Inc., Pleasanton, CA (US)

(72) Inventors: Srinivas Vemuri, Santa Clara, CA (US); Darren Lee, Sunnyvale, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/522,728

(22) Filed: Nov. 29, 2023

(65) Prior Publication Data

US 2025/0173322 A1 May 29, 2025

(51) Int. Cl.
  *G06F 16/23* (2019.01)
  *G06F 16/11* (2019.01)
  *G06F 16/22* (2019.01)
(52) U.S. Cl.
  CPC .......... *G06F 16/2329* (2019.01); *G06F 16/11* (2019.01); *G06F 16/2264* (2019.01); *G06F 16/2322* (2019.01); *G06F 2201/84* (2013.01)
(58) Field of Classification Search
  CPC ............. G06F 16/2329; G06F 16/2322; G06F 16/2264; G06F 16/11; G06F 2201/84; G06F 16/24556; G06F 18/253; G06F 18/24; G06F 18/217; G06F 18/211; G06F 16/907; G06F 16/254; G06F 16/278; G06F 18/10; G06F 18/22; G06F 16/27; G06F 16/283
  USPC ......................................................... 707/689
  See application file for complete search history.

(56) References Cited

U.S. PATENT DOCUMENTS

| | | | |
|---|---|---|---|
| 7,725,499 B1 | 5/2010 | von Lepel | |
| 9,400,816 B1 * | 7/2016 | Gubarev | G06F 16/2246 |
| 10,248,336 B1 * | 4/2019 | Koujalagi | G06F 3/0608 |
| 10,909,178 B2 | 2/2021 | Shore | |
| 11,170,025 B1 * | 11/2021 | Nguyen | G06F 16/254 |
| 11,281,696 B1 * | 3/2022 | Nguyen | G06F 9/3838 |
| 11,526,434 B1 * | 12/2022 | Brooker | G06F 9/5077 |
| 11,593,504 B1 | 2/2023 | Yates | |
| 2010/0223296 A1 * | 9/2010 | Angus | G06F 16/254 |
| | | | 707/810 |
| 2010/0306280 A1 | 12/2010 | Sapek | |
| 2014/0279824 A1 * | 9/2014 | Tamayo | G06F 16/2428 |
| | | | 707/600 |
| 2016/0147811 A1 * | 5/2016 | Eluri | G06F 16/2228 |
| | | | 707/694 |
| 2016/0259832 A1 * | 9/2016 | Shore | G06F 16/9024 |
| 2017/0011082 A1 * | 1/2017 | Velury | G06F 16/283 |
| 2017/0017683 A1 | 1/2017 | Fourny | |

(Continued)

FOREIGN PATENT DOCUMENTS

| | | |
|---|---|---|
| CN | 113779160 | 12/2021 |

*Primary Examiner* — Evan Aspinwall

(74) *Attorney, Agent, or Firm* — Van Pelt, Yi & James LLP

(57) ABSTRACT

A system, method, and device for managing updates to a hypercube is provided. The method includes (i) obtaining a hypercube comprising a plurality of locations, wherein a particular location has an associated anchor object that stores version information for the particular location, (ii) receiving a request to store an updated value for the particular location, and (iii) storing the updated value for the particular location of hypercube, the updated value being stored with associated version information stored in the anchor object for the particular location.

28 Claims, 23 Drawing Sheets

1200

(56)          References Cited

U.S. PATENT DOCUMENTS

| | | | | |
|---|---|---|---|---|
| 2018/0052898 A1* | 2/2018 | Allan | .................. | G06F 16/2358 |
| 2018/0322156 A1* | 11/2018 | Lee | ......................... | G06F 16/23 |
| 2019/0205244 A1 | 7/2019 | Smith | | |
| 2019/0311057 A1* | 10/2019 | Sung | ................. | G06F 16/24542 |
| 2020/0183929 A1* | 6/2020 | Lee | ....................... | G06F 16/116 |
| 2020/0320052 A1* | 10/2020 | Nguyen | ............. | G06F 16/2255 |
| 2020/0389521 A1 | 12/2020 | Brock | | |
| 2021/0117276 A1* | 4/2021 | Federwisch | ............. | G06F 3/065 |
| 2022/0091743 A1* | 3/2022 | Chang | ................ | G06F 11/1469 |
| 2022/0124072 A1 | 4/2022 | Stinson | | |
| 2022/0164369 A1 | 5/2022 | Nguyen | | |
| 2023/0062198 A1* | 3/2023 | Chen | .................... | G06F 16/283 |
| 2024/0248630 A1* | 7/2024 | Liu | ....................... | G06F 3/0619 |

* cited by examiner

200

Figure 3C:
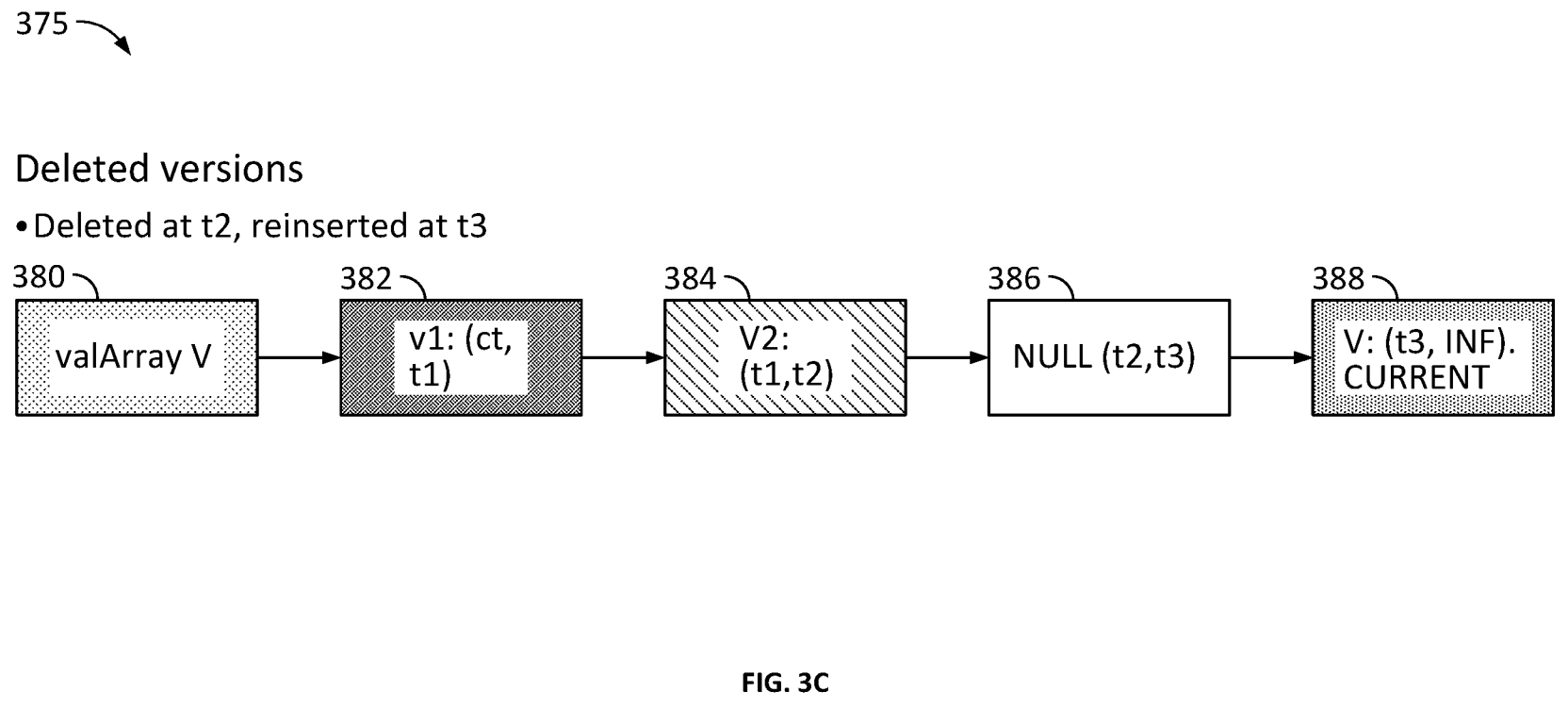

375

Deleted versions

• Deleted at t2, reinserted at t3

380 valArray V 382 v1: (ct, t1)

384 V2: (t1, t2)

386 NULL (t2, t3)

388 V: (t3, INF). CURRENT

Figure 5:
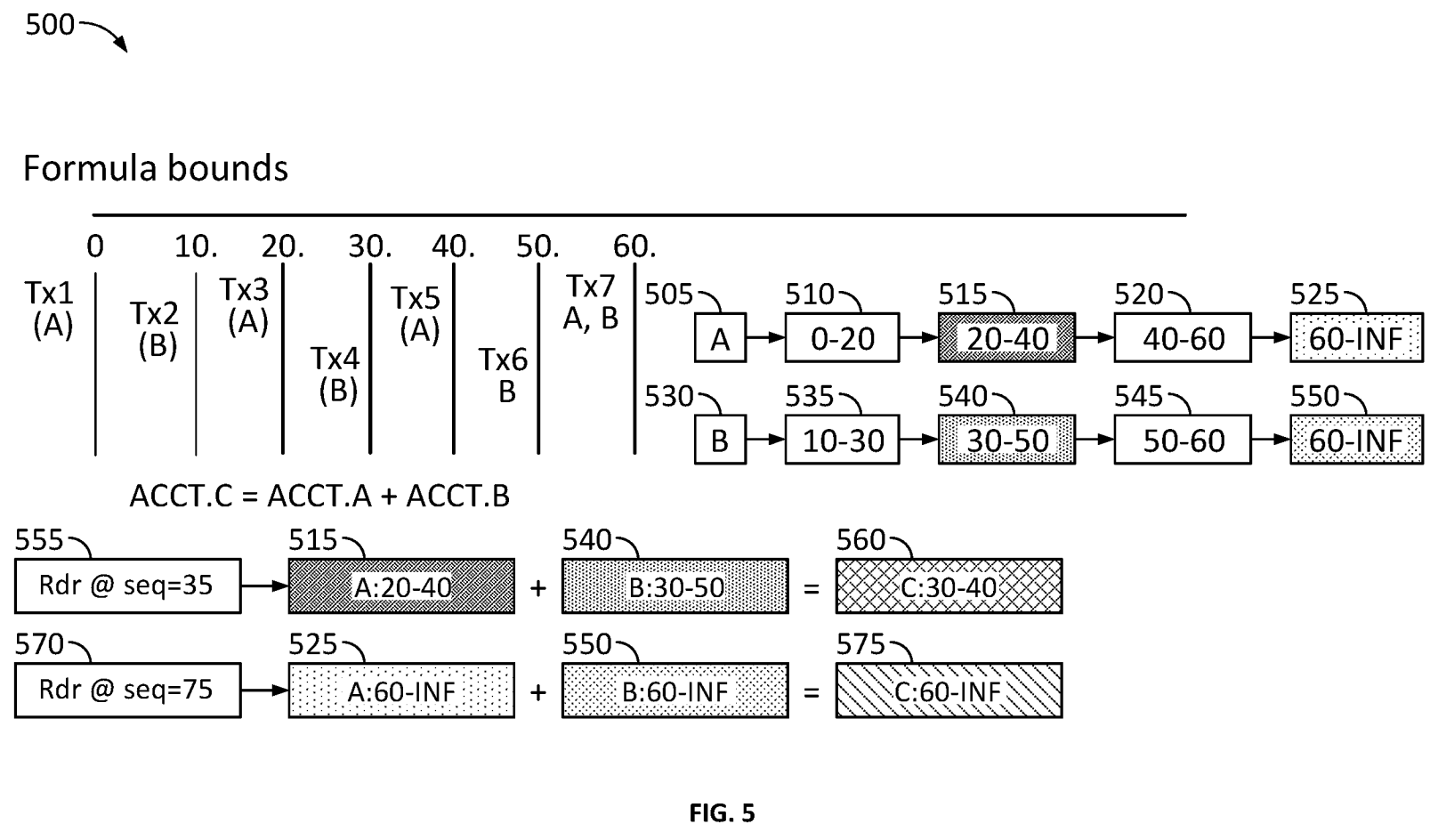

Formula bounds

| 0. | 10. | 20. | 30. | 40. | 50. | 60. |
|---|---|---|---|---|---|---|
| Tx1 (A) | Tx2 (B) | Tx3 (A) | Tx4 (B) | Tx5 (A) | Tx6 B | Tx7 A, B |

505 → A → 510 0-20 → 515 20-40 → 520 40-60 → 525 60-INF

530 → B → 535 10-30 → 540 30-50 → 545 50-60 → 550 60-INF

ACCT.C = ACCT.A + ACCT.B

555 Rdr @ seq=35 → 515 A:20-40 + 540 B:30-50 = 560 C:30-40

570 Rdr @ seq=75 → 525 A:60-INF + 550 B:60-INF = 575 C:60-INF

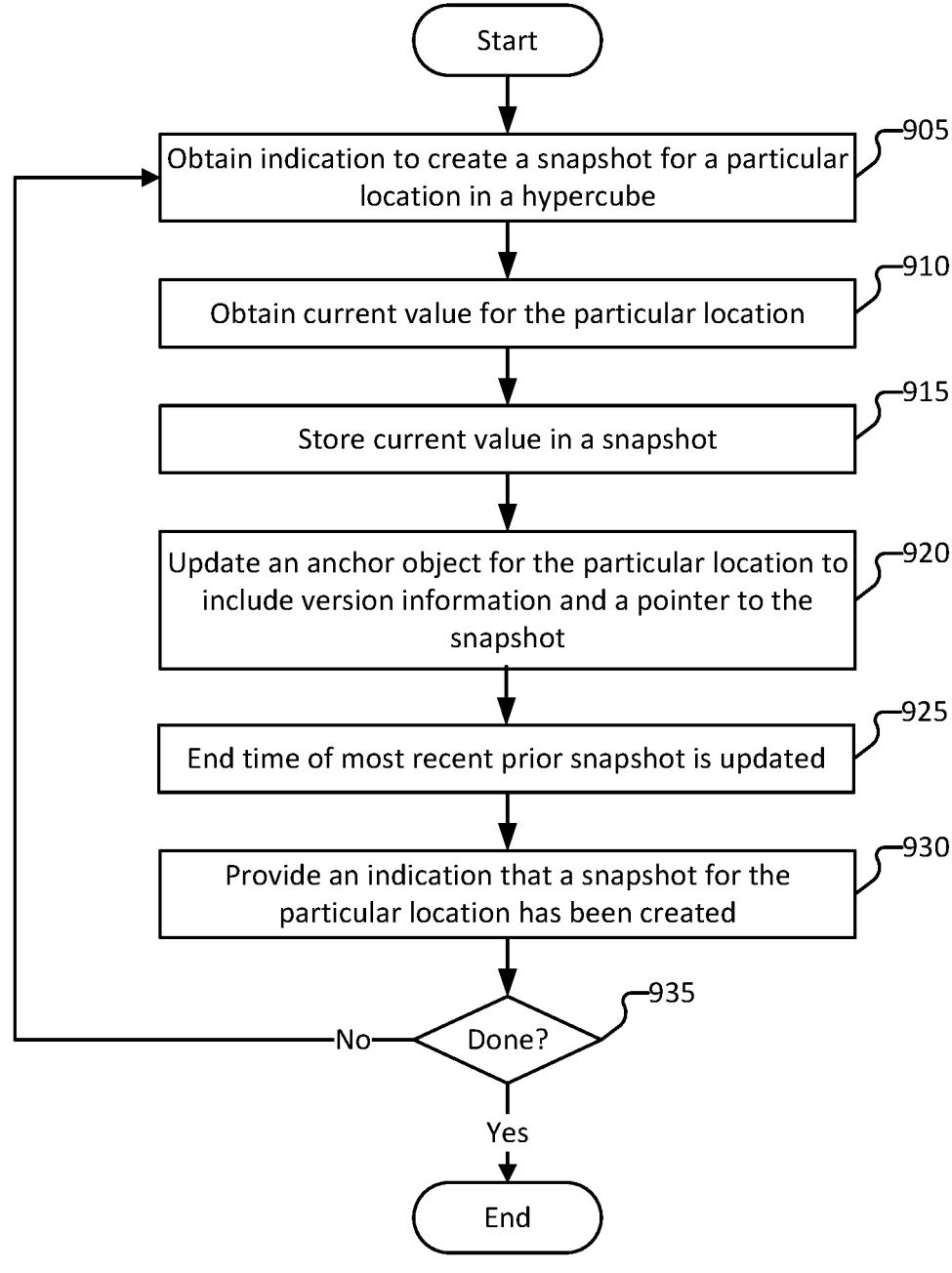

Start

Obtain indication to create a snapshot for a particular location in a hypercube —905

Obtain current value for the particular location —910

Store current value in a snapshot —915

Update an anchor object for the particular location to include version information and a pointer to the snapshot —920

End time of most recent prior snapshot is updated —925

Provide an indication that a snapshot for the particular location has been created —930

Done? —935

No

Yes

End

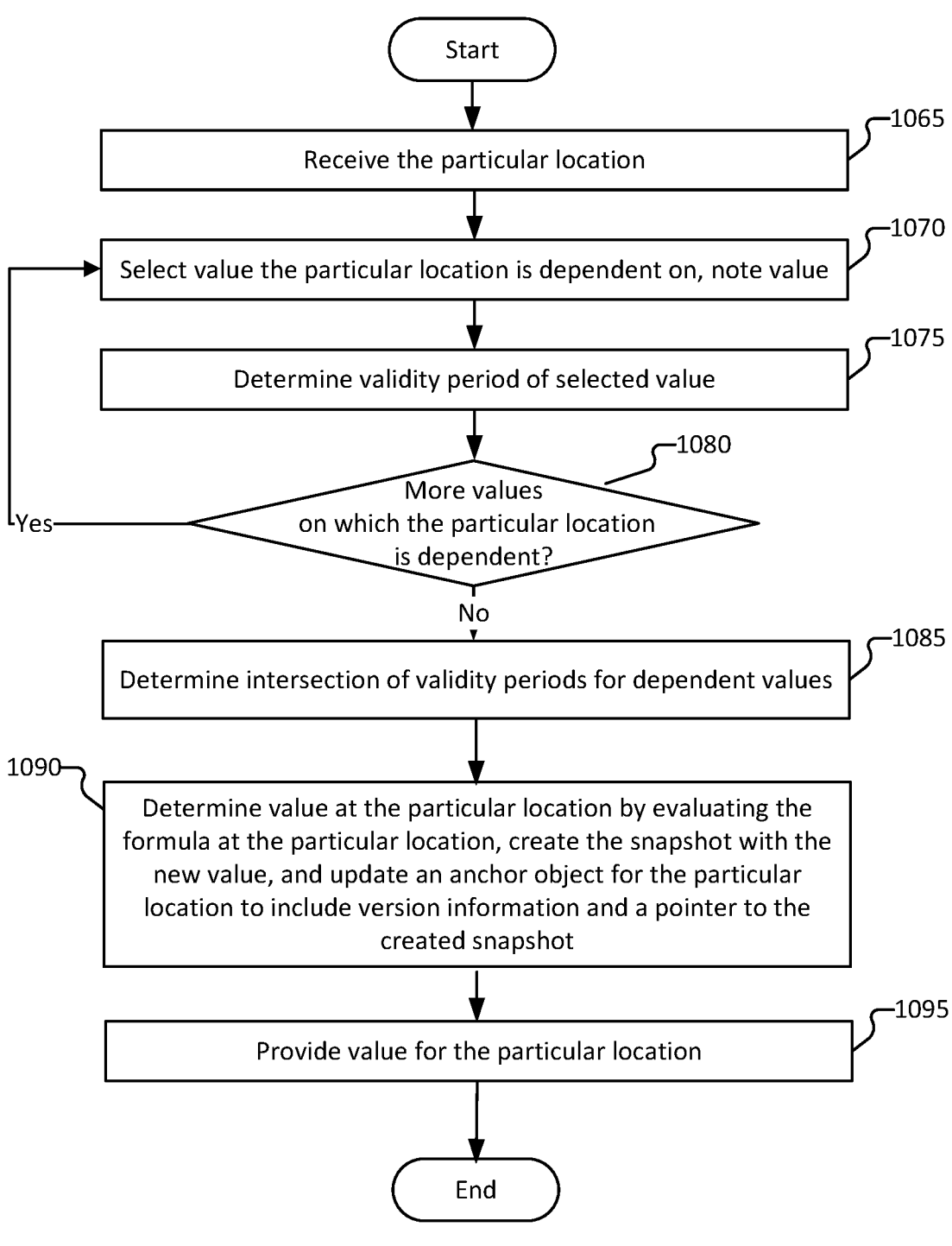

Start

Receive the particular location          —1065

Select value the particular location is dependent on, note value          —1070

Determine validity period of selected value          —1075

More values on which the particular location is dependent?          —1080

Yes

No

Determine intersection of validity periods for dependent values          —1085

1090—Determine value at the particular location by evaluating the formula at the particular location, create the snapshot with the new value, and update an anchor object for the particular location to include version information and a pointer to the created snapshot Provide value for the particular location          —1095

End

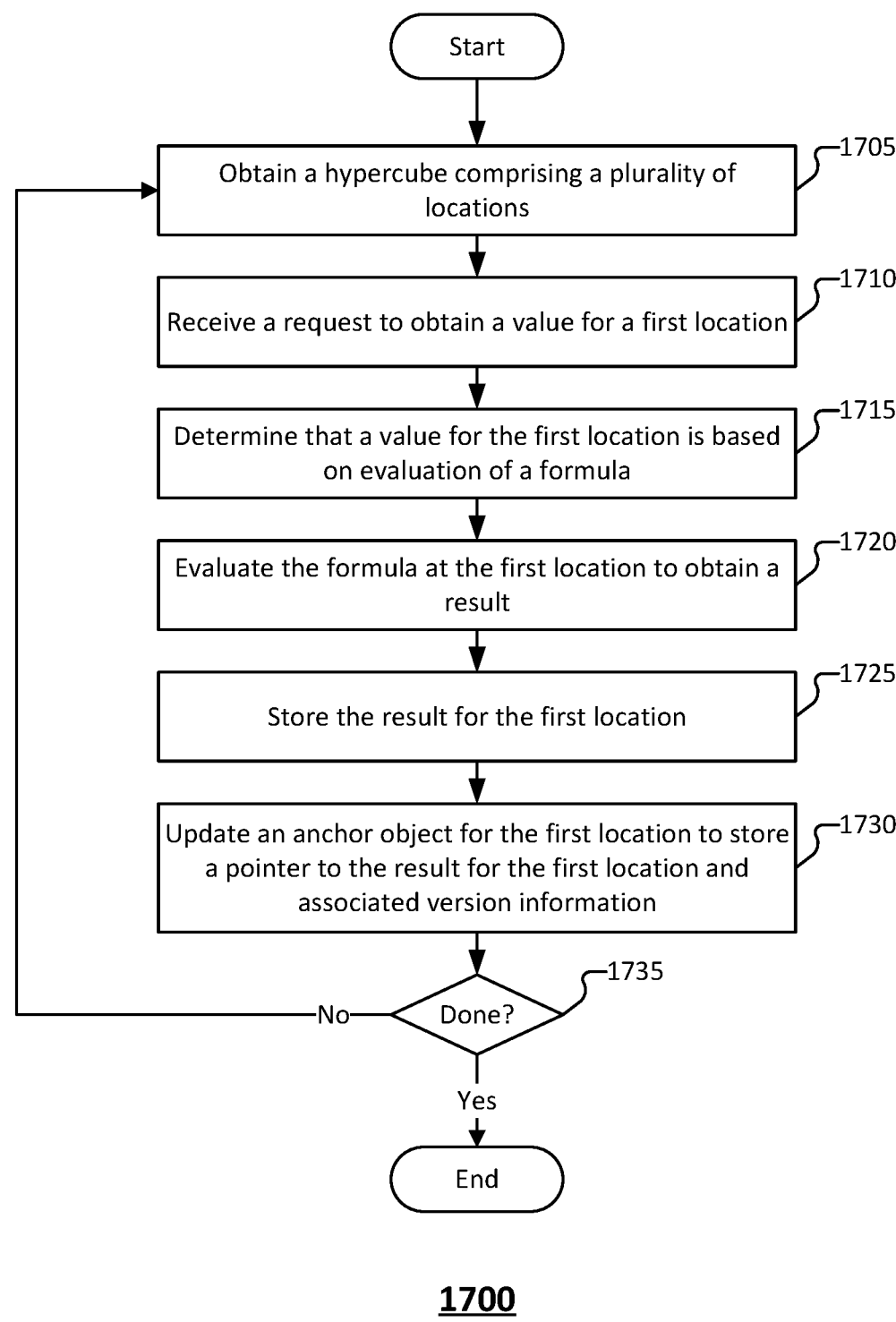

Start

Obtain a hypercube comprising a plurality of locations ⌐1705

Receive a request to obtain a value for a first location ⌐1710

Determine that a value for the first location is based on evaluation of a formula ⌐1715

Evaluate the formula at the first location to obtain a result ⌐1720

Store the result for the first location ⌐1725

Update an anchor object for the first location to store a pointer to the result for the first location and associated version information ⌐1730

Done? ⌐1735

No

Yes

End

Start

Obtain a hypercube comprising a plurality of locations ⟋1805

Determine an index that maps dimension values to a collection of locations in the hypercube ⟋1810

Store the index ⟋1815

Done? ⟋1820

No

Yes

End

<u>1800</u>

1900

MEMORY EFFICIENT MULTI-VERSIONED CONCURRENCY FOR A HYPERCUBE MEMORY CACHE USING ANCHOR OBJECT POINTERS

BACKGROUND OF THE INVENTION

Query evaluation systems, which capture and model future outcomes, are typically built based on multi-dimensional databases, usually called hypercubes to facilitate analysis. Data in a hypercube is associated with a coordinate tuple, having a value in each of a set of defined dimensions. Dimensions used in planning are usually hierarchical in nature. Dimensions can have attributes which are also often hierarchical. Parent elements represent the rollup, or aggregation, of all of the elements "beneath" them in the hierarchy. Some of these hierarchies can be quite high and/or wide (a single parent may represent a rollup of thousands or even millions of children). Query evaluation systems have long had challenges dealing with large and complex models, especially when the amount of data in hypercubes is increasing.

Systems are generally constrained with respect to storing data obtained in connection with evaluating planning models, such as for analyzing data in the hypercube that changes over time. It requires substantial memory resources to copy an entire hypercube as data changes over time. This is a problem as processes need to have data consistency from the hypercube during the time they are running.

BRIEF DESCRIPTION OF THE DRAWINGS

Various embodiments of the invention are disclosed in the following detailed description and the accompanying drawings.

FIG. 3C illustrates an example of a set of versions for a value at a particular location in a hypercube according to various embodiments of the present application.

FIG. 5 illustrates an example of validity periods for a particular location comprising a formula to be evaluated according to various embodiments of the present application.

FIG. 9 is a flow diagram of a method for creating a snapshot for a value at a particular location of a hypercube according to various embodiments of the present application

FIG. 10B is a flow diagram of a method for determining a value at a particular location of a hypercube according to various embodiments of the present application when the location corresponds to a derived value which is computed from the evaluation of a formula with dependent terms.

FIG. 17 is a flow diagram of a method for updating an anchor object based on a request to obtain a value for a particular location comprising a formula to be evaluated according to various embodiments of the present application.

DETAILED DESCRIPTION

Figure 1:
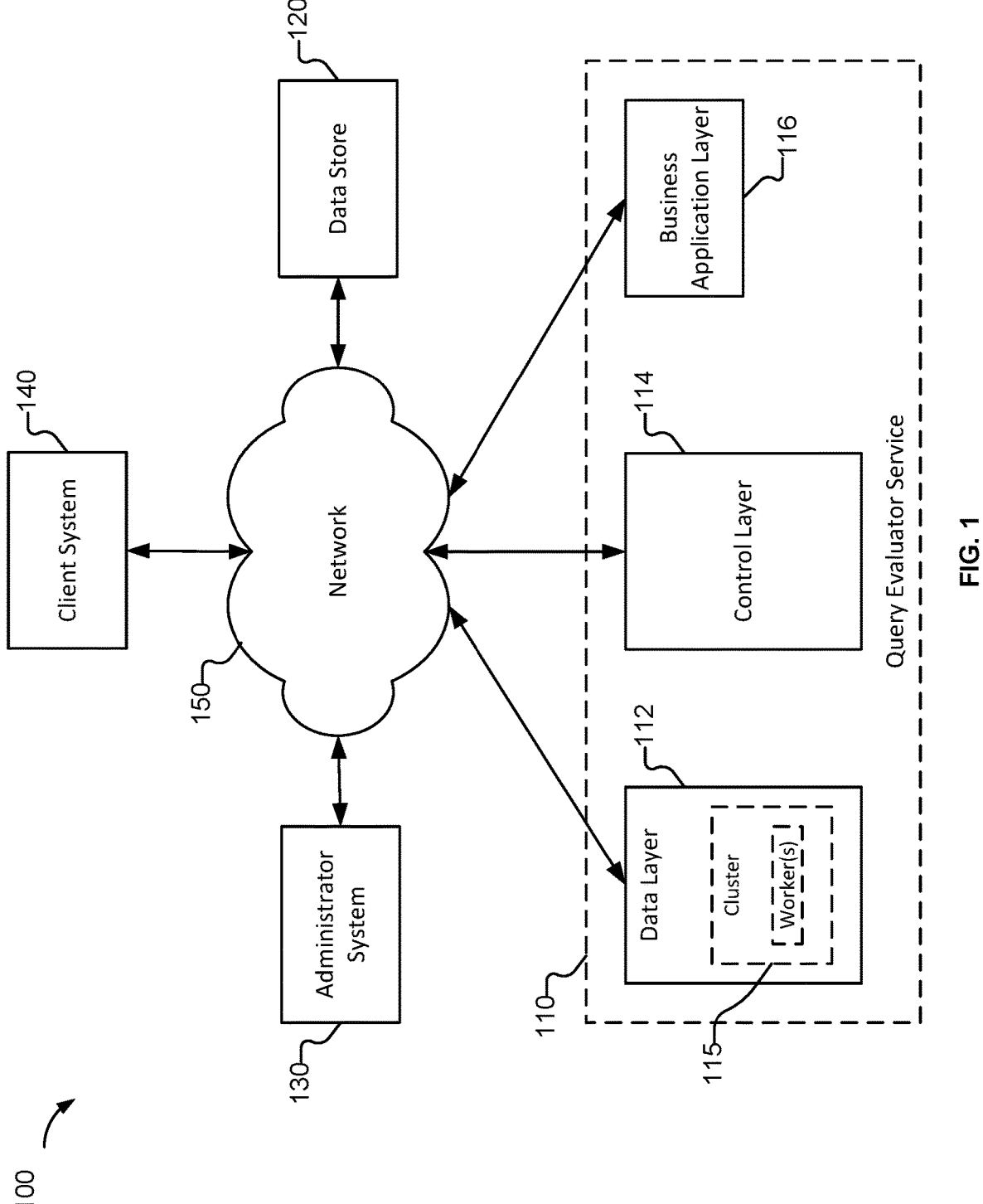
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a hypercube may mean an N×M×Z dimensional logical construct in which data for a dataset may be stored. As an example, each cell in the hypercube corresponds to a location at which data may be stored. N, M, and Z are positive integers. In various embodiments, the hypercube has 3, 4, 5, 6, 7, or K dimensions, where K is an integer.

As used herein, a tuple may refer to a collection of values that represent a specific point or vertex in the hypercube. For example, each dimension in a hypercube corresponds to an axis, and each axis can take on a range of values. A tuple in such a context may include values, one for each dimension that specifies a location or vertex within the hypercube. The hypercube may specify a unique point within the hypercube. Tuples are a useful way for describing a navigating points in multidimensional spaces, which can be challenging to visualize.

As used herein, accounts may refer to a built-in dimension that allows a user to categorize numeric data in a hypercube by common or meaningful categories (e.g., business categories, such as revenue, assets, income, etc. Accounts can have a recursive structure, such as a formula that depends on two values, which themselves may be results of evaluating other formulas. For example, if an account F may be denoted by $F=F1+F2$, where $F1=A+B$ and $F2=C$, where A, B and C are data-entry/leaf accounts whereas F, F1 and F2 are formula accounts. In this example, evaluation of F has a natural recursive structure which involves the evaluation of F1 and F2 at the first level of recursion and the evaluation of A, B, C at the leaf/last level of evaluation.

As used herein, a reading process is a process that accesses a value in the hypercube (e.g., a value in cached version/snapshot) or an account derived from values in the hypercube.

As datasets are used by organizations at scale, planning models are developed to predict future values for points in the hypercube or accounts that are derived from values in the hypercube. For example, a planning model predicts the future values based on some known numeric inputs and formulas that try to predict future values.

More sophisticated planning models are developed across a plurality of dimensions. The dimensions may be common across various organizations or organization-specific/defined. Dimensions are part of the metadata and can include many different types of entities on which the data is categorized. Examples of dimensions include Region, Product, Job Title. Dimensions can form a natural hierarchy, for example, a dimension along location can form a hierarchy such as North America→United States→US-West→San Francisco, or North America→Canada→Ontario→Toronto. In this case the arrows denote a parent child relationship. A dimension value higher up in the hierarchy (e.g., North America or United States in the example above) is referred to as a rollup dimension.

In multidimensional planning, input values are tagged with relevant values in a particular dimension. Data can be aggregated and filtered by different dimension values to gain insight about a particular aspect of a customer's business (e.g., sales can be filtered by a particular product). Organizations often deploy continuous planning (also referred to as rolling planning) according to which the plan/forecast is updated regularly (e.g., according to a predetermined frequency or time period). The previous state of a plan is an important artifact because the organization may want to compare the previous state of the forecast against the current state of the forecast, such as to gain insight on how their opinion of the business is changing. Accordingly, persisting the previous state, at least until it is no longer needed, is beneficial.

Persisting different states of the plans generally includes storing versions of the plans. Versions typically store copies of all numeric inputs, (version specific) formulas, assumptions, and driver values, etc. Structural elements that may be global to all versions are generally not stored in each version redundantly. The version can be created based on a cloning of an existing version and assigning a name/unique version identifier. The cloning operation copies all (or substantially all) the data (facts, assumptions, drivers) and is a heavyweight operation (e.g., performing the cloning operation is resource intensive) due to the amount of data that is created. A new version created from an existing version, such as a prototype version, is no longer linked to such version from which the new version is created. For example, the prototype version and the new version can change independently of each other. All created versions are thus independent of each other.

Systems can store versions in cache and use the versions as a source of data in memory that can be rapidly retrieved, such as to compute an account at a particular location. When an account is evaluated, the system may cache the result in the version cache to save future re-evaluation.

Persisted versions may correspond to snapshots in time. The persisting of versions assists with ensuring time consistency such as a potentially long-running report that needs to have all of its values (e.g., data entry/input values, and calculated values, etc.) consistent with respect to the start time of the report. For example if the values of input accounts A and B were 10 and 20 respectively and if a report involved the calculation of Input accounts A, B and calculated account C with formula $C=A+B$ and it started at time 6:00 PM, ran for 10 minutes, but input account A got modified to 40 at time 6:05 PM, a read consistent evaluation will see A=10, B=20, C=30. Any of the following alternatives are unacceptable from a read consistency point of view A=10, B=20, C=60 (e.g., the updated value of A was observed when evaluating C); and A=40, B=20, C=60 (e.g., the updated value of A was observed when evaluating A and C).

Related art systems can ensure read consistency via use of read and write locks on the version cache. Read locks are acquired by readers when the reading process queries/accesses data in the version, and the acquisition of this read lock blocks any writers on the same version cache. However, at any one time, many reading processes can be running concurrently. Similarly, writing processes can obtain write locks. The acquisition of the write lock itself blocks until any active concurrent reading processes exit the version cache, and once acquired it blocks new reading processes from entering the version cache. Ensuring read consistency according to such a method creates scalability bottle necks because writer processes may suffer long latency spikes when there is a persistent influx of reading processes in the system due to having to wait for potentially expensive and long running read sessions to finish.

The unit of versioning employed by related art systems is the entire version cache. Reading processes and writer processes take turns accessing the version cache under the multiple readers, single writer rule. In this model, multiple concurrent readers can access the version cache, but a writer must have exclusive access. If read sessions and write sessions are short, this model can work well. If read sessions are relatively long, however, a writing process may have to wait a long time for access to the version cache. Related art systems can alleviate the bottlenecks caused by long read sessions in several different ways, including doppeling, and pinned version cache optimization. Doppeling is a classic copy on write solution where a writer process instead of blocking for read processes locks to be released (e.g., in the event of reading processes) makes a full copy of the version cache (e.g., a double or a doppel) and works with this new copy. Eventually when all the reading processes for the old copy of the version cache exit, the old copy is reclaimed and purged. In the pinned virtual cache optimization, traffic is segregated based on expected operation time. Shorter read operations and all write operations are directed to a version cache that is considered "pinned" in memory. In addition, a second version cache (e.g., the non-pinned version cache) is maintained in memory and is dedicated to longer read operations. If a write operation happens on the pinned version cache, the system attempts to apply the write operation to the non-pinned version cache, however, the system may skip the write operation if the non-pinned version cache is locked for read.

According to various embodiments, the system implements a multiversion concurrency control that is finer than version control employed by related art systems, such as by avoiding making full copies of a version cache. Rather, the system uses versioning on a value object level. In some embodiments, the system performs snapshotting of value objects that comprise data for a location in the hypercube or data derived from evaluating an account (e.g., value objects that reference user-entered values). The system can perform snapshotting on values that change over time, which are usually either user entered values on an input account or derived numeric values of a formula account.

In some embodiments, the system stores a snapshot chain for a set of snapshots associated with a particular value object (e.g., a set of snapshots for a particular location in the hypercube). The snapshot chain may correspond to an index for a set of snapshots associated with a particular value object. The set of snapshots associated with the particular value object (e.g., particular location of the hypercube) effectively form a history of changes on a such value object spanning from the creation time of the object.

A snapshot may have a corresponding validity period, which may comprise a start time and an end time. The validity period corresponds to a period during which the snapshot is valid for a reading process having a matching timestamp, such as a timestamp that intersects with the validity period (e.g., is between the start time and the end time). Individual snapshots contain copies of the object as of a corresponding time (e.g., the time at which the snapshot was captured) and are usable by evaluation sessions (e.g., reading processes) from the start time of the snapshot to the end time. The start time may be the creation time of the object or the end time of the previous snapshot in the snapshot chain. The end time is the start time of the next snapshot in the snapshot chain in chronological order, however, a snapshot may have an indefinite end time if the snapshot chain does not comprise any subsequent snapshots and the value for the value object is still valid (e.g., the value object has not changed since the most recent snapshot was captured). In some embodiments, for a newly created snapshot (e.g., on an input account), the start time is the commit time of the transaction that made the modification, and the end time is set to infinity (e.g., INF).

In some embodiments, the system associates every write to a value object with a transaction. The system may comprise a central transaction manager module that remembers and assigns commit numbers to transactions. In response to a write operation, the system may propagate the write operation, such as by updating the validity period of the most recently captured snapshot (e.g., the current snapshot captured before the change to the value object).

In some embodiments, if there are one or more formula/derived value locations that directly or indirectly depend on a modified location, those locations are visited and the corresponding snapshot chain invalidated. In some embodiments, the invalidation step includes the termination of a current snapshot with an end time (e.g., setting the end time to a transaction commit number) or an invalidation of the object stored in a snapshot.

Accordingly, in various embodiments, reading process and a writing process do not block each other from accessing the value object because writer processes do not modify value objects in place but merely create new snapshots (e.g., miniature versions of those value objects).

The reading process may have an associated timestamp. For example, the timestamp may be a start time for the reading process. In some embodiments, the system pegs reading processes to a read snapshot time (e.g., the read snapshot time is the commit time of the latest transaction at the time the read session starts) established at the start and reading process consistency is ensured via read snapshot time. For every item accessed by a reading process, the system walks the corresponding snapshot chain and the appropriate matching snapshot for the read process (e.g., the timestamp time associated with the reading) is chosen. For example, in response to receiving a query to access a value of an object (e.g., a location in the hypercube), the system walks the snapshot chain for the value object and determines a matching snapshot in the snapshot chain. The matching snapshot may be determined based on determining a snapshot among a set of snapshots in the snapshot chain having a validity period with which the timestamp for the reading process intersects.

A value object may correspond to a result of evaluating a formula. For example, a particular location in the hypercube may comprise a formula that is to be evaluated (e.g., on access) to determine the value for that particular location. In some embodiments, the system caches value objects corresponding to a result of an evaluated formula. The system may store a snapshot for such value object and the validity period for such value object may be determined based on validity periods for each value from which the formula directly or indirectly depends. For example, the validity period for a value object comprising a formula is the intersection of the corresponding validity periods for each value from which the formula directly or indirectly depends. In the event that the formula for a value object depends on a result from another formula, the validity period is based on a propagation of all input values, recursively. The validity period for a value object corresponding to a result for a formula may be dynamically defined. For example, a snapshot of the value object may be invalidated upon a modification/update to a location or value on which the value object directly or indirectly depends.

In some embodiments, the system stores an anchor object associated with a value object. For example, the value object may itself comprise the anchor object. The anchor object comprises snapshot information and version information. For example, the anchor object stores pointers to snapshots and validity periods for the snapshots. The anchor object may use the snapshot information and the version information to index the snapshots for the value object (e.g., the particular location), such as in the form of a snapshot chain.

In some embodiments, the system versions other objects in a manner similar to the aforementioned value objects, such as tuples of hypercube models (e.g., because the tuples may be deleted) or tuples/rows of configurable model (e.g., because the columns may be updated). The system may snapshot the tuples (e.g., capture a virtual tuple) and store associated version information with which the system determines a snapshot corresponding to a reading process. The version information may comprise a validity period, etc.

In some embodiments, virtual tuples are specific to row objects that reside in a configurable model (e.g., where the configurable model includes driver column values and dimension values) where in the dimension values at a fixed location (e.g., a Row) can be updated—for example, the value at a fixed location is updated from SF to LA. In this case, there are indexes which map each distinct dimension value to a list of row positions. The challenge with multi-versioning is to make sure that the index returns the right answer (i.e., the right set of Rows) for a given evaluator (e.g., a read process at a given read time) and a given dimension value (e.g., a query might request to fetch all satisfying row positions with the dimension of region set to 'SF' as of a read time of 5). In some embodiments, virtual tuples achieve a multi-versioned dimension index that can support changing dimension values at a fixed location. In some embodiments the properties/essential features of a virtual tuple are:

Each virtual tuple is a light weight object with a pointer to the original tuple but with a built in validity range (e.g., start time, end time) that denotes the time interval for which the tuple is valid and readable. This implies that the validity time range is precisely the time period over which the virtual tuple has the dimension values as of the time of its creation;

Virtual tuple has a copy of the dimensions as of the time the virtual tuple was created;

Distinct ID's are assigned to the virtual tuples. This ensures that the different incarnations of a row with distinct dimension values can be identified separately and indexes can point to a specific incarnation which corresponds to a specific dimension value;

Different dimension values (e.g., SF, LA, etc.) contain those virtual tuple ID's that match that dimension value. These may include multiple virtual tuples from the same underlying container row or across different rows;

For a reader, when performing a match on a specific dimension value, the list of matching (virtual) tuple ID's is retrieved from the bitmap index for that dimension value. For each matching virtual-tupleId, a final validity check avoids a re-evaluation of the dimension predicate, but entails an existence check: is the virtual tuple returned from the index visible to the reader given its read time (e.g., is the condition Vtuple.start<=reader.time<VTuple.end met?).

In some embodiments, virtual tuples allow indexing of multiple incarnations of a fixed location (e.g., a configurable model row) with DIFFERENT dimension values so that each incarnation is POINTED TO BY the dimension value (and only one dimension value) corresponding to the time at which the virtual tuple was created. In some embodiments, the versioning scheme can be used on other types of objects in a planning model. Aside from ValArrays (e.g., arrays of purely numeric data or numeric data that are backed by a formula), a planning model can contain objects such as personnel records which contain things like names, start dates, salaries. All these objects can be versioned in a manner similar to ValArrays. In some embodiments, the point of virtual tuples is a subtle one in which a new "version" of the tuple object is desired, but since the tuple contains properties that are already versioned, it is not desired to make a full copy of the object. Tuples live in index data structures and when the properties of a tuple changes, the index data structure needs to contain an index to the old version of the tuple and the new version of the tuple. So a new version of the tuple is created and an entry is created in the index for the new version of the tuple. When the index is queried and a list of tuples is retrieved, a secondary "are you visible" check is performed to ensure that the tuples are visible to the current reader.

In some embodiments, the system implements a cleanup operation. The system performs the cleanup to purge snapshots that are no longer needed by a reading process. The system may identify all current reading processes, determine an earliest reading process, and determine all stored snapshots having a validity period before the timestamp for the earliest reading process (e.g., the start time for the earliest reading process). The system may delete the snapshot(s) having a validity period before the timestamp for the earliest reading process. In some embodiments, the cleanup operation is performed (e.g., invoked) in response to a determination that a predefined criterion is satisfied. As an example, the predefined criterion comprises an available memory being less than a predefined memory threshold. As another example, the predefined criterion comprises a lapsing of a predefined time period since a last cleanup operation was performed with respect to the set of snapshots (e.g., the cleanup operation is performed according to a predetermined frequency, etc.). In some embodiments, the cleanup operation ensures that available snapshots are reclaimed within a fixed time interval and creates multiple threads until the time required to perform the cleanup operation falls within a target time. In some embodiments, the cleanup operation ensures fairness amongst multiple containers by packing each thread such that a thread gets an equal amount of work from each container.

Various embodiments provide a system, method, and/or device for managing updates to a hypercube. The method includes (i) obtaining a hypercube comprising a plurality of locations, wherein a particular location has an associated anchor object that stores version information for the particular location, (ii) receiving a request to store an updated value for the particular location, and (iii) storing the updated value for the particular location of hypercube, the updated value being stored with associated version information stored in the anchor object for the particular location.

In some embodiments, the version information comprises a pointer to snapshot information for the particular data object and the snapshot information is associated with a corresponding validity period. The corresponding validity period may comprise a start date and an end date. The start date for the snapshot information corresponding to the updated value stored in the first data object is a date at which the updated value is stored for the particular location. The end date for the snapshot information corresponding to the updated value stored for the particular location is set as a time at which a next update to a value for the particular location is modified or as an indefinite period if the updated value is a most recent value for the particular location.

In some embodiments, the system receives, from a reading process, a request to obtain a corresponding value for the particular location. In response to receiving the request, the system determines a timestamp associated with the reading process, determines that a snapshot chain indexed in the anchor object for the particular location has as an associated snapshot having a validity period matching the timestamp, and in response to determining that the snapshot chain indexed in the anchor object for the particular location has the associated snapshot, obtains a value for the particular location based at least in part on the associated snapshot.

In some embodiments, the system receives, from a reading process, a request to obtain a corresponding value for the particular location. In response to receiving the request, the system determines a timestamp associated with the reading process, determines that a snapshot chain indexed in the anchor object has as a snapshot having a validity period matching the timestamp, and in response to determining that the snapshot chain indexed in the first anchor object has the snapshot matching the timestamp, provides a value for the particular location based at least in part on the snapshot matching the timestamp.

In some embodiments, the anchor object for the particular location comprises a set of pointers for a set of snapshots stored in a snapshot database. The system performs a cleanup operation with respect to the set of snapshots. The cleanup operation may include removing a subset of the snapshots from snapshot database in response to a determination that a predefined criterion is satisfied. The performing the cleanup operation may comprise (a) determining an earliest reading process among a set of current reading processes that read data stored in the hypercube, (b) determining the subset snapshots having a respective validity period that terminates before a timestamp associated with the earliest reading process, and (c) removing the subset snapshots from the first anchor object.

Various embodiments provide a system, method, and/or device for managing updates to a hypercube. The method includes (i) obtaining a hypercube comprising a plurality of locations, wherein a particular location has an anchor object that stores version information for the particular location, and the particular location comprises a first formula that is evaluated to return a value for the particular location, (ii) in response to receiving the request for the value, determining that the particular location comprises the first formula, (iii) in response to determining that the particular location comprises the first formula, evaluating the first formula to obtain a result, and (iv) storing the result for the particular location in association with the version information for the particular location.

In some embodiments, the version information comprises a pointer to snapshot information for the particular location, the snapshot information is associated with a corresponding validity period, and the validity period is based on input terms on which the first formula depends. If the first formula is dependent on a first input term and a second input term, then the validity period for the snapshot information is based at least in part on an intersection of a first validity period associated with the first input term and a second validity period associated with the second input term. If the first formula depends on an operation performed with respect to a second value obtained from a second location in the hypercube and a third value obtained from a third location in the hypercube, the validity period for a snapshot stored for the particular location is determined based on an intersection between validity periods of the second value and the third value. The snapshot for the particular location is invalidated in response to determining that the second value or third value has changed. The invalidating the snapshot can include setting an end time for the validity period to be the time at which the second value or third value has changed. In some embodiments, invalidating the snapshot includes marking values of the snapshot as invalid in response to detecting that there are no active readers.

In some embodiments, the first formula depends on an operation performed with respect to a second value obtained from a different location in the hypercube, and validity periods for snapshots associated with the particular location are determined based on times at which the second value is updated.

Various embodiments provide a system, method, and/or device for indexing to a hypercube. The method includes (i) obtaining an index that maps dimensional values to a collection of locations within a hypercube, (ii) determining that one or more locations of the hypercube is updated along a particular dimension, and (iii) in response to determining that one or more locations of the hypercube is updated along a particular dimension, updating the index based on creating virtual tuples for the changed rows or locations and updating the index to include the newly created virtual tuples in the list of tuples pointed to by the new value of the dimension.

In some embodiments, virtual tuples help reduce evaluation cost by treating each distinct dimensionally updated incarnation of a conf model Row as a distinct "tuple" for indexing purposes and enable indexes to precisely point to a snapshot in time consistent entity whose dimension values exactly match the dimension value being indexed. In the absence of virtual tuples, we are forced to point indexes for a dimension value e.g., SF to a list of all container rows which may satisfy SF at any particular point of time (and not satisfy SF i.e have different dimension values like LA at other points of time), and this implies that evaluator sessions have to iterate all possible snapshots for each matching row, and if a snapshot is readable, recompute and recheck the dimension values to test if they indeed match the query dimension value e.g., SF With virtual tuples, we get back a set of tuple positions and for each tuple by merely checking if the tuple is readable (a light weight check) suffices, further dimension value verification s not needed.

In some embodiments, a row can have varying dimensionality, and based on the read time given a dimension value, the row may or may not be valid for that dimension value. For instance, Row 1 may have dimension values (Region: SF from time 0-time 3), Region: LA from time 3-time INF while Row 2 has dims (Region: LA 0-4), (Region: SF 4-INF). In a typical multi-versioning scenario, each row has a snapshot chain that tracks the multiple snapshots-of the row each with their own dimension value. In this case, Row1 has two snapshots corresponding to dimension values LA, SF and Row 2 has two snapshots as well. A typical dimension index has a bitmap/set of all matching tuples for each dimension value. Without the need for multi-versioning, the bitmap only has to track the latest state of each row e.g., SF→{ROW2} and LA→{ROW1}, there is certainty that no reader is going to be interested in the older dimension values. With multi-versioning, Reader@Time=2 needs to see SF→{ROW1} and LA→{ROW2}. Reader@Time=3 needs to see SF→{ } LA→{ROW1, ROW2}. Reader @Time=4 needs to see SF→{ROW2}, LA→{ROW1}. In various embodiments, alternatives which are inefficient:

a. Versioning the bitmaps One option is to maintain multiple snapshots of the bitmap index (versions) for each distinct dimension value for the various read times. This is expensive in memory usage because the row id lists are pretty large for large models. If this route is pursued, it would lead to:
  SF→(snap0: 0-3, ROW1) (snap1: 3-4, EMPTY) (snap2: 4-INF, ROW2)
  LA→(snap0: 0-3, ROW2) (snap1: 3-4, {ROW1, ROW2}) (snap3: 4-INF, {ROW1})
  The reason this is expensive is that operations such as inserts, deletes and updates to dimension values need to change the state of the bitmap index associated with a particular value, and each bitmap index is a potentially large list of millions of rowids (although compressed). Keeping multiple snapshots of the bit-maps can rapidly consume a significantly large amount of memory across a sequence of operations. And since there is a separate bitmap associated with each dimension value, the memory overhead of versioning degrades significantly.
  b. Record all possible matches: The other simpler approach is to record "all matches across time" for each dimension value (E.g., LA→{ROW1, ROW2}, SF→{ROW1, ROW2}.
  In this approach, a dimension value, for example, LA points to container rows. If the row has LA for its dimension value at any time, then the anchor/container row is included in the bitset.
  This is expensive at evaluation time. Suppose when at Time=2 looks up the bit map for Region='SF' and sees SF→{ROW1, ROW2}, they are forced to re-evaluate the predicate for the snapshot of the row that matches the read time (so it is arrived at Region: LA, 0-4) for ROW2 and from this it is known that the dim value is LA, not SF and throw out this row. This is expensive because there are potentially a large number of matches and evaluating the dimension predicate is expensive & defeats the purpose of the index.

In some embodiments, the algorithm used herein is to create a new virtual tuple every time the dimensionality changes which essentially denotes a new incarnation of an existing tuple, albeit with modified dimension values. Each virtual tuple is a light weight object with a pointer to the original tuple but with a built in validity range (start time, end time) that denotes the time interval for which the tuple is valid and readable. This implies that the validity time range is precisely the time period over which the virtual tuple has the dimension values as of the time of its creation. Virtual tuple has a copy of the dimensions as of the time the virtual tuple was created. Further, distinct ID's are assigned to the virtual tuples. This ensures that the different incarnations of a row with distinct dimension values can be identified separately and indexes can point to a specific incarnation which corresponds to a specific dimension value. Different dimension values (e.g., SF, LA) contain those virtual tuple ID's that match that dimension value. These may include multiple virtual tuples from the same underlying container row or across different rows. For a reader, when performing a match on a specific dimension value, the list of matching (virtual) tuple ID's are retrieved from the bitmap index for that dimension value. For each matching virtual-tupleId, a final validity check avoids a re-evaluation of the dimension predicate, but entails an existence check: is the virtual tuple returned from the index visible to the reader given its read time which is the same as Vtuple.start<=reader.time<VTuple.end. Lets' say originally that there are 10 rows including Row1 and Row2, with virtual tuples, 2 of the rows got dimension updates, so that effectively there are 10+2=12 "rows" or 12 virtual tuples. Virtual tuple is a logical name for a particular snapshot of a row with its own time range. So in our example, ROW1 has two vtuples ROW1.1 (0-3, SF) and ROW1.2 (3-INF, LA). ROW2 has two virtual tuples ROW2.1 (0-4, LA) and ROW2.2 (4-INF, SF). The indexes are SF→{ROW1.1, ROW2.2} LA→{ROW1.2, ROW2.1}. Each virtual tuple records the validity range inside itself. So when that when ROW1.1, ROW2.2 are received back as matches for "SF", a reader at read time >=3 will reject ROW1.1. And a reader at read time <4 will reject ROW2.2. This is less expensive than re-evaluating the dimension predicate since it is a time value check.

In some embodiments, the system improves the computer by making reading and writing processes more efficient. In particular, by enabling localized version storage using anchor objects and snapshot chains, the system efficiently stores values associated with hypercube locations (including locations that have formulas) that are necessary for active read processes without the storage overhead of making complete copies of the entire hypercube. Further storage efficiency is achieved by removing the stored snapshots that are no longer required by active read processes. In some embodiments, the system improves efficiency associated with tuple changes (e.g., groups of tuples such as rows or columns) in a similar manner.

FIG. 1 is a block diagram of a network system according to various embodiments of the present application. In some embodiments, system 100 implements system 200 of FIG. 2. In some embodiments, system 100 implements one or more of processes 400-1900 and 2100 for FIGS. 4-19 and 21, respectively.

In the example illustrated in FIG. 1, system 100 includes query evaluator service 110, administrator system 130 and/ or client system 140. System 100 may additionally include one or more data stores, such as data store 120, and network 150 over which one or more of query evaluator service 110, client system 140, administrator system 130, and data store 120 are connected. In some embodiments, query evaluator service 110 is implemented by a plurality of servers. In various embodiments, network 150 includes one or more of a wired network and/or a wireless network such as a cellular network, a wireless local area network (WLAN), or any other appropriate network. System 100 may include various other systems or terminals.

In some embodiments, query evaluator service 110 is configured to (a) receive a query that is indicative of one or more properties of result data, (b) determine, based at least in part on the query, one or more partitions of a hypercube that are expected to comprise information used in generating result data for a response for the query, (c) determine corresponding snapshots to be used in responding to the query, (e) provide the snapshot or evaluate the query using the snapshot, and (f) return a result for the query. The query may correspond to a request from a reading process for a particular location of the hypercube or other value object. For example, query evaluator service 110 receives a request for a reading process to access a value at a particular location in the hypercube or other value object. The reading process may be a process running on query evaluator service 110, such as by data layer 112, to evaluate a query or evaluate a plan.

In response to receiving the query, query evaluator service 110 determines the snapshot responsive to the query based on metadata associated with the reading process from which the query is received. The metadata may include a time-stamp (e.g., a transaction time) associated with the reading process, such as a start time at which the reading process was invoked. As an example, query evaluator service 110 (e.g., control layer 114) determines the snapshot responsive to the query based on determining a snapshot having a validity period with which the timestamp associated with the reading process intersects. The system is effectively using transaction time (i.e., commit time of the most recent transaction prior to the start of the query) as the query read time.

In various embodiments, query evaluator service 110 processes workloads, such as at scale for big data evaluations across hypercubes such as datasets that are sparsely populated (e.g., datasets having significantly large dimensionality). Query evaluator service 110 may evaluate planning to determine forecasts with respect to data in the hypercube. Query evaluator service 110 is configured to receive one or more queries (e.g., business logic to be executed) from another system, such as client system 140. In response to receiving the one or more queries, query evaluator service 110 (e.g., control layer 114) determines one or more datasets storing data for which the other system is seeking to evaluate. In response to determining the dataset(s), query evaluator service 110 obtains business logic (e.g., logic for a plan to be run) to be executed (e.g., in connection with evaluating/analyzing the data).

In some embodiments, query evaluator service 110 comprises data layer 112, control layer 114, and/or business application layer 116. Data layer 112, control layer 114, and/or business application layer 116 are respectively implemented by one or more servers. In some embodiments, data layer 112 comprises one or more clusters of compute resources (e.g., virtual machines).

Data layer 112 obtains a query received by query evaluator service 110 and processes the query to provide result data, such as in the form of a report (e.g., a forecast generated by executing a planning model). Data layer 112 receives the query, divides the query into a set of requests, processes at least a subset of the set of requests in parallel, and generates result data that is responsive to the query based on results for the set of requests. The system may create a reading process and/or writing process for each request to be processed. For example, the set of requests may correspond to requests to obtain a value at a particular location in the hypercube or for a particular account. Obtaining the value may include determining that the particular location or account comprises a formula that is to be evaluated to return the result, and causing the formula to be evaluated. As an example, the set of requests comprises requests (e.g., subqueries) that are independent (e.g., the various requests do not have cross dependencies). Each request may correspond to one or more account groups.

In some embodiments, data layer 112 comprises a query engine, an execution engine, a formula evaluator, snapshotting engine, and/or cleanup engine. The query engine, the execution engine, the formula evaluator, and/or the snapshotting engine, which may be executed by cluster 115 of compute resources.

The query engine (e.g., an interpretive engine) is a service that receives a query, pre-processes the query, and divides the query into a set of requests (e.g., independent subqueries), such as tasks to be run by reading processes to access values in a particular location or account. The query engine may aggregate results obtained from the execution engine, which may use a set of reading processes to access data at the various locations or accounts for the hypercube.

The query engine analyzes the query to determine roll up elements, identify roll up elements that overlap, and remove the overlapping elements to ensure each element is only computed once. The query engine uses the dependency of data to determine subqueries and to schedule some subqueries to run in parallel. The unit of parallelization of the subqueries may be based on the dimension of the account being analyzed.

In response to determining the set of requests, the query engine generates a set of tasks respectively corresponding to the set of requests. The query engine submits the tasks for evaluation. For example, the query engine causes the tasks to be submitted to the execution engine for execution. In some implementations, the parallelization of the set of requests is determined by the query engine. In other implementations, the parallelization of the set of requests may be determined/managed by the execution engine.

The execution engine is a service that executes the query, such as by executing the set of requests associated with the tasks submitted by the query engine. The execution engine evaluates each of the set of requests and aggregates the data to obtain a response to the query (e.g., in accordance with the definition of the normalized query obtained by the query engine).

In some embodiments, the execution engine starts reading processes and/or writing processes in connection with reading or manipulating data at a particular location hypercube or account. For example, the execution engine instantiates a reading process to obtain a value at a particular location in the hypercube or a particular account.

The formula evaluator is a service for resolving a formula, such as an arithmetic expression, with respect to identified cells or accounts in the data structure (e.g., the dimensional space for a query). In connection with evaluating the formula, the system uses values obtained from reading processes executed by execution engine and obtains a resulting value.

The snapshotting engine is a service for snapshotting versioning of value objects, such as an object corresponding to a particular location in the hypercube or a particular account. Query evaluator service 110 uses the snapshotting engine to capture snapshots of a value object and store the snapshots in a snapshot dataset, such as a dataset stored in data store 120. The snapshotting engine may be further configured to update an anchor object based on the capturing of the snapshot, such as to update an index of snapshots for the value object to include the newly captured snapshot. In connection with updating the anchor object, the snapshotting engine stores snapshot information (e.g., a pointer to the corresponding snapshot stored in the snapshot dataset) and version information (e.g., a validity period, such as a start time and/or end time). The snapshotting engine may capture the snapshot of the value object in response to (i) determining that the value for the value object has been updated/modified, and/or (ii) determining that a request from a reading process for the value of the value object is received and determining that no current snapshots for the value object are valid for the reading process.

Query evaluator service 110 may further use the snapshotting engine to manage validity of snapshots, such as by monitoring when a change is made to the hypercube or an account (e.g., a value is updated) and determining whether such change impacts a current snapshot (e.g., whether the change would cause a snapshot to no longer be current or otherwise cause the snapshot to be invalidated). The snapshotting engine may update the anchor objects for a value object that is changed to update the validity period of a snapshot that is rendered invalid from the change to the value object.

The cleanup engine is a service for performing cleanup operations with respect to snapshots. The cleanup engine is used to purge snapshots that are no longer required by any current reading processes. For example, for a particular value object (and corresponding anchor object), the cleanup engine identifies a set of active reading processes, determines an earliest reading process of the set of active reading process, and determines any snapshots that have validity periods ending before a timestamp associated with the earliest reading process. The cleanup engine determines to delete the snapshots having validity periods that end before the timestamp associated with the earliest reading process. In some embodiments, the cleanup engine is invoked (e.g., caused to run the cleanup operation) in response to determining that an amount of available memory is less than a predefined memory threshold or in response to a predetermined amount of time having lapsed since a last iteration of the cleanup operation was performed.

Query evaluator service 110 provides the result (e.g., responsive data) for the query to client system 140. For example, query evaluator service 110 uses business application layer 116 to configure a user interface to display the results (e.g., provide a report or a sheet to client system 140), such as in the form of a report.

In some embodiments, data layer 112 manages a cluster of compute resources to execute the business logic of the query (e.g., to process the set of requests/subqueries against the applicable data). For example, data layer 112 establishes the connections between the set of compute resources and the data source(s) and allocates the workload for the business logic across the set of compute resources.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator using administration system 130 uses an interface provided/configured by business application layer 116 to configure (e.g., define) one or more security policies including access permissions to information stored on data store 120, permissions to access performance profiles, etc.

Administrator system 130 comprises an administrator system for use by an administrator. For example, administrator system 130 comprises a system for communication, data access, computation, etc. An administrator uses administrator system 130 to maintain and/or configure query evaluator service 110 and/or one or more of data stores (e.g., data store 120). For example, an administrator uses administrator system 130 to start and/or stop services on query evaluator service 110 and/or data store 120, to reboot data store 120, to install software on query evaluator service 110 and/or data store 120, to add, modify, and/or remove data on data store 120, etc. Administrator system 130 communicates with query evaluator service 110 and/or data store 120 via a web-interface. For example, administrator system 130 communicates with query evaluator service 110 and/or data store 120 via a web-browser installed on administrator system 130. As an example, administrator system 130 communicates with query evaluator service 110 and/or data store 120 via an application running on administrator system 130.

In various embodiments, an administrator (or other user associated with a tenant or entity with which the tenant is associated such as a customer) uses administrator system 130 to configure a service provided to a tenant (e.g., an instantiation for an organization associated with a particular hypercube or planning model). As an example, the administrator uses administrator system 130 to communicate with query evaluator service 110 to configure the service provided to the tenant. For example, administrator system 130 may communicate with query evaluator service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for query evaluator service 110, such as one or more security policies and/or one or more compute resource policies, etc.

Data store 120 stores one or more datasets. In various embodiments, the one or more datasets comprise human resources data, financial data, organizational planning data, or any other appropriate data. In some embodiments, data store 120 stores one or more datasets for a plurality of tenants. For example, data store 120 hosts at least part of a software as a service (e.g., a database storing data for the service) for a plurality of tenants such as customers for a provider of the software as a service. In various embodiments, a tenant comprises an organization such as a company, a government entity, a sub-organization of an organization (e.g., a department), or any other appropriate organization. For example, data store 120 comprises one or more database systems for storing data in a table-based data structure, an object-based data structure, etc. In various embodiments, data store 120 comprises one or more of: a business database system, a human resources database system, a financial database system, a university database system, a medical database system, a manufacturing database system, or any other appropriate system. In some embodiments, data store 120 comprises one or more object-oriented database systems.

According to various embodiments, a user uses system 100 (e.g., a client or terminal, such as client system 140, that connects to query evaluator service 110 via network 150) to define business logic and/or to execute such business logic with respect to data (e.g., one or more datasets) stored on data store 120. For example, a user inputs to client system 140 one or more queries to be run against a dataset. In response to receiving the business logic, query evaluator service 110 uses data layer 112 (e.g., a cluster of compute resources) to execute the business logic (e.g., with respect to data stored by data store 120) and provides a result to the user (e.g., via a user interface provided on client system 140). In some embodiments, the result comprises information or a set of information that is responsive to the execution of the business logic. Query evaluator service 110 may enforce one or more security policies with respect to the result, including restricting access to certain information to which the user associated with client system 140 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a data frame, a report, and/or a sheet.

In some embodiments, data layer 112, control layer 114, and/or business application layer 116 are implemented on a single server or a plurality of servers. For example, data layer 112 and business application layer 116 are different modules running on a same server or set of servers.

Figure 2:
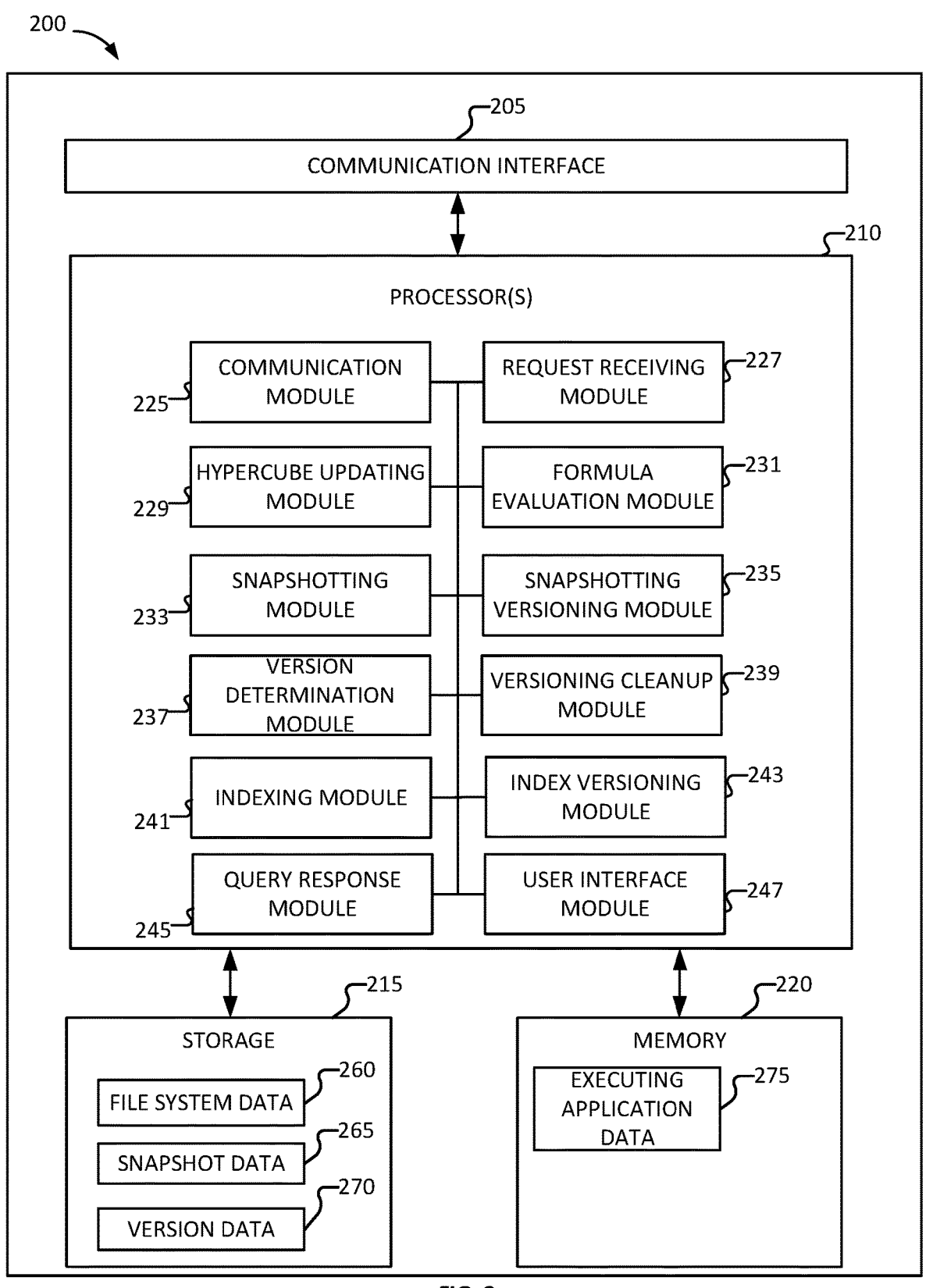
FIG. 2 is a block diagram of a system for providing a hypercube evaluation service according to various embodiments of the present application.

FIG. 2 is a block diagram of a system for providing a hypercube evaluation service according to various embodiments of the present application. In some embodiments, system 200 is implemented at least in part by system 100 of FIG. 1. For example, system 200 may correspond to query evaluator service 110. In some embodiments, system 200 implements one or more of processes 400-1900 and 2100 for FIGS. 4-19 and 21, respectively. According to various embodiments, system 200 corresponds to, or comprises, a system for processing a query against a sparsely populated hypercube, including receiving logic for a query, determining a set of locations in the hypercube at which data is expected to be stored, generating a set of calls (e.g., requests) based at least in part on the set of locations, communicating the set of calls to a service (e.g., a query evaluator service) that will query the hypercube based on the dataset, obtaining the resulting data from the set of locations, and processing the data to obtain a result for the query.

In some embodiments, system 200 maintains/manages a set of snapshots for value objects of particular locations in a hypercube and/or particular accounts. System 200 captures snapshots of the value objects based at least in part on determining that a value for the value object has changed. For example, system 200 stores a set of one or more snapshots associated with a value object that form a versioning history of the value object. In response to receiving queries, system 200 determines the applicable snapshot of a value object to obtain for a reading process that is invoked during execution of the query.

In the example shown, system 200 implements one or more modules in connection with providing a query evaluator service, such as to enable users to evaluate data on one or more data sources, such as in connection with running planning models or analyzing results across a set of planning models. System 200 comprises communication interface 205, one or more processors 210, storage 215, and/or memory 220. One or more processors 210 comprises one or more of communication module 225, request receiving module 227, hypercube updating module 229, formula evaluation module 231, snapshotting module 233, snapshotting versioning module 235, version determination module 237, versioning cleanup module 239, indexing module 241, index versioning module 243, query response module 245, and/or user interface module 247.

In some embodiments, system 200 comprises communication module 225. System 200 uses communication module 225 to communicate with various client terminals or user systems such as a user system (e.g., client system 140) or an administrator system (e.g., administrator system 130), or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks are with respect to information stored in one or more datasets (e.g., data stored in data store 120). Communication module 225 is configured to provide to various client terminals or user systems information such as information that is responsive to one or more queries or tasks requested to be executed (e.g., user interfaces comprising reports for the results). In some embodiments, communication module 225 provides the information to the various client terminals or user systems in the form of one or more data frames, reports (e.g., according to a predefined format or to a requested format), and/or via one or more user interfaces (e.g., an interface that the user system is caused to display).

In some embodiments, system 200 comprises request receiving module 227. System 200 uses request receiving module 227 to receive a query, such as from a user operating a client terminal (e.g., client system 140). In response to receiving a query, request receiving module 227 may determine a set of requests to execute in connection with obtaining a result for the query. For example, request receiving module 227 determines a set of locations in the hypercube or accounts for the hypercube that are to be accessed and creates corresponding one or more reading processes to obtain the values for such locations and/or accounts. Additionally, or alternatively, request receiving module 227 receives a request to update the hypercube, such as a request to input a value at a particular location in the hypercube or a request to update a formula used in an account.

System 200 may implement a transaction manager that is configured to create and assign a unique transaction object to every modification or set of modifications that occur with respect to the hypercube or otherwise on the system (e.g., sheet-saves or imports). Inside a single version cache, writing processes serialize with each other and therefore the transaction manager can assign a single monotonically increasing sequence number starting (e.g., a unique number, such as an integer, from 1 to N) to each transaction which denotes the logical point in time marking an "atomic" commit of the transaction. Reading processes, such as evaluator sessions, reports and sheet loads are not transactions, but transaction manager creates a logical reader object which copies over the current sequence number (e.g., latest sequence number), for example, the latest committed transaction number into their control block. According to various embodiments, system 200 (e.g., version determination module 237) guarantees that all snapshots of data that are shown to this reading process will be consistent with respect to the sequence number established in the reader control block. In some embodiments, the reading process has an associated time stamp which enables the system to know what values of the hypercube are concurrent with the time stamp associated with the reading process. One thing to note here is that the notion of "transaction time and reader time" has to be mutually consistent with each other. If the system assigned commit numbers are used, they are used for both.

In some embodiments, system 200 comprises hypercube updating module 229. System 200 uses hypercube updating module 229 to receive a request to update a hypercube, such as to update a particular location in the hypercube or an account that is based on values from the hypercube. The update to the hypercube can include insertion or deletion of a row/column, an update to a value at a particular location (e.g., a new value being input to the location), an update/modification to a formula at the particular location or account, etc.

In response to receiving the request to update the hypercube, system 200 uses the transaction manager to create a corresponding transaction record, such as a write transaction, and causes a process to be invoked to carry out the update (e.g., a writing process).

In some embodiments, in response to updating the hypercube, hypercube updating module 229 informs another module or service to propagate the update with respect to (i) a versioning of a snapshot for the corresponding location in the hypercube or account, and/or (ii) other locations or accounts that depend on the location/account being updated (e.g., a formula that includes the value of the particular location as a direct or indirect input.

In some embodiments, system 200 propagates the update to a particular location/account by updating a versioning (e.g., the versioning information stored in the anchor object for the corresponding value object) to modify the validity periods of snapshots that are impacted by the update. For example, the validity period for the most recent snapshot for a particular location subject to an update may be updated to modify the end time of the validity period to be the time at which the update was made (or when the update was requested). System 200 may additionally cause a new snapshot to be captured with the updated value/formula at the particular location and the validity period for the new snapshot may be the time at which the update was made or requested.

In some embodiments, system 200 propagates the update to a particular location/account to other accounts or locations that are dependent on the value in the particular location/account. For example, in response to receiving the update, system 200 determines a set of other locations or accounts that are dependent on the particular location/account (e.g., either directly, or indirectly through other dependencies), and causes such other locations or accounts to be updated. The versioning information for such other locations or accounts may be correspondingly updated, such as to update the validity periods of current snapshots so that their end time is set to the commit time of the transaction or force the removal of those snapshots. as found associated with the anchor object at the locations.

In some embodiments, system 200 comprises formula evaluation module 231. System 200 uses formula evaluation module 231 to evaluate formulas stored at particular locations or accounts. Formula evaluation module 231 may include causing reading processes to be invoked to obtain input values for the formula, and a formula engine that computes the result for the formula.

In some embodiments, system 200 comprises snapshotting module 233. System 200 uses snapshotting module 233 to capture snapshots of a value for value objects associated with a hypercube, such as a value at a particular location or a value for an account, etc. The snapshot may be stored in a snapshot dataset and a pointer to the snapshot may be stored (e.g., as snapshot information) in an anchor object for the value object.

In some embodiments, snapshotting module 233 captures the snapshots in response to the value for the value object being modified (e.g., a value at a particular location in the hypercube being updated, etc.). For example, system 200 causes a new snapshot to be captured and the corresponding anchor object to be updated, such as to update the snapshot information (e.g., update a snapshot chain to include a pointer to the newly captured snapshot) and/or to update the version information (e.g., to update the validity period of the new snapshot and/or the previous snapshot).

The fine-grained versions according to various embodiments are referred to as snapshots, which reside in a snapshot chain pointed to by an anchor object (e.g., snapshot information comprising pointers to snapshots in the snapshot chain). According to various embodiments, the anchor object is the primary object that is being versioned for value objects, for example, dimension containers such as splits or tuples, internal data structures which serve as containers for numeric facts entered by users (input accounts), etc.

According to various embodiments, each snapshot is a copy of the data which is created when a user either inserts, updates, or deletes at a particular location on a sheet. For example, each user action that corresponds to a change is associated with a transaction object which in turn is defined by a numeric monotonically increasing sequence number that denotes the logical commit time of the same transaction.

In some embodiments, the anchor object for a particular location/account is itself the very first snapshot that is created when a value is input for a location or account. The validity period for the very first snapshot typically has a start time of TXN.commitNumber and endTime=INF, where TXN is the transaction (sheet-save) operation which inserted the row and where INF indicates that the end time is at infinity (or that the value does not have an ending time or is valid forever). For rows that existed since eternity (e.g., were already in the database at the time the planning server starts up), the start time is set to 0.

In some embodiments, versioning for planning models is accomplished by creating copies of a data object on write. These copies are referred to as snapshots and can be stored in a snapshot dataset. Accordingly, a sequence of modifications results in a chain of snapshots with each snapshot being a copy of the datum in the earlier snapshot, but with potentially new values.

Related art systems may embed objects inside a history object that contains multiple versions of the same object. In contrast, various embodiments use the very first copy (e.g., snapshot) of the value object is chosen as an anchor and all future versions are in a data structure (e.g., typically a list or an array) that is pointed to by the anchor object. This design allows for indexing structures that reference objects of a specific type to continue to refer to and retrieve objects of the same type.

In some embodiments, in response to determining that an update or a delete is performed at a particular location, a CopyOnWriteSnapshot is created. Creation of this snapshot does two things: (i) new copy of the data is created and new values or overwritten values are recorded in this copy, and (ii) a new snapshot is created which points to this copy with bounds (e.g., a validity period) of (TXN.commit_number, INF) where TXN is the transaction doing the modification. In case of deletes, system 200 creates a new snapshot that points to NULL and this is called a delete marker. The erstwhile latest snapshot in the snapshot chain which by definition has end time=INF is modified to set the end time to TXN.commit_number (e.g., to invalidate such previous snapshot for any reading processes having a timestamp that is after the time at which the value object is updated).

In some embodiments, system 200 comprises snapshotting versioning module 235. System 200 uses snapshotting versioning module to store version information for snapshots captured by snapshooting module 233. The version information can be stored in the anchor object for the particular location/account associated with the snapshot. The version information comprises a validity period. For example, each snapshot is associated with a time range (start time, end time) that denotes its period of validity.

In some embodiments, each snapshot has an associated validity period (e.g., a validity period that starts at a start time and ends at an end time) which defines the validity period of the snapshot. As an example, the copy of data associated with the snapshot is valid for all times T such that start time<=T<end time. In some embodiments, the start time is inclusive while end time is exclusive.

According to various embodiments, a snapshot is logically defined by three characteristics: (i) a start time of the corresponding validity period, (ii) an end time for the corresponding validity period, and (iii) a pointer to a copy of the data which contains values valid for that time range. For example, system 200 stores these three characteristics collectively across the snapshot information and the version information comprised in the corresponding anchor object.

As a sequence of modifications are performed with respect to the value of a value object, system 200 stores a plurality of snapshots (e.g., as many as the number of modifications) in the snapshot chain for the value object. In some embodiments, the snapshot chain has the property that all snapshot time ranges (e.g., snapshot validity periods) form a continuous and non-overlapping set of intervals that spans the entire timeline starting from the insertion time of the location. An example of validity periods for snapshots in a snapshot chain includes (10-15), (15-33), (33-41), and (41-INF). System 200 may use the validity periods for snapshots associated with an anchor object to determine the snapshot applicable for a reading process accessing the value of the value object. For example, system 200 determines the snapshot from the set of snapshots (e.g., for a particular value object) for which the timestamp associated with the reading process (e.g., the start time of the reading process) intersects with the corresponding validity period.

In some embodiments, a snapshot that holds a calculated value (e.g., a snapshot for a value object comprising a formula) is invalidated when one of the input accounts/locations that contributes to this value is modified and the end time of the computed snapshot is INF. The invalidation may take the following forms:

If no reading processes are active at the time of the modification, system 200 can simply mark the numeric evaluated values in the snapshot to be invalid. This forces all future reader processes to re-evaluate this formula value.

If a set of one or more reading processes are active at the time of modification, one or more of the reading processes could be reading from, have read, or may shortly re-read the computed values in this location which makes invalidating the values themselves either incorrect or inefficient. Therefore, system 200 performs a logical invalidation step in which the end time of the snapshot is moved from INF to the Txn.commitNumber where Txn is the transaction object associated with the modification.

In some embodiments, system 200 comprises (snapshot) version determination module 237. System 200 uses (snapshot) version determination module 237 to determine a snapshot version that a particular reading process is to access. (Snapshot) Version determination module 237 determines a snapshot matching a reading process, such as based on the validity period of the snapshot and/or a timestamp associated with the reading process. For example, in response to determining that a reading process attempts to access/obtain a value for a particular location, version determination module 237 determines the corresponding snapshot in the snapshot chain (if any) that matches the time reading process. Version determination module 237 can determine a snapshot matching the reading process based on determining the snapshot having a validity period with which the timestamp intersects (e.g., where the timestamp is between the start time and end time of the validity period).

In some embodiments, system 200 comprises versioning cleanup module 239. System 200 uses versioning cleanup module 239 to perform a cleanup operation that deletes/purges snapshots that are no longer needed. A set of snapshots may accumulate over time and to be resource efficient system 200 can periodically (e.g., according to a predefined frequency or time period) perform a cleanup operation to delete antiquated snapshots, such as snapshots that have a validity period end time that is before the timestamp of the earliest active reading process. Additionally, or alternatively, system 200 can perform the cleanup operation in response to determining that an amount of available memory is less than a predefined memory threshold.

In some embodiments, the cleanup operation collects the snapshot chain of a history of modifications such that all snapshots no longer needed are reclaimed (e.g., deleted). In particular, when doing a calculation such as a report, there is a session associated with the calculation that is pegged to a time that equals the latest transaction commit time when the session began and regardless of how long the evaluation session runs, any data items that are visited will be "flashed back" to the time of the evaluation session. For example, when performing reads on data items involved in an aggregation or inside a formula, system 200 searches the snapshot chain for the specific version (e.g., snapshot) that is readable by the evaluation session and performs its calculations based on such a version.

In some embodiments, snapshots having an expiration time less than a timestamp associated with the earliest active reading process are cleaned up (e.g., when a snapshot end time is less than the timestamp, or read time, of any active reading process, the snapshot can be deleted). The cleanup operation is performed to ensure optimal memory usage.

In some embodiments, versioning cleanup module 239 periodically performs the cleanup operation. For example, versioning cleanup module 239 can be configured to wake up every predefined period (e.g., ten seconds). In some embodiments, versioning cleanup module 239 is configured to ensure completion of the cleanup operation within a fraction of the period (e.g., four seconds). Additionally, system 200 may enforce fairness across multiple tenants when servicing entries.

In some embodiments, versioning cleanup module 239 performs an initial "work estimation" phase in which versioning cleanup module 239 calculates the total amount of work across all version caches of all organization/tenants for which snapshots were generated. For example, system 200 may store a first container and a second container. The first container may have 3 objects with chain sizes of 3, 2 and 4 respectively. The second container may have 2 objects with chain sizes of 2 and 3 respectively. From a cleanup operation point of view, the total work in units of objects is 5 (e.g., 3 objects for the first container+2 objects for the second container=5 total objects).

The cleanup operation may run periodically at a configurable time period and in the background so as not to perturb other evaluation, import, or sheet saves running on other threads. For example, the cleanup operation can run on its own compute resource (e.g., a CPU, a virtual machine in a cluster, etc.). As an example, if the periodic interval is T=10 s, the cleanup operation attempts to ensure that its work finishes within a configurable fraction of this available time. If the acceptable fraction (f) is set to 0.5 (to allow for overflows due to inexact calculations), then it attempts to finish its work within 5 seconds (e.g., T*f).

In some embodiments, if the work estimation exceeds the fraction of time in which the cleanup operation is to complete its work, then the cleanup operation must harness the power of foregrounds so that it can itself finish its work within its assigned time budget. As an example, the time calculation is based on cycle estimate. For example, if the cycle estimate per object is 1.25 seconds, then it follows that the maximum amount of work that can be accepted by a single thread is Thread Capacity C=(T*f)/(cycles estimate per object)=5/(1.25)=4 units (or 4 objects). If the cleanup operation has a total of N=5 objects, to finish its work in the budgeted time system 200 must use 2 worker threads, and the objects that can be processed are equitably distributed across the allocated threads, such as three objects to the first thread and the remaining two objects to the second thread (OR 2 objects in the first, 3 in second OR 1 object in first, 4 in second OR 4 objects in the first, 1 in second). Multiple possibilities to distribute, but a fairness constraint is honored.

In response to determining the number of threads, and the assigned work size for each thread, the cleanup operation assigns work units (e.g., objects) from each container (e.g., objects for a particular hypercube) to the threads. In some embodiments, the cleanup operation implements a fairness algorithm in which each thread tries to divide its available capacity, such as 4 in the above example, equally among all containers (e.g., tenants, organizations, etc.). Accordingly, if system 200 has a compute resource limitation in which system 200 can launch fewer threads than the total number of required threads, system 200 ensures that an approximately equal number of objects is subject to cleanup from each container in the available time.

Using the above example, if the cycle estimates per object to two seconds (as an illustrative example) and only a single worker thread is used due to resource constraints, the total time required to service the two containers with work increases to ten seconds (e.g., 5*2=10 seconds). This total time required exceeds the allocated fraction of time (e.g., five seconds). In this case, versioning cleanup module 239 can reduce work for itself by marking as many containers as needed for foreground cleanup such that its total work falls below the allocated fraction after the containers are sorted in descending order of work sizes.

In the above example, as we iterate the containers, versioning cleanup module 239 picks the first container and marks it for foreground cleanup, which thus reduces the total work from five units to two units (e.g., 5−3=2) units which requires four seconds. This required time to complete the reduced workload is within the allocated/budgeted fraction. Thus, in the current work cycle, system 200 only works on cleanup for the second container, and the first container is subject to foreground cleanup operation cycles.

If a snapshot chain no longer has references to the anchor object (e.g., the snapshot corresponding to the anchor is purged during cleanup), then system 200 finds a live snapshot from the chain and updates the anchor object based on the live snapshot. For example, system 200 copies contents of the object pointer inside the snapshot to the anchor object, and the object pointer inside the snapshot is set to point to the anchor object. This ensures that even after a sequence of several modifications and the presence of reading processes, anchor memory is live and is not wasted. The object pointed to by the snapshot before the remap operation is no longer live and can be reclaimed by the cleanup operation because all references are removed. In some embodiments, the liveness of the anchor object is ensured via a remap. For example, consider a snap chain with Anchor A=10, Snap 1 (PTR, 0-1, 11) Snap2 (PTR', 1-INF, 12). The value of the anchor is 10, PTR is 11, PTR' is 12. The remap can choose one of Snap1 or Snap2 for the remap. In our implementation the snap with latest end time is chosen, so PTR'/snap2. After the remap the state is essentially Anchor A=12, Snap 1 (PTR, 0-1, 11) Snap2 (A, 1-INF, 12). Notice that Snap2 now points to anchor (it has become live) while earlier no snap was pointing to anchor. Further the contents of anchor have changed from 10 to 12.

In general, a value object at a particular location may get modified several times. However, system 200 enters a quiescent period where the only values for the value object needed are those from the latest snapshot. For example, all previous snapshots by definition will be expired (e.g., because all active reading processes would have a read time, or associated timestamp, that is greater/later than the end time of those snapshots). In some embodiments, system 200 deems the latest live snapshot (e.g., having an end time set to INF) as still live and has a start time which is older than the read time of all active reading sessions (i.e., is readable by all existing and future readers). In this case, versioning cleanup module 239 can perform a collapse optimization which "fuses" the latest live snapshot with the anchor object and once the fusion is done the chain pointer inside the anchor object is set to NULL and the memory overhead of the chain disappears. In some embodiments, in response to a current snapshot being the only remaining snapshot and the current snapshot is readable by all readers, the system collapses the anchor object.

In some embodiments, system 200 comprises indexing module 241. System 200 uses index versioning module 243 to generate or maintain one or more indexes from a dimension value(s) to a set of tuple objects satisfying the corresponding dimension value. These indexes can be useful when servicing or evaluating formulas with predicates, such as ACCT.A[region='US']. In such an example, system 200 identifies all tuples which have US for the region dimension and include those tuples in the calculation by obtaining the value of account A.

Some related art systems evaluate account A by iterating all tuples that have values for account A (e.g., ACCT.A) and evaluating "region="US" separately. Such a process is inefficient due to the repeated predicate evaluation, particularly if the number of tuples is relatively high (e.g., in the millions).

Various embodiments create and maintain an index between dimension values to a set of tuples matching that dimension value. In connection with evaluating account A, system 200 can perform a lookup for region='US' in a dedicated index for the region dimension. The lookup may return a tuple set. The tuple set is typically returned as a bit set in which each bit corresponds to the tuple identifier of a satisfying tuple.

In some embodiments, because the system implements a multi-versioning of data for a hypercube, when performing the lookup against the index for a tuple set, system 200 can perform an additional validity check on the tuple. For example, system 200 determines whether the tuple is valid for the timestamp associated with the reading process. If the tuple is determined to be valid for a particular reading process, the tuple is included in the calculation (e.g., the computation of account A in the example above). Conversely, if the tuple was determined to not be valid for the reading process, system 200 excludes the tuple in performing the calculation (e.g., the computation of account A in the example above). System 200 may determine that the tuple is not valid for a particular reading process based on a determination that the tuple was deleted prior to the timestamp associated with the particular reading process (e.g., the start of the reading process). Additionally, system 200 may determine that the tuple is not valid for a particular reading process in response to determining that the tuple was inserted after the timestamp associated with the reading process (e.g., the duple was inserted after the reading process was started).

The foregoing example assumes that tuple dimensions do not change after creation, and the only operations permitted on the tuple are insertion and deletion. According to various embodiments, the dimension values for a tuple can be modified potentially several times. Examples are tuples which exist at specific cube locations, such as rows on a configurable modeled sheet. For a hypercube, system 200 may store multi-dimensional indexes that map from dimension values (e.g., Region=US) to a bit-set of tuples (e.g., tuple identifiers) that correspond to the tuple locations that satisfy that dimension value. A multi-dimensional index can map dimension values to a collection of rows inside a model that have the corresponding value for that dimension.

Without such an index, the system would have to run a report or perform a calculation that involves aggregation of a certain account for a particular dimension value or set of dimension values, and the system would have to retrieve all records from that cube or model regardless of whether it is useful or not useful and evaluate the dimension value for every such tuple which makes determining the more expensive.

As an illustrative example, if a model has ten rows with a single dimension region such that rows 1,4,5 have dimension value LA; rows 2,6 have dimension value CO; and rows 3,7,8,9,10 have dimension values NY. According to various embodiments, for such an example the bitmap index has three entries, such as one for each dimension value that exists in the model (e.g., a first entry for value "LA", a second entry for value "CO", and a third entry for value "NY"). System 200 can store a list in association with (e.g., attached to or within) each entry in which the list denotes the locations that correspond to that particular dimension value. For example, the list identifies the set of row identifiers that correspond to the dimension value associated with the entry.

Using the example above, system 200 can represent the first entry for value "LA" as {1,4,5} or as a bitset [1001100000]. System 200 can represent the second entry for value "CO" as {2,6} or as a bitset [0100010000]. System 200 can represent the third entry for value "NY" {3,7,8,9,10} or as a bitset [0010001111].

In some embodiments, indexing module 241 creates a new virtual tuple every time the dimensionality changes for one or more tuples (e.g., which essentially denotes a new incarnation of an existing tuple, albeit with modified dimension values). Each virtual tuple is a light weight object with a pointer to the original tuple and having a corresponding validity period (e.g., a built-in validity period defined by (start time, end time)). The validity period denotes the time interval for which the tuple is valid and readable. In some implementations, the validity period is precisely the time period over which the virtual tuple has the dimension values as of the time of its creation.

In some embodiments, system 200 comprises indexing versioning module 243. System 200 uses indexing versioning module 243 to determine a particular virtual tuple that matches a reading process querying an index for tuples responsive to a desired dimensional value. For example, indexing versioning module 243 determines a virtual tuple that matches the reading process. A virtual tuple matching a reading process may be determined based at least in part on the validity period for the virtual tuple and a timestamp associated with the reading process (e.g., a start time for the reading process). In some embodiments, the indexing versioning module 243 determines the virtual tuple(s) having a validity period with which the timestamp for the reading process intersects.

In some embodiments, system 200 assigns distinct identifiers to the virtual tuples. System 200 can use the distinct/unique identifiers for virtual tuples to ensure that the different incarnations of a row with distinct dimension values can be identified separately and that indexes can point to a specific incarnation which corresponds to a specific dimension value.

In some embodiments, dimension values (e.g., "SF" or "LA" for a region, etc.) contain those virtual tuple identifiers that match that dimension value. These may include multiple virtual tuples from the same underlying container row or across different rows.

When a reading process is querying the index for tuples (or virtual tuples) matching a particular dimension value, index versioning module 243 performs a match on a specific dimension value. Performing the match on the specific dimension value includes retrieving the list of matching tuple identifiers (e.g., virtual tuple identifiers) from the bitmap index for that dimension value. For each matching virtual tuple identifier, index versioning module 243 performs a validity check, such as to confirm that the corresponding virtual tuple is valid for the particular reading process (e.g., the virtual tuple has a validity period that intersects with the timestamp for the reading process, or that the timestamp is between the start time and the end time for the validity period).

In some embodiments, system 200 comprises query response module 245. System 200 uses query response module 245 to aggregate the data obtained for the set of requests to obtain a response to the query.

In some embodiments, system 200 comprises user interface module 247. System 200 uses user interface module 247 in connection with configuring information (or the display thereof) to be provided to the user such as via client system 140 and/or administrator system 130 of system 100.

In some embodiments, user interface module 247 configures a user interface to be displayed at a client system, such as an interface that is provided in a web browser at the client system. User interface module 247 may configure a user interface via which a query may be input. In some embodiments, user interface module 247 configures a user interface to provide a response to the query, such as by providing one or more reports of information that is responsive to a query or task executed with respect to the source dataset(s) (e.g., a query or task executed against data stored on data store 120).

According to various embodiments, storage 215 comprises one or more of file system data 260, snapshot data 265, and/or version data 270. Storage 215 comprises a shared storage (e.g., a network storage system). In some embodiments, file system data 260 comprises a database such as one or more datasets (e.g., one or more datasets for one or more tenants, etc.). File system data 260 comprises data such as a dataset for historical information pertaining to user activity, a human resources database, a financial database, etc. In some embodiments, snapshot data 265 a snapshot dataset of a set of snapshots for one or more value objects associated with a hypercube. The set of snapshots associated with a particular value object may include a versioning of the value for the value object. In some embodiments, version data 270 comprises version information for the set of snapshots stored in the snapshot dataset. For example, version data 270 comprises respective validity periods for the set of snapshots. Version information for a particular snapshot of a value object may be stored in an anchor object for the value object. The anchor object may be stored within the value object.

According to various embodiments, memory 220 comprises executing application data 275. Executing application data 275 comprises data obtained or used in connection with executing an application such as an application executing on a tenant. In some embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figures 3A, 3B:
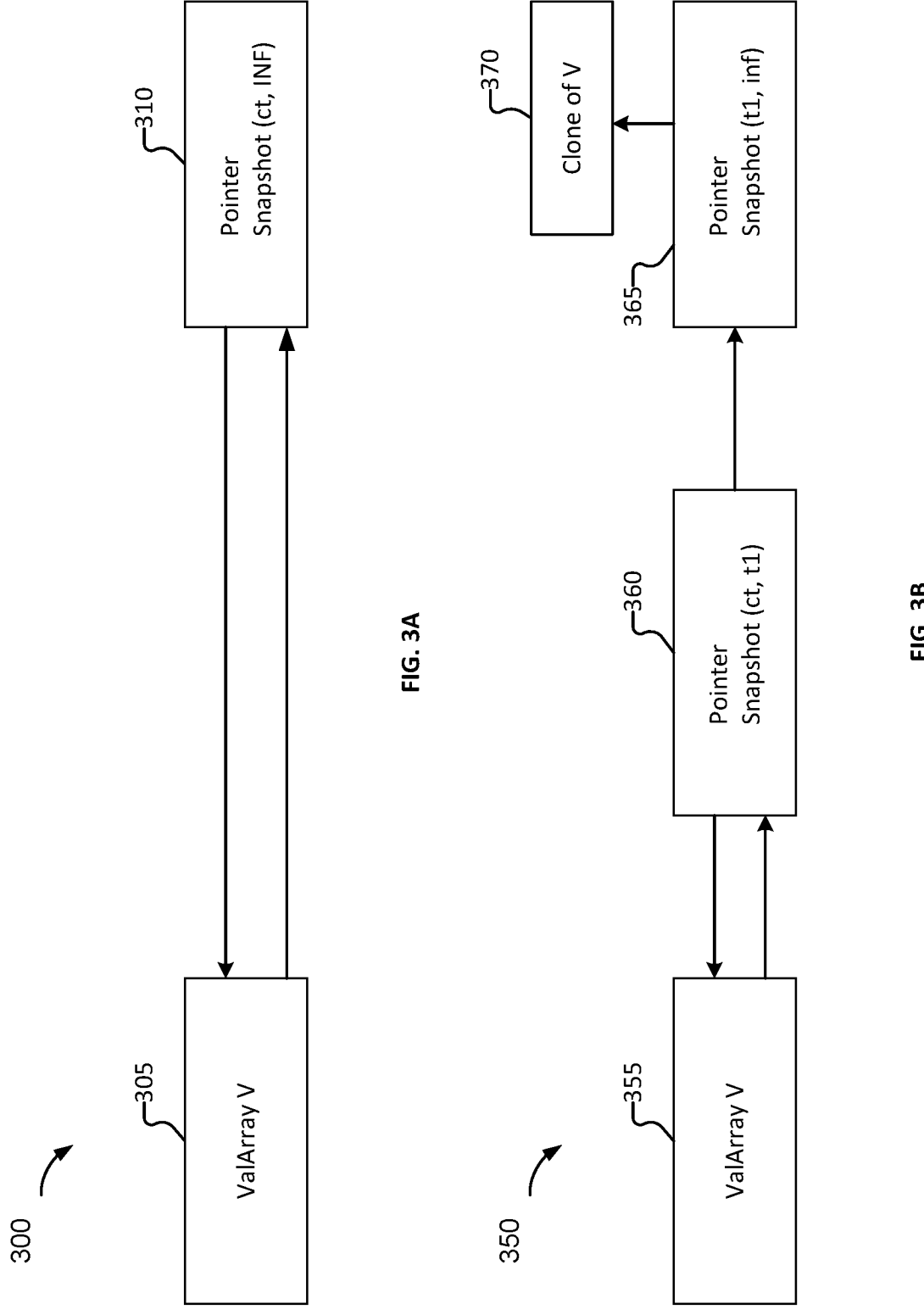
FIG. 3A illustrates an example of a version for a value at a particular location in a hypercube according to various embodiments of the present application.
FIG. 3B illustrates an example of a set of versions for a value at a particular location in a hypercube according to various embodiments of the present application.

FIG. 3A illustrates an example of a version for a value at a particular location in a hypercube according to various embodiments of the present application. In the example shown, system 300 (e.g., a system storing a hypercube) comprises value object 305 for the hypercube and an associated snapshot. System 300 stores may store snapshot information (e.g., a pointer to the snapshot) and version information (e.g., a validity period for the snapshot) in association with value object 305. For example, system 300 stores the snapshot information and version information as entry 310 in an anchor object for value object 305 (e.g., a particular location in the hypercube). As illustrated, entry 310 corresponds to the first snapshot captured for value object 305, such as at the time of creation. The validity period can be denoted as (creation time, INF) (e.g., INF may indicate that the snapshot is indefinitely/infinitely valid until an event invalidates the snapshot).

FIG. 3B illustrates an example of a set of versions for a value at a particular location in a hypercube according to various embodiments of the present application. In the example shown, system 350 stores a plurality of entries of snapshot information and version information for value object 355. For example, entry 360 and entry 365 are stored in association with value object 355, such as in an anchor object for value object 355. The anchor object may store entry 360 and entry 365 as a snapshot chain that indexes a set of snapshots for the value object 355. In response to a second snapshot being captured (e.g., the snapshot associated with entry 365), system 350 updates the validity period for entry 360 to have an end time that corresponds to the start time of the second snapshot (e.g., the time at which the value for value object 355 was updated and gave rise to the capturing of the second snapshot). As illustrated, the pointer stored as snapshot information in entry 365 points to snapshot 370, which may be a clone of value object 355 (e.g., taken at time t1). In this example, it is a clone of the previous version which in this case is the anchor. The idea is that the previous version is cloned, and then applies the edits on top of the cloned version since the object is an array of values matching time, and the user may only edit a subset of the array values.

FIG. 3C illustrates an example of a set of versions for a value at a particular location in a hypercube according to various embodiments of the present application. The example shown illustrates a snapshot chain for a particular value object after a snapshot has been deleted, such as via a cleanup operation. As illustrated, system 375 stores value object 380 and associated snapshot information and version information for snapshots. The anchor object for value object 380 comprises entry 382 for a first snapshot having a validity period of creation time to t1; entry 384 for a second snapshot having a validity period of t1 to t2; an entry for a third snapshot having a validity period of t2 to t3; and entry 388 for a fourth snapshot (e.g., a current or most recent snapshot) having a validity period of t3 to INF (e.g., indefinite until the snapshot is invalidated based on an event such as an update to value object 380). In the example shown, if the third snapshot is deleted, such as during a cleanup operation, the entry for the third snapshot may be set to NULL for the time period between the end time of the second snapshot and the start time of the fourth snapshot. In some embodiments, it is possible that there are old readers in the system—for example, with read time<t1, between t1 and t2 and between t2 and t3—which need to retain access to all the snapshots in the chain including 382, 284 and 386 so that entry 382 and 384 remain in place and are not deleted. The rule for GC deletion of snapshots remains unchanged with delete markers. The system can only delete a snapshot whose end time<MIN (reader start time of all active readers).

In some embodiments, if the system has a delete and no subsequent re-insertion, the latest version in the chain would be NULL. This would indicate that the entity such as a split is deleted.

According to various embodiments, the system may store various types of snapshot chains. Examples of types of snapshot chains are input chains and formula chains.

Figures 4A, 4B:
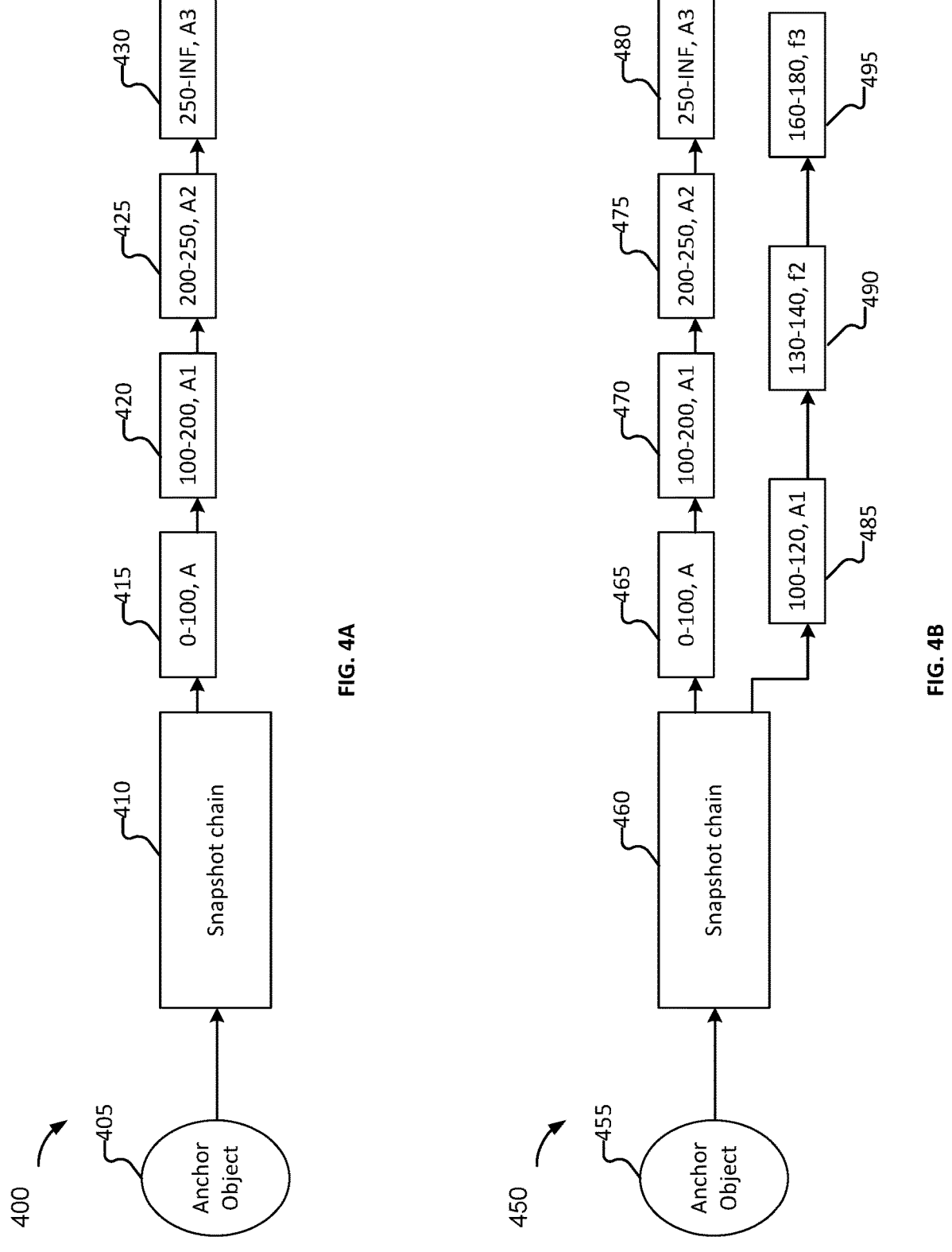
FIG. 4A illustrates an example of an anchor object for a particular location in a hypercube according to various embodiments of the present application—in particular when the location corresponds to a user entered values such as numeric facts at a leaf input account entered on a sheet.
FIG. 4B illustrates an example of an anchor object for a particular location in a hypercube according to various embodiments of the present application—in particular when the location corresponds to a leaf account, which can include a mix of user entered numeric facts and user entered formulas.

FIG. 4A illustrates an example of an anchor object for a particular location in a hypercube according to various embodiments of the present application—in particular when the location corresponds to a user entered values such as numeric facts at a leaf input account entered on a sheet. In the example shown, system 400 stores snapshot chain 410, which corresponds to an input chain. For an input chain, each snapshot in an input value object is created by a user action such as a write to a particular location Write. As an example, bounds for versions of snapshots may be: (0-100, A); (100-200, A1) (200-300, A2) (300-INF, A3), where A, A1, A2, and A3 correspond to the value for a value object (e.g., at a particular location) for different snapshots. The foregoing example assumes that four different writes happen in sequence at commit times of creation time, 100, 200, and 300 respectively. Note that end time=INF (last snapshot) indicates it is the current (latest version). Note also that the very first snapshot (0-100, A) has a pointer value which is identical to the anchor.

In the example shown, system 400 stores anchor object 405 for a particular value object, such as a particular location or account for a hypercube. Anchor object 405 comprises snapshot chain 410, which may be an index of all (existing) snapshots for the particular value object. Snapshot chain 410 may comprise entry 415 corresponding to a first snapshot, entry 420 corresponding to a second snapshot, entry 425 corresponding to a third snapshot, and entry 430 corresponding to a fourth snapshot. Entry 415 comprises a pointer to the first snapshot having a value A and version information indicating that the first snapshot is valid from the time of creation until a write of value A1 to the value object at time=100. Entry 420 comprises a pointer to the second snapshot having a value A1 and version information indicating that the second snapshot is valid from the time=100 when A1 was written to the value object and until a write of value A2 to the value object at time=200. Entry 425 comprises a pointer to the third snapshot having a value A2 and version information indicating that the third snapshot is valid from the time=200 when A2 was written to the value object and until a write of value A3 to the value object at time=250. Entry 430 comprises a pointer to the fourth snapshot having a value A3 and version information indicating that the fourth snapshot is valid from the time=250 when A3 was written to the value object and indefinitely remains valid (e.g., end time=INF) until an event, such as an update to the value object, causes the fourth snapshot to be invalidated. The fourth snapshot corresponds to the current and most recent snapshot.

FIG. 4B illustrates an example of an anchor object for a particular location in a hypercube according to various embodiments of the present application—in particular when the location corresponds to a leaf account, which can include a mix of user entered numeric facts and user entered formulas. In this case, the snapshot chain is an INPUT-COMPUTED chain type with separate chains for input snapshots and computed snapshots as shown in diagram. In the example shown, system 400 stores snapshot chain 450, which corresponds to an account location that can contains both numeric user entered values like 345 and also user entered formulas in some time slots. Such a chain can be referred to as a Hybrid-Input chain or a User-Formula-Chain. User-Formula chains correspond to chains in which there are derived accounts and locations (e.g., F=A+B+C) which are not input values (e.g., user entered values), but are calculated by a reading process (report) when those locations are requested, in addition to user entered raw fact values. In this case, a snapshot is created by a reader process contemporaneous (e.g., in real-time) with accessing the value at that location. According to various embodiments, the validity period (e.g., the start time and end time) for a derived location is determined by the intersection of the snapshot validity periods of all input terms and accounts that are visited during the evaluation of the formula. For example, the validity period for a value derived from a formula is the intersection of all validity periods for input values on which the formula directly or indirectly depends.

An input-computed chain corresponds to a chain for which the value object had an input value for certain times and a value derived from a formula for other times. For example, a value object may have a user formula of acct A=U+10 for time slot month=November, but has a numeric fact (e.g., a user-entered value) for all other months.

According to various embodiments, for input-computed chains, input snapshots are generated as before and correspond to user-initiated changes in which numeric facts and possibly raw unevaluated formulas are entered via a UI. For example, we can have snapshots (0-100, Anchor) (100-200, Pointer 1) (200-250, Pointer 2) (250-INF, Pointer 3) corresponding to initial creation at time 0, and modifications at times 100, 200 and 250. Referring to FIG. 4B, pointer 1 in the above example points to a snapshot for which the value object has value A1, pointer 2 points to a snapshot for which the value object has value A2, and pointer 3 points to a snapshot for which the value object has value A3. Accordingly, system 450 stores an anchor object 455 comprising snapshot chain 460. In the example shown, snapshot chain comprises an input chain comprising entry 465 (validity period of 0-100), entry 470 (validity period of 100-200), entry 475 (validity period of 200-250), and entry 480 (validity period of 250-INF).

FIG. 4B illustrates another example of a snapshot chain in which the chain comprises sub-versions of the value object between time 100-200. The snapshot chain is defined by entry 485, and entry 490, and entry 495. For entry 485 (during validity time of 100-120), the value object has a value of A1. For entry 490 (during validity time of 130-140), the value object has a value f2 derived from evaluating a formula. The validity period for entry 490 is determined based on an intersection of validity periods of the direct and indirect input values for evaluation of the formula. For entry 495 (during validity time of 160-180), the value object has a value f3 derived from evaluating a formula. The validity period for entry 495 is determined based on an intersection of validity periods of the direct and indirect input values for evaluation of the formula. In the example shown, snapshot chain 460 comprising entry 485, and entry 490, and entry 495 may be discontinuous such that no snapshot is valid during the time 140-160, which may be because there was no reader with a read time between 140 and 160, and thus no such snapshot was ever needed to be created The separate computed-chain (list) comprising entries 485-495 tracks "sub-versions" corresponding to evaluated formulas. For example, the input version (100-200) can "have" sub-versions corresponding to updates to the value object which is the term account of the formula (COMP: 100-120, A1) (COMP: 130-140, F2) and (COMP: 160-180, F3). The computed list need not span to give a complete time range (note the gaps from 140 to 160) and (180 to 200).

The computed versions are created by reading processes on demand. In the example shown, the computed snapshots corresponding to entries 485-495 could have been created by three different reading processes running at read times 110, 135 and 170 respectively. As shown in entry 485, the computed snapshot carries over (inherits) user entered (input valued) time slots from the source version when they are created. In the computed chain illustrated in FIG. 4B, exactly one of the computed snapshot that overlaps or intersects with an input snapshot is allowed to reuse the same object (for its pointer) as the input snapshot it inherits from. For example, as shown the snapshot for entry 485 from 100-120 in the computed chain was created first and hence it was able to reuse the pointer/object A1 that the corresponding input snapshot (e.g., entry 470) pointed to. The other computed snapshots (e.g., for entries 490 and 495) in the 100-200 input snapshot time range must create a separate copy of the object (f2 and f3 respectively) because the formula values computed in those time ranges will be different. Note in FIG. 4B, the arrows showing that the computed snapshots 485, 490 and 495 all point to the input snap 470.

In some embodiments, reading processes will always look in computed chain first to determine whether the snapshot chain stores a snapshot matching the reading process. Performing a lookup with respect to the computed chain minimizes formula evaluation. For example, using the example shown in FIG. 4B, a reading process having an associated timestamp of 135 will find version corresponding to entry 490 (e.g., the object value having a value f2) matches the reading process and that the previously computed formula values are valid. Conversely, for a reading process having a timestamp of 185, the system checks the computed chain and determines that the computed chain does not comprise a matching snapshot (e.g., the last snapshot had a validity period that ended at 180). For a reading process for which the computed chain does not have a matching snapshot, the system falls back to using the "matching" input version (100-200) corresponding to entry 470 in the input chain. Because the formula values are invalid for this reading process, the fact that the reading process obtained a pointer to an input-snapshot as opposed to a computed-snapshot (and if it contains evaluated formula values) indicates that the reading process needs to create a local private copy of this version and invalidate formula cells.

In some embodiments, the anchor object is used for a location including a mix of numeric facts and/or formulas (e.g., a location storing or containing numeric fact(s) and/or formula(s)) that entails the creation of a hybrid input-computed chain object which has separate inner chains for user entered values (pure-input) and for reader generated snapshots for derived values (computed-chain).

In some embodiments, the system executes a method for a reader that, in response to a search, prioritizes the computed chain, and finding a matching snapshot returns it. In the absence of a matching snapshot in the computed chain, the method for the reader, in response to a search, that picks a matching snapshot from the input chain (should one exist) and evaluates the formula and adds (creates) a new snapshot in the computed chain. For example, the processor of the system is further configured to search for a matching snapshot comprising (a) first searching a computed chain and in response to finding a matching snapshot, returning the matching snapshot, and (b) second, in the absence of a matching snapshot in the computed chain, searching an input chain, and in response to finding a matching snapshot in the input chain, evaluating a formula and adding a new snapshot in the computed chain.

FIG. 5 illustrates an example of validity periods for a particular location comprising a formula to be evaluated according to various embodiments of the present application. In the example shown, system 500 performs a series of transactions (e.g., write operations) with respect to a hypercube, specifically with respect to object value A 505 and object value B 530. As illustrated, at time=0, a first transaction is performed with respect to object value A 505; at time=10, a second transaction is performed with respect to object value B 530; at time=20, a third transaction is performed with respect to object value A 505; at time=30, a fourth transaction is performed with respect object value B

530; at time=40, a fifth transaction is performed with respect object value A 505; at time=50, a sixth transaction is performed with respect object value B 530; and at time=60, a seventh transaction is performed with to both object value A 505 and object value B 530.

In some embodiments, a value object comprises the anchor object. The anchor object stores snapshot information and version information for the snapshots associated with anchor object. The version information can store the validity period for the associated snapshot. The validity periods can be determined based at least in part on a time at which the corresponding value object is updated.

For the example shown in FIG. 5, system 500 stores a snapshot chain for object value A 505. In particular, the snapshot chain comprises snapshot information for a set of snapshots of object value A 505: first snapshot 510, second snapshot 515, third snapshot 520, and fourth snapshot 525. The snapshot chain may be comprised in an anchor object for value object A 505. System 500 stores version information in association with the snapshots 510-525. In the example shown, the version information is stored as validity period for the snapshots 510-525, such as a first validity period of t=0 to t=20 for first snapshot 510; a second validity period of t=20 to t=40 for second snapshot 515; a third validity period of t=40 to t=60 for third snapshot 520; and fourth validity period of t=60 to t=INF for fourth snapshot 525. The end time for each of the validity periods corresponds to the time at which value object A 505 is modified next. For example, the end time for first snapshot 510 is t=20, which corresponds to the time at which value object A 505 is written by third transaction at t=20. Similarly, the start time for the second snapshot 515 is t=20.

Further as illustrated, system 500 stores a snapshot for value object B 530. In particular, the snapshot chain comprises snapshot information for a set of snapshots of object value B 530: first snapshot 535, second snapshot 540, third snapshot 545, and fourth snapshot 550. The snapshot chain may be comprised in an anchor object for value object B 530. System 500 stores version information in association with the snapshots 535-550. In the example shown, the version information is stored as validity period for the snapshots 535-550, such as a first validity period of t=10 to t=30 (e.g., corresponding to the time at which the value of value object B 530 is valid after the second transaction at t=10) for first snapshot 535; a second validity period of t=30 to t=50 (e.g., corresponding to the time at which the value of value object B 530 is valid after the second transaction at t=30) for second snapshot 540; a third validity period of t=50 to t=60 (e.g., corresponding to the time at which the value of value object B 530 is valid after the second transaction at t=50) for third snapshot 545; and fourth validity period of t=60 to t=INF (e.g., corresponding to the time at which the value of value object B 530 is valid after the second transaction at t=60) for fourth snapshot 550. The start time for each of the validity periods corresponds to when value object B 530 is updated to have a particular value and the end time for each of the validity periods corresponds to the time at which value object B 530 is modified next.

In some embodiments, system 500 computes values that are dependent on one or more other values (e.g., values obtained from other locations or accounts). In the example shown, a value for account C is based on account A and account B (e.g., account C=account A+account B). Accordingly, the system obtains the applicable snapshots for account A and account B to determine the value for account C. In some embodiments, the validity period for a snapshot of a value object for which the value is computed based on a value(s) for one or more other value objects is determined based at least in part on an intersection of the respective snapshots used to compute the value. For example, system performs special handling for derived objects (e.g., a formula F=A+B) because their snapshots are created by reading processes and their validity period is determined based on the intersection of validity periods of all terms that are visited during the computation of the formula value.

In some embodiments, formula versions (e.g., snapshots) for value objects for which the value is determined based on a formula are created when a reading process computes the formula in a particular timeslot (e.g., a timeslot) of a location (e.g., plan, dimension-list, etc.) of an account that is calculated. According to various embodiments, formula snapshots have three important properties: a validity period, a reusability, and an invalidability.

In contrast to user input values that in various embodiments begin with a validity-range of (N, INF) where N is the end time of the previous snapshot in the chain, the validity period of formula snapshots is dynamic and is the intersection of all input terms visited in the computation of the formula value.

The computed values obtained for formula version can be cached and reused for all future readers if the validity end time of a snapshot can be determined to be infinity (e.g., INF or indefinite). Such snapshots are referred to as current snapshots. Formula snapshots with non-infinite end times are still usable and cached with the restriction that they are only valid for readers with read time<the snap end time (e.g., that by definition these are past readers or long running readers that started a while ago).

When a value of an account that participates (is a term) in the formula (e.g., an account or location on which the formula depends), any current snapshots will either be contemporaneously (e.g., immediately) invalidated (e.g., all computed values are marked invalid) or if there active reading processes exist, the end time of the snapshot is set to the sequence number (e.g., the commit number) of the invalidating transaction. In some embodiments, a current snapshot of a formula account is invalidated in response to a determination that a value for a value object (e.g., a location in the hypercube, an account, etc.) on which the formula account directly or indirectly depends has changed.

When computing formulas, the system determines a begin time for the formula version based on a determination of a last included commit for all intermediate value objects (e.g., valArrays) visited (e.g., used to compute the resulting value from evaluating the formula). The maximum of the last included commit determines the begin time of the formula version (e.g., the start time for the validity period of the formula version). Similarly, the system determines an end time based on a determination of the end time of all snapshots (e.g., versions) of value objects visited. This is also equivalent to the first excluded commit across all visited terms. The minimum time value across the set of end times for all snapshots visited (e.g., used in computing the formula) is deemed to be the end time of the formula version. In some embodiments, the validity period for the formula version is determined as the intersection of all validity periods for the applicable snapshots for all object values on which the formula depends directly or indirectly. The intersection of validity ranges of formula terms is equivalent to the (lastIncludedCommit, firstExcludedCommit) range shown previously. If all snapshots for the value objects on which the formula depends have an end that is infinite (e.g., end time=INF), then the formula version (e.g., the snapshot of the value resulting from evaluation of the formula) is set as the current formula version (e.g., the end time for the formula version is also end time=INF).

In the example shown, a formula version is computed by reading process 555. Reading process 555 has a timestamp=35. The formula is account C=account A+account B. Because reading process 555 for which the formula is being computed has a timestamp=35, reading process 555 obtains the applicable snapshots for account A (e.g., value object A 505) and account B (e.g., value object B 530). For example, reading process 555 obtains second snapshot 515 having a validity period with which the timestamp for reading process 555 intersects. Similarly, reading process 555 obtains second snapshot 540 for account B based on the intersection of its validity period with the timestamp for reading process 555. In response to obtaining the applicable values (e.g., snapshots) for account A and account B, reading process 555 evaluates the formula and returns the value for account C. The system can capture account C snapshot 560 based on the value computed by reading process 555. The validity period for account C snapshot 560 has a start time of t=30 and an end time of t=40. For example, the validity period for account C snapshot 560 is the intersection of second snapshot 515 and second snapshot 540.

Similarly, in the example shown, the formula version is computed by reading process 570. Reading process 570 has a timestamp=75. The formula is account C=account A+account B. Because reading process 570 for which the formula is being computed has a timestamp=35, reading process 570 obtains the applicable snapshots for account A (e.g., value object A 505) and account B (e.g., value object B 530). For example, reading process 570 obtains fourth snapshot 525 having a validity period with which the timestamp for reading process 570 intersects. Similarly, reading process 570 obtains fourth snapshot 550 for account B based on the intersection of its validity period with the timestamp for reading process 570. In response to obtaining the applicable values (e.g., snapshots) for account A and account B, reading process 570 evaluates the formula and returns the value for account C. The system can capture account C snapshot 575 based on the value computed by reading process 570. The validity period for account snapshot 575 has a start time of t=60 and an end time of t=INF. For example, the validity period for account C snapshot 575 is the intersection of fourth snapshot 525 and fourth snapshot 550. In this case note that formula snapshot 575 is a current snapshot since its end time is INF and is valid (readable) for all future readers that enter the system.

In some embodiments, formula chain C 580 points to snap1 with anchor and time range 585 with start time 30 and end time 40, which points to snap2 with pointer (PTR) and time range 590 with start time 60 and no end time (e.g., end time of INF). This shows the computed chain for C whose two snaps were generated by readers at times seq=35 and seq=75, respectively.

Invalidations of a formula version (e.g., a snapshot of a result from evaluating the formula) are associated with the transaction commit time to an input value object on which the formula depends. Thus, the current snapshot is always invalidated in response to determining that a value object on which the formula depends has changed.

If there is an active reading process working on the current formula version that is invalidated as a result of a change to an input value object, the system sets end time=invalidating txn.commit_number. Old readers can still use the computed value of the formula. Newer readers will have a read time>=invalidating_txn.commit_number so they will not be able to use the value and will need to compute a new one.

In some embodiments, the time uses a sequence number instead of the commit number (e.g., txn.seq instead of txn.commit_number). In some embodiments, the sequence number and commit number are identical and used interchangeably. For example, the transaction manager assigns a monotonically increasing sequence number to every new transaction, and this is the commit number of the transaction.

A formula such as F=F1+F2 where F1=A+B and F2=C+D, forms a tree where F is at the top level, F1, F2 are the second level and A, B, C, D are at the third level. In various embodiments, the system performs a recursive computation where the system (e.g., the reading process) performs a calculation at each level of the tree (and returns the resulting value). The values are computed by visiting the terms bottom-up and the value at each level is calculated from the result values of the terms at the next child level. Similarly, the system implements a recursive computation of the validity period. The system creates an object at each level of the tree which comprises the validity period for the term computed at that level. The system then implements the bottom-up computation style where the validity periods from terms at the immediate child level are intersected to calculate the validity period for the current level.

Figure 6:
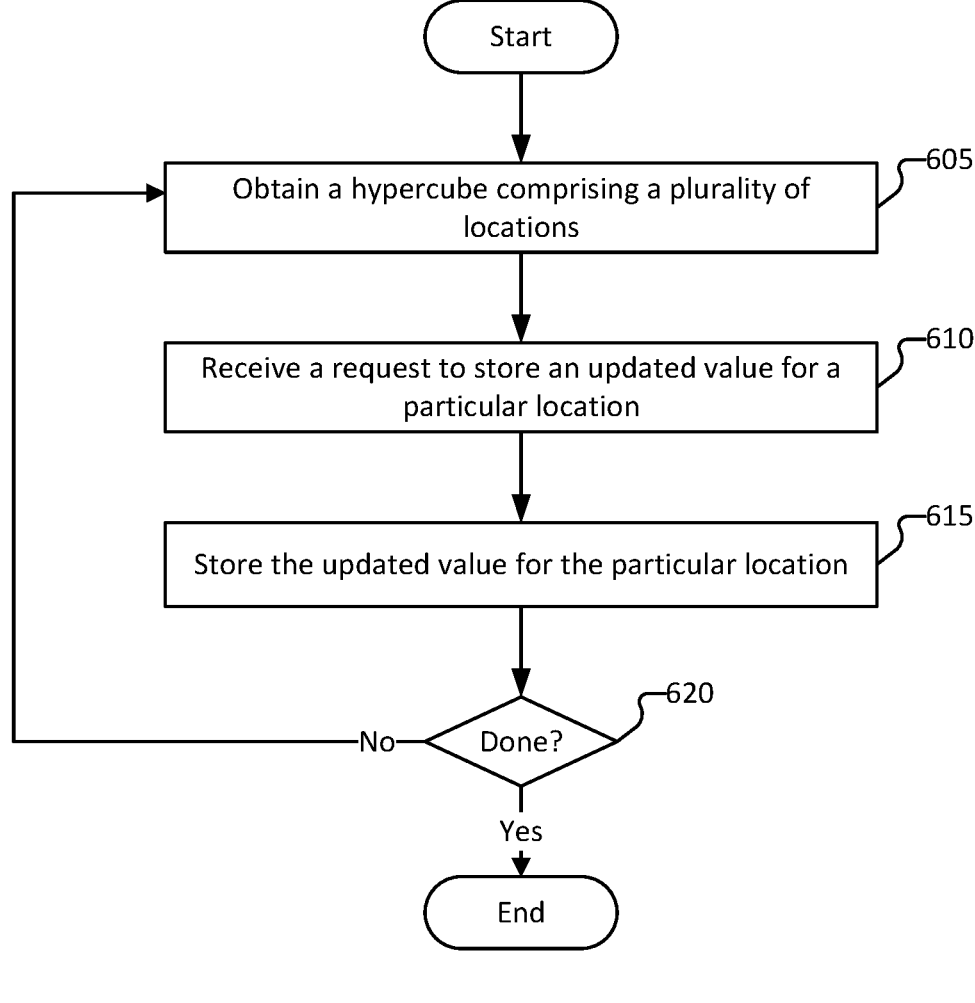
FIG. 6 is a flow diagram of a method for updating a hypercube according to various embodiments of the present application.

FIG. 6 is a flow diagram of a method for updating a hypercube according to various embodiments of the present application. In some embodiments, process 600 is implemented at least in part by system 100 of FIG. 1 and/or system 200 of FIG. 2.

At 605, the system obtains a hypercube comprising a plurality of locations.

At 610, the system receives a request to store an updated value for a particular location.

At 615, the system stores the updated value for the particular location.

At 620, a determination is made as to whether process 600 is complete. In some embodiments, process 600 is determined to be complete in response to a determination that no further values are updated, no further updated values are to be propagated to corresponding anchor objects, no further validity periods for snapshots are to be updated based on the updating of the updated value, a user has exited the system, an administrator indicates that process 600 is to be paused or stopped, etc. In response to a determination that process 600 is complete, process 600 ends. In response to a determination that process 600 is not complete, process 600 returns to 605.

Figure 7:
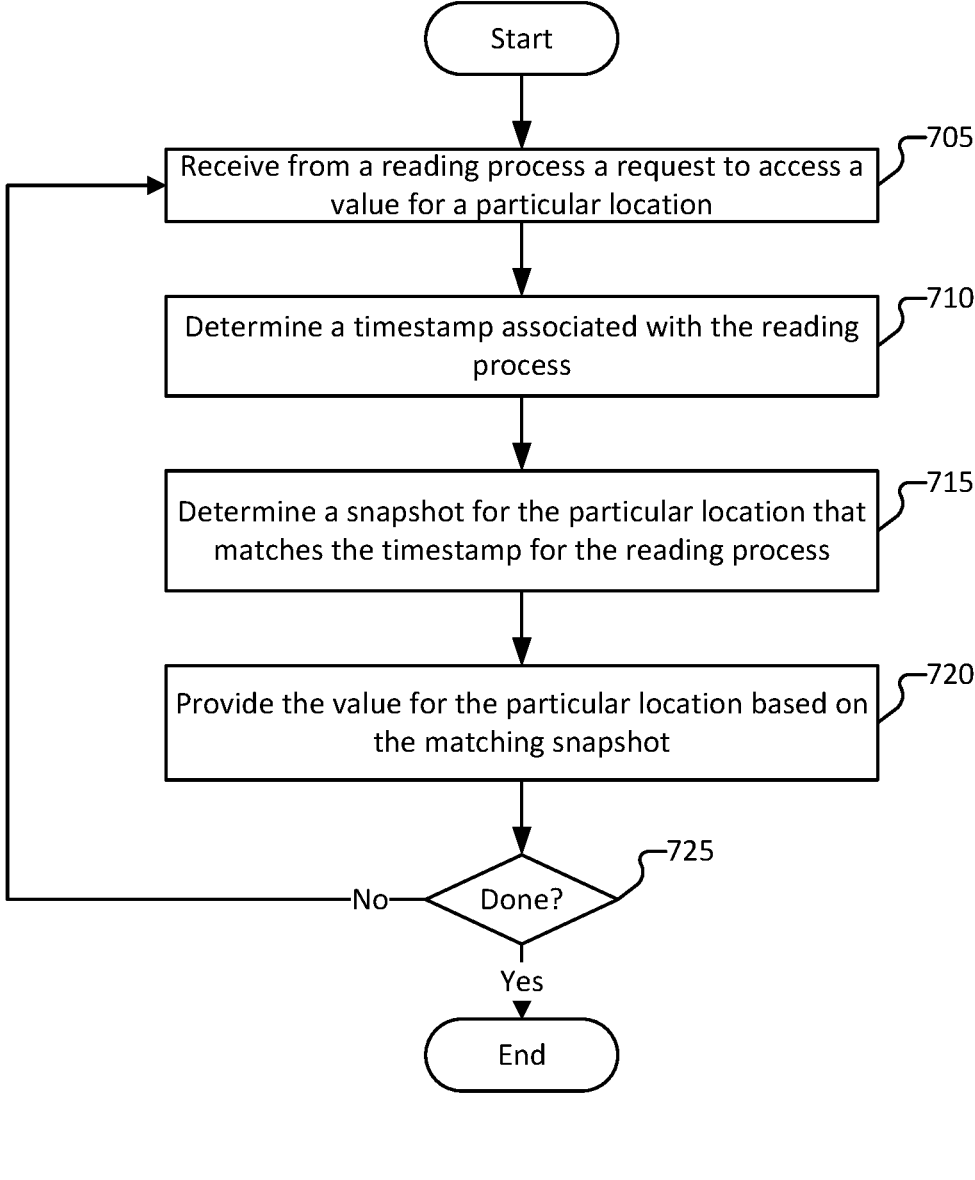
FIG. 7 is a flow diagram of a method for providing a value for a particular location to a reading process according to various embodiments of the present application.

FIG. 7 is a flow diagram of a method for providing a value for a particular location to a reading process according to various embodiments of the present application. In some embodiments, process 700 is implemented at least in part by system 100 of FIG. 1 and/or system 200 of FIG. 2.

At 705, the system receives from a reading process a request to access a value for a particular location in the hypercube.

At 710, the system determines a timestamp associated with the reading process.

At 715, the system determines a snapshot for the particular location that matches the timestamp for the reading process. In some embodiments, the system determines whether a computed snapshot matches the timestamp first and then if no computed snapshot matches, then determines whether an input snapshot matches the timestamp second.

At 720, the system provides the value for the particular location based on the matching snapshot.

At 725, a determination is made as to whether process 700 is complete. In some embodiments, process 700 is determined to be complete in response to a determination that no further values in the hypercube are to be obtained, no further reading processes exist, no further snapshots are to be captured, a value has been returned to a reading process for a request for a value at a particular location in the hypercube, a snapshot matching a particular reading process has been determined/returned, a user has exited the system, an administrator indicates that process 700 is to be paused or stopped, etc. In response to a determination that process 700 is complete, process 700 ends. In response to a determination that process 700 is not complete, process 700 returns to 705.

Figure 8:
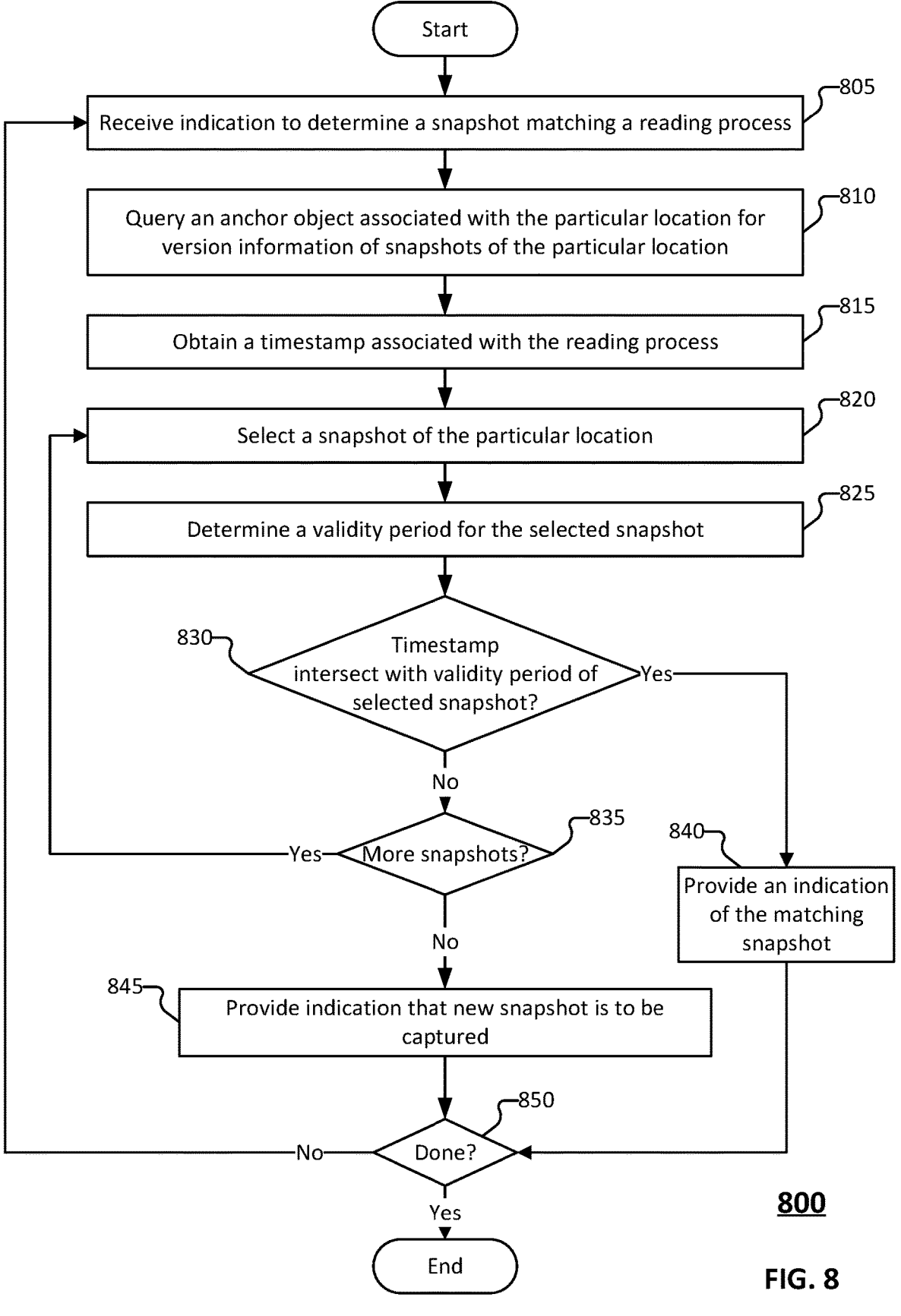
FIG. 8 is a flow diagram of a method for determining a snapshot matching a reading process according to various embodiments of the present application.

FIG. 8 is a flow diagram of a method for determining a snapshot matching a reading process according to various embodiments of the present application. In some embodiments, process 800 is implemented at least in part by system 100 of FIG. 1 and/or system 200 of FIG. 2.

At 805, the system receives an indication to determine a snapshot matching a reading process.

At 810, the system queries an anchor object associated with the particular location for version information of snapshots associated with the particular location.

At 815, the system obtains a timestamp associated with the reading process.

At 820, the system selects a snapshot associated with the particular location. In some embodiments, the system determines whether a computed snapshot matches the timestamp first and then if no computed snapshot matches, then determines whether an input snapshot matches the timestamp second.

At 825, the system determines a validity period for the selected snapshot.

At 830, the system determines whether the timestamp for the reading process intersects with the validity period for the selected snapshot. In some embodiments, the system determines whether a computed snapshot matches the timestamp first and then if no computed snapshot matches, then determines whether an input snapshot matches the timestamp second.

In response to determining that the timestamp for the reading process does not intersect with the validity period for the selected snapshot, process 800 proceeds to 835. Conversely, in response to determining that the timestamp for the reading process intersects with the validity period for the selected snapshot, process 800 proceeds to 840.

At 835, the system determines whether more snapshots are to be analyzed. For example, the system determines whether other snapshots associated with the particular location are stored and to be assessed for an intersection with the timestamp. In response to determining that more snapshots are to be analyzed at 835, process 800 returns to 820 and process iterates over 820-835 until no further snapshots are to be analyzed. Conversely, in response to determining that no further snapshots are to be analyzed at 835, process 800 proceeds to 845.

At 840, the system provides an indication of the matching snapshot. In some embodiments, the system provides the indication of the matching snapshot to the system, service, or process that invoked process 800. The system may provide the indication of the matching snapshot to the reading process.

At 845, the system provides an indication that a new snapshot is to be captured. For example, the system provides an indication that no captured snapshots match the reading process. In some embodiments, the system provides the indication of the matching snapshot to the system, service, or process that invoked process 800. The indication that a new snapshot is to be captured may be used to invoke a process to capture a snapshot for the particular location, such as by invoking process 900.

Here it is implied that if no matching snapshot was found that a new snapshot is created. In some embodiments, this is a nuanced issue:

1. When dealing with pure input accounts (user entered values), a matching snap MUST be found if one exists. If there is no match, then the system is querying from a time before the creation of this anchor (location) and hence null is returned and interpreted as an EMPTY value. In some embodiments, NO SNAPSHOT IS CREATED/CAPTURED in this scenario.

2. When dealing with pure formula accounts, it is possible there is no matching snapshot. And YES, in some embodiments, a snapshot WILL be created/CAPTURED in this case but it is a multi step process:

A. Start with the root of the formula tree. Recursively descend down and evaluate all the terms B. Propagate the term values up the tree until a final value is computed at the root. During this step, the system also accumulates the snapshot time range intersection C. Create a result snapshot for this formula location with snapshot range=the intersection computed in previous steps, values=the values computed up the tree.

At 850, a determination is made as to whether process 800 is complete. In some embodiments, process 800 is determined to be complete in response to a determination that no further values in the hypercube are to be obtained, no further reading processes exist, no further snapshots are to be captured, a value has been returned to a reading process for a request associated with the snapshot, a snapshot matching a particular reading process has been determined/returned, a user has exited the system, an administrator indicates that process 800 is to be paused or stopped, etc. In response to a determination that process 800 is complete, process 800 ends. In response to a determination that process 800 is not complete, process 800 returns to 805.

FIG. 9 is a flow diagram of a method for creating a snapshot for a value at a particular location of a hypercube according to various embodiments of the present application. In some embodiments, process 900 is implemented at least in part by system 100 of FIG. 1 and/or system 200 of FIG. 2.

At 905, the system obtains an indication to create a snapshot for a particular location in a hypercube. For example, the system obtains an indication to create a snapshot for a particular location in a hypercube where the location corresponds to where a user has entered an input account such as saving values on a sheet. At 910, the system obtains a current value for the particular location. At 915, the system stores a current value in a snapshot. In some embodiments, a new snapshot is created with a new copy of the object pointer stored in the most recent prior snapshot. At 920, the system updates an anchor object for the particular location to include version information and a pointer to the snapshot. In some embodiments, the system updates the anchor object to include the snapshot (or a reference/pointer to the snapshot) in the snapshot chain for the particular location. At 925, the system updates the end time of the most recent prior snapshot. For example, the most recent prior snapshot is updated to have its end time set to the transaction.commit number associated with the creation of the snapshot. At 930, the system provides an indication that a snapshot for the particular location has been created. In some embodiments, the system provides the indication of that the snapshot is captured to the system, service, or process that invoked process 900. The system may also return a value associated with the captured snapshot, such as to a reading process that requested the value for the particular location. At 935, a determination is made as to whether process 900 is complete. In some embodiments, process 900 is determined to be complete in response to a determination that no further values in the hypercube are to be obtained, no further reading processes exist, no further snapshots are to be captured, a value has been returned to a reading process for a request associated with the snapshot, a user has exited the system, an administrator indicates that process 900 is to be paused or stopped, etc. In response to a determination that process 900 is complete, process 900 ends. In response to a determination that process 900 is not complete, process 900 returns to 905.

In some embodiments, the process of this flow diagram typically applies to user initiated modifications of input accounts (such as sheet saves). For example, a user opens a sheet, modifies fact values at specific time slots of an input account. Another example, a user opens a configurable model sheet, inserts rows, deletes rows or updates rows (e.g driver columns of a row). In both examples, a new snapshot is created.

Figure 10A:
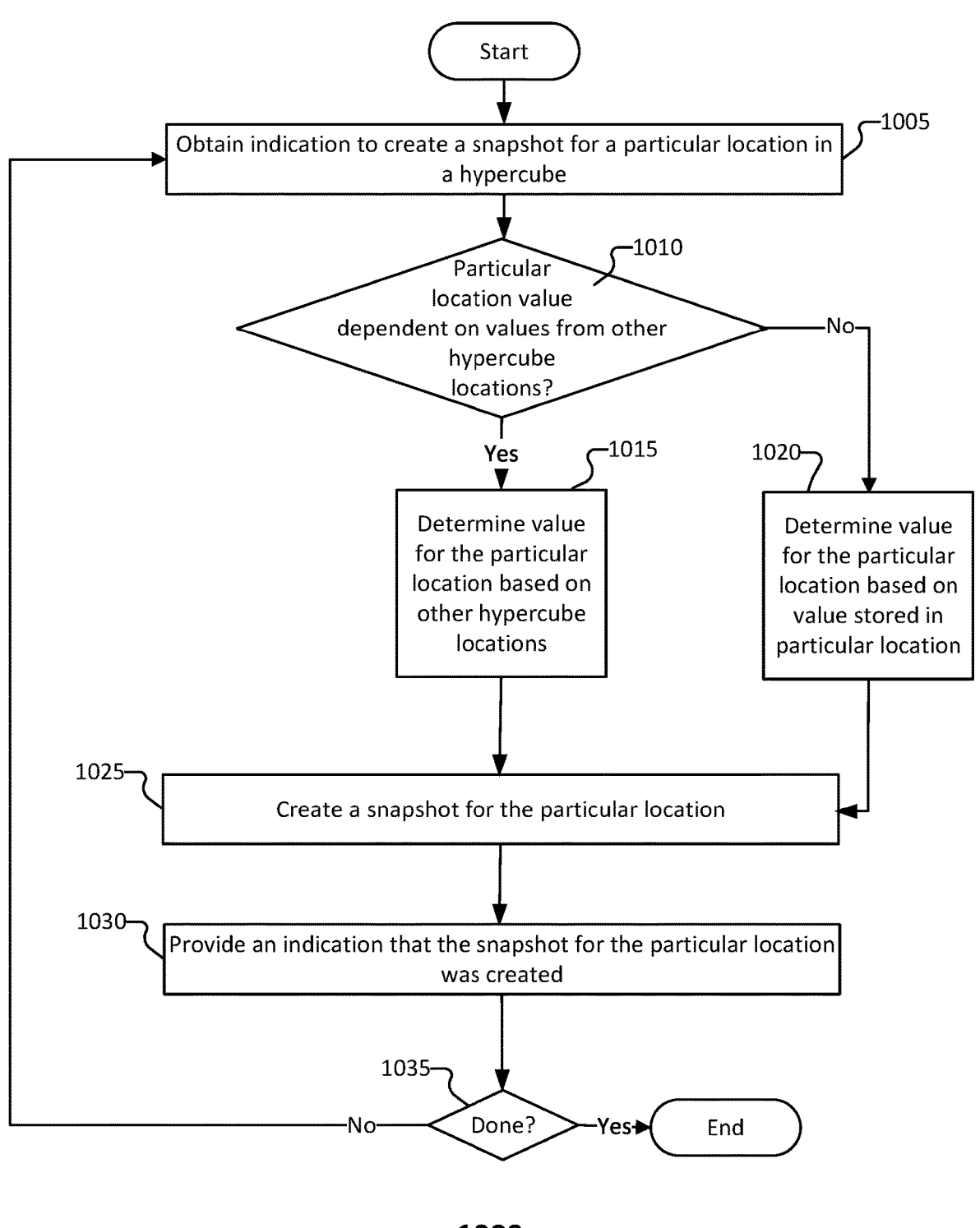
FIG. 10A is a flow diagram of a method for creating a snapshot for a value at a particular location of a hypercube according to various embodiments of the present application including when the location corresponds to a derived value which is computed from the evaluation of a formula (dependent terms).

FIG. 10A is a flow diagram of a method for creating a snapshot for a value at a particular location of a hypercube according to various embodiments of the present application including when the location corresponds to a derived value which is computed from the evaluation of a formula (dependent terms). In some embodiments, process 1000 is implemented at least in part by system 100 of FIG. 1 and/or system 200 of FIG. 2.

At 1005, the system obtains an indication to create a snapshot for a particular location in a hypercube. For example, the system receives an indication to create a snapshot for a particular location in a hypercube. At 1010, the system determines whether the particular location value is dependent on values from other hypercube locations. In response to determining that the particular location value is not dependent on other hypercube locations, control passes to 1020. At 1020, the value of the particular location is determined based on the value stored in the particular location. Conversely, in response to determining that the particular location value is dependent on a plurality of hypercube locations, control passes to 1015. At 1015, the value for the particular location is determined based on other hypercube locations.

At 1025, a snapshot is created for the particular location. In some embodiments, creation of a new snapshot includes copying a snapshot pointer to the anchor object associated with the particular location of the hypercube and setting the time range as to the validity of the snapshot as the intersection of bounds of the values that the particular location is dependent on. In some embodiments, the result of the formula evaluation is populated into the pointer value (object) stored in the snapshot.

At 1030, an indication is provided that the snapshot for the particular location was created.

At 1035, a determination is made as to whether process 1000 is complete. In some embodiments, process 1000 is determined to be complete in response to a determination that no further values in the hypercube are to be obtained, no further reading processes exist, no further snapshots are to be captured, a value has been returned to a reading process for a request associated with the snapshot, a user has exited the system, an administrator indicates that process 1000 is to be paused or stopped, etc. In response to a determination that process 1000 is complete, process 1000 ends. In response to a determination that process 1000 is not complete, process 1000 returns to 1005.

At 1035, the system determines whether additional dependent values are to be obtained or for which validity periods are to be determined. In response to determining that an additional dependent value(s) is to be obtained or for which the validity period(s) is to be determined, process 1000 returns to 1020 and process 1000 iterates over 1020-1035 until no further dependent values are to be obtained. In response to determining that no further dependent values are to be obtained, process 1040 proceeds to 1040.

FIG. 10B is a flow diagram of a method for determining a value at a particular location of a hypercube according to various embodiments of the present application when the location corresponds to a derived value which is computed from the evaluation of a formula with dependent terms. In some embodiments, process 1060 is implemented at least in part by system 100 of FIG. 1 and/or system 200 of FIG. 2. In some embodiments, the process of FIG. 10B is used to implement 1015 of FIG. 10A

In the example shown, at 1065 the particular location is received. At 1070, a value is selected that the particular location is dependent on and the value is noted. At 1075, a validity period is determined for the selected value. In 1080, it determined whether there are more values on which the particular location is dependent. In response to there being more values on which the particular location is dependent, control passes to 1070. In response to there not being more values on which the particular location is dependent, control passes to 1085. At 1085, an intersection of validity is determined for the dependent values. In 1090, the system determines the value at the particular location by evaluating the formula at the particular location, creates a snapshot with the new value, and correspondingly updates an anchor object for the particular location to include version information and a pointer to the created snapshot. The system stores the result of evaluating the formula as the created snapshot in a memory and stores the corresponding version information in the anchor object for the particular location. At 1095, the value for the particular location is provided. For example, the pointer is provided to an invoking process, the value is provided to an invoking process, or any other appropriate manner of providing the value or indication of the value.

In some embodiments, the dependent value is itself the result of evaluation of a formula (e.g., the location referenced by the formula for the particular location itself comprises a location). The system iteratively obtains the values on which the dependent value further depends and determines a validity period for the dependent value based on an intersection of the validity periods on the values on which the dependent value depends. The system may iteratively resolve the dependencies and determine the validity period for a particular location based at least in part on an intersection of all values on which the formula at the particular location directly or indirectly depends.

Figure 11:
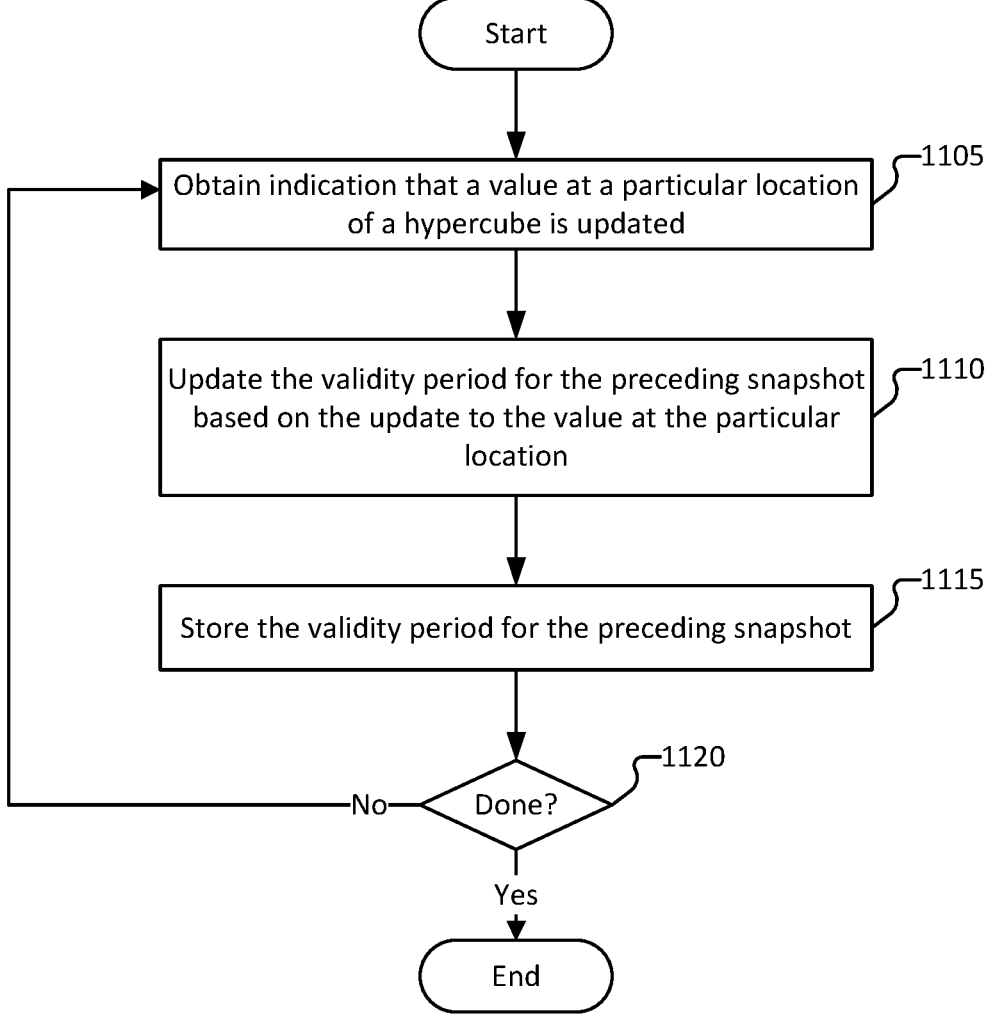
FIG. 11 is a flow diagram of a method for updating a snapshot validity period based on an update to the hypercube according to various embodiments of the present application.

FIG. 11 is a flow diagram of a method for updating a snapshot validity period based on an update to the hypercube according to various embodiments of the present application. In some embodiments, process 1100 is implemented at least in part by system 100 of FIG. 1 and/or system 200 of FIG. 2. In some embodiments, the process of FIG. 11 is used for invalidating computed snapshots in the input computed chain of a leaf account.

Given a formula account or a user-formula in an input account, when a report needs the value, the account is evaluated at the specified locations, and the result is cached in the version cache, so that the result can be reused later. However, the cached value is subject to invalidation when any of the input object values (e.g., accounts, locations, etc.) that contribute to the result are modified so as to produce a different value. In some embodiments, the system maintains dependencies between input value objects (e.g., accounts) and formula accounts across multiple levels of recursion and ensures that a modification to an input value object at a location that affects a formula account at that or any other location results in an invalidation to the formula account at that upstream location.

Consider F=F1+F2 where F1=A+B and F2=C. In this case, modification to leaf account C ensures that any previously computed and cached values in the version cache for account F2 and account F which depends on F2 are invalidated. Invalidation in this context entails the act of marking the values/facts with a special status that indicates to readers that the values must be recomputed.

At 1105, the system obtains an indication that a value at a particular location of a hypercube is updated.

At 1110, the system updates the validity period for the preceding snapshot based at least in prat on the update to the value at the particular location. The preceding snapshot may have an end time that is indefinite/infinite, which may be used to indicate that the snapshot remains valid for all reading processes with a timestamp after the start date of such snapshot. Upon updating of the value at the particular location, the system determines that the most recent snapshot is no longer valid and correspondingly updates the end time for the validity period to correspond to the time at which the value at the particular location was updated.

In some embodiments, the process of FIG. 11 is covering pure input accounts for which user modifies values on a sheet, for which a preceding snapshot is terminated.

In some embodiments, the process of FIG. 11 is covering input computed chains for accounts containing a mix of input values and user entered formulas. In this case, there is an input chain and a computed chain, for which a preceding snapshot is terminated in the input chain. However, in the computed chain the system finds ALL snapshots with end time=INF and invalidates them. Note that the invalidation can take two different branches depending on whether there are active readers. If there are active readers, the system will terminate the end time of the current snapshot at transaction commit number. If there are no active readers, the system will invalidate the location directly by marking all values as UNRESOLVED.

Figure 12:
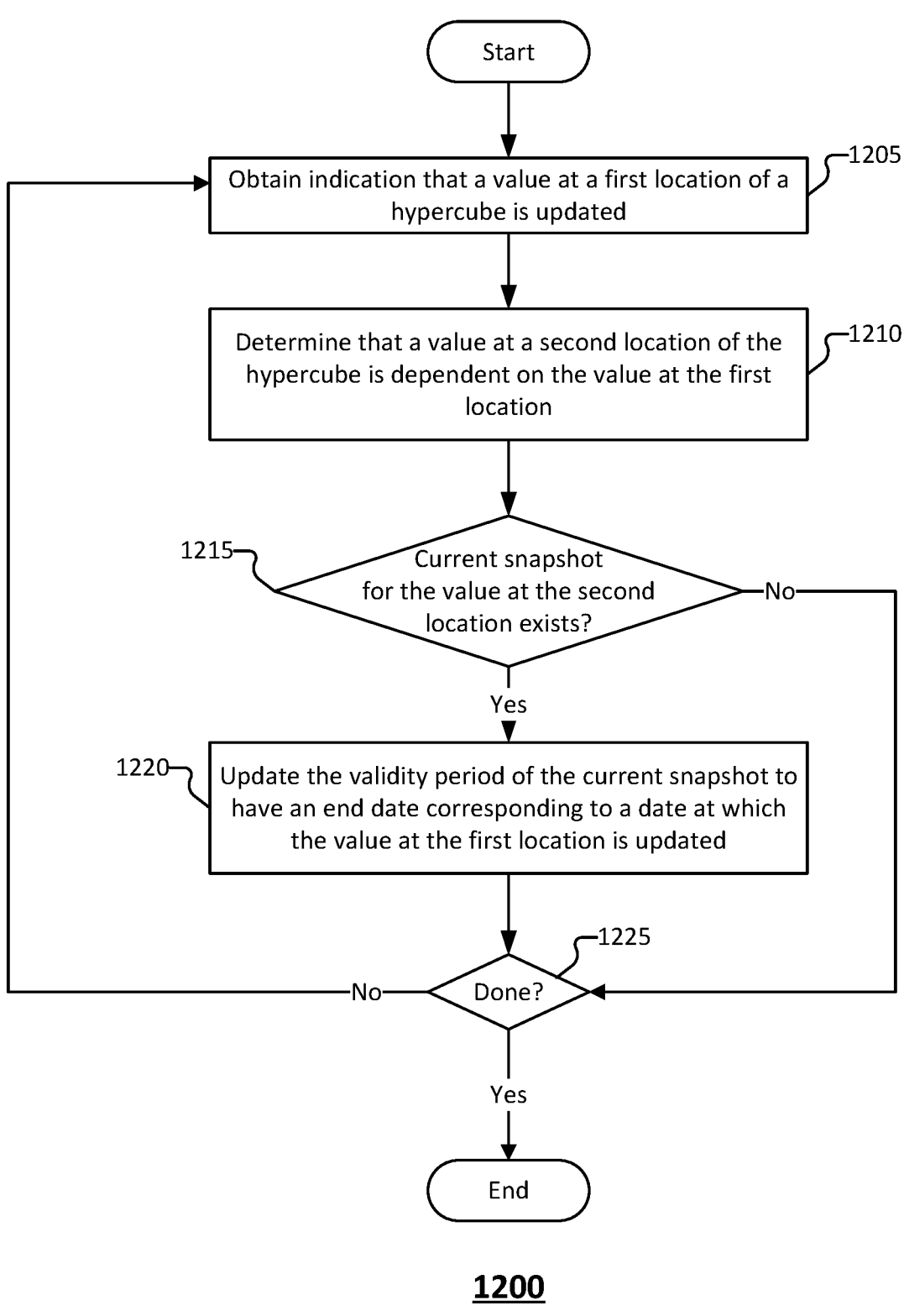
FIG. 12 is a flow diagram of a method for updating a snapshot validity period based on an update to the hypercube according to various embodiments of the present application.

In some embodiments, for pure formula accounts, the system uses the process of FIG. 12.

At 1115, the system stores the validity period for the preceding snapshot. For example, the system updates and stores the validity period in the anchor object (e.g., in association with the element in the snapshot chain corresponding to the preceding snapshot).

At 1120, a determination is made as to whether process 1100 is complete. In some embodiments, process 1100 is determined to be complete in response to a determination that no further values in the hypercube have been updated, no further updates to the hypercube are to be propagated to validity periods of corresponding anchor objects, a user has exited the system, an administrator indicates that process 1100 is to be paused or stopped, etc. In response to a determination that process 1100 is complete, process 1100 ends. In response to a determination that process 1100 is not complete, process 1100 returns to 1105.

FIG. 12 is a flow diagram of a method for updating a snapshot validity period based on an update to the hypercube according to various embodiments of the present application. In some embodiments, process 1200 is implemented at least in part by system 100 of FIG. 1 and/or system 200 of FIG. 2. In some embodiments, the process of FIG. 12 is related to computed snapshot chain of formula accounts backed by formulas that refer to other accounts.

At 1205, the system obtains an indication that a value at a first location of a hypercube is updated. At 1210, the system determines that a value at a second location of the hypercube is dependent on the value at the first location. At 1212, it is determined whether there are any active readers. In response to there not being any active readers, control passes to 1230. At 1230, the current snapshot is invalidated by making all values in the object unusable or unreadable by readers, and control passes to 1225. In response to there being active readers, control passes to 1215. At 1215, the system determines whether a current snapshot for the value at the second location exists. For example, the system determines whether a snapshot that is still valid exists in the snapshot chain of the anchor object for the second location. In response to determining that a current snapshot for the value at the second location exists, process 1200 proceeds to 1220 at which the system updates the validity period of the current snapshot to have an end date corresponding to a data at which the value at the first location is updated. In some embodiments, in response to determining that a value at a location of the hypercube on which a value at the particular location depends is updated, the system determines to invalidate (or end the validity period) of any current snapshots (e.g., any snapshot that is valid at the time at which the value at the location is updated). The system may invalidate the snapshot based on terminating the validity period as of the time at which the value is updated. In response to determining that no current snapshot for the value at the second location exists, process 1200 proceeds to 1225. At 1225, a determination is made as to whether process 1200 is complete. In some embodiments, process 1200 is determined to be complete in response to a determination that no further values in the hypercube have been updated, no further updates to the hypercube are to be propagated to validity periods of corresponding anchor objects, a user has exited the system, an administrator indicates that process 1200 is to be paused or stopped, etc. In response to a determination that process 1200 is complete, process 1200 ends. In response to a determination that process 1200 is not complete, process 1200 returns to 1205.

Figure 13:
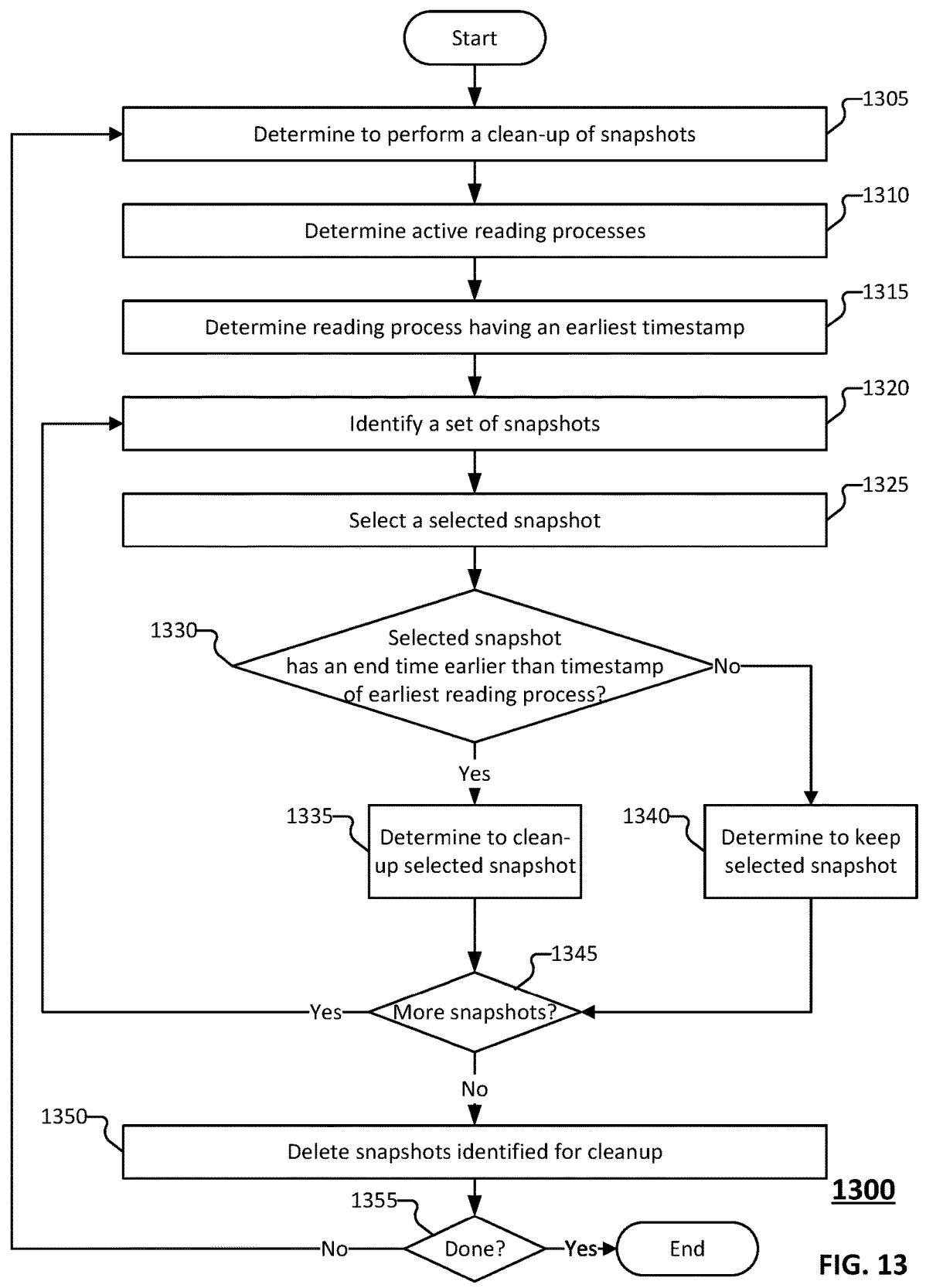
FIG. 13 is a flow diagram of a method for performing a cleanup of snapshots for a hypercube according to various embodiments of the present application.

FIG. 13 is a flow diagram of a method for performing a cleanup of snapshots for a hypercube according to various embodiments of the present application. In some embodiments, process 1300 is implemented at least in part by system 100 of FIG. 1 and/or system 200 of FIG. 2.

At 1305, the system determines to perform a cleanup of snapshots. The system may determine to perform a cleanup of snapshots for all locations at the hypercube. Alternatively, the system may determine to perform the cleanup of snapshots for a particular subset of one or more locations at the hypercube. For example, the system determines to perform a cleanup of snapshots for a particular location in the hypercube. The system may sequentially perform cleanups of snapshots across a plurality of locations of the hypercube.

At 1310, the system determines the active reading processes. For example, the system determines a set of all reading processes that currently exist.

At 1315, the system determines the reading process having an earliest timestamp. In some embodiments, the system determines the reading process, from the set of all active reading processes, for which an associated timestamp is the earliest date/time. The timestamp associated with a reading process may correspond to a time at which the reading process started or a time at which the reading process first initiated a read with respect to the hypercube.

At 1320, the system identifies a set of snapshots. For example, the system identifies a set of snapshots corresponding to a particular location.

At 1325, the system selects a selected snapshot. The selected snapshot is selected from the identified set of snapshots.

At 1330, the system determines whether the selected snapshot has an end time that is earlier than the timestamp associated with the earliest reading process.

In response to determining that the selected snapshot has an end time earlier than the timestamp associated with the earliest reading process, process 1300 proceeds to 1335. At 1335, the system determines to cleanup the selected snapshot.

In response to determining that the selected snapshot does not have an end time earlier than the timestamp associated with the earliest reading process, process 1300 proceeds to 1340. At 1340, the system determines to keep the selected snapshot. For example, the system determines that the selected snapshot may still be called upon/accessed by a reading process.

At 1345, the system determines whether another snapshot is to be analyzed. For example, the system determines whether to make the assessment of whether to cleanup another snapshot from the identified set of snapshots. The system may determine whether to analyze another snapshot based at least in part on one or more of: (i) a determination that further snapshots exist in the identified set of snapshots, (ii) an amount of time the current cleanup operation has been run, (iii) an amount of available memory (e.g., if sufficient memory has been cleared, the system may determine that no further cleanup is necessary at this time).

In some embodiments, the system determines whether another snapshot is to be analyzed based on a runtime of the cleanup process. For example, the system allocates a predefined amount of time for performing a cleanup operation and can terminate the cleanup operation upon the lapsing of the predefined amount of time.

In response to determining that another snapshot is to be analyzed, process 1300 returns to 1320 and process 1300 iterates over 1320 to 1345. Conversely in response to determining that no further snapshots are to be analyzed or cleaned up, process 1300 proceeds to 1350.

At 1350, the system deletes snapshots identified for cleanup.

At 1355, a determination is made as to whether process 1300 is complete. In some embodiments, process 1300 is determined to be complete in response to a determination that a cleanup operation has been completed, no further snapshots are to be cleaned up, a particular location has no further snapshots to be cleaned up (e.g., the corresponding anchor object does not have a corresponding snapshot chain), a predefined cleanup time has lapsed (e.g., a predefined time threshold permitted for the cleanup operation has lapsed since the beginning of a cleanup operation), an administrator indicates that process 1300 is to be paused or stopped, etc. In response to a determination that process 1300 is complete, process 1300 ends. In response to a determination that process 1300 is not complete, process 1300 returns to 1305.

Figure 14:
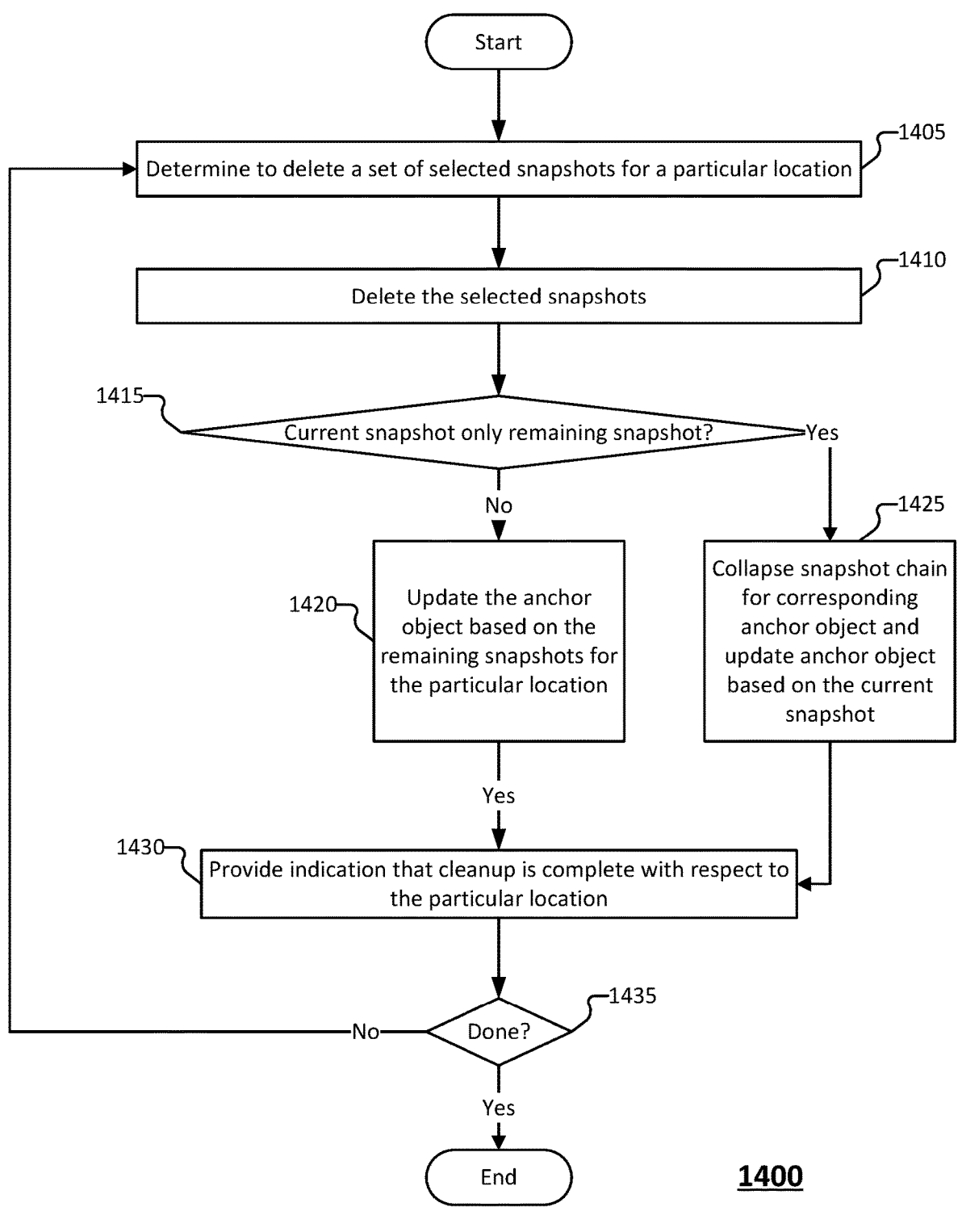
FIG. 14 for updating an anchor object for a particular location based on snapshots for the particular location being deleted as part of a cleanup according to various embodiments of the present application.

FIG. 14 for updating an anchor object for a particular location based on snapshots for the particular location being deleted as part of a cleanup according to various embodiments of the present application. In some embodiments, process 1400 is implemented at least in part by system 100 of FIG. 1 and/or system 200 of FIG. 2.

At 1405, the system determines to delete a set of selected snapshots for a particular location. At 1410, the system deletes the selected snapshots. At 1415, the system determines whether the current snapshot is the only remaining snapshot and the start time of the snapshot is less than or equal to readTime of all active readers. If there is a reader earlier than the start time of the snap, the system has to keep the snap around since this reader will be served with NULL. In response to determining that the current snapshot is the only remaining snapshot and further has the property that it is readable by all readers—for example, no reader with read time<=the startTime of the current snap exists, process 1400 proceeds to 1420. At 1420, the system updates the anchor object based on the remaining snapshot for the particular location. For example, the system updates the snapshot chain of the anchor object to remove the deleted/cleaned up snapshots, such as to ensure that the snapshot chain only comprises snapshots for active reading processes. In response to determining that the current snapshot is the only remaining snapshot and the start time of the snapshot is less than or equal to the readTime of all active readers, then process 1400 proceeds to 1425. At 1425, the system collapses the only remaining snapshot for the corresponding anchor object and updates the anchor object based on the current snapshot including nullifying the snapshot chain pointer stored in the anchor. For example, the system collapses the snapshot chain for the anchor object in order for the anchor object to only point to the snapshot (e.g., until another snapshot is captured for the location). In some embodiments, in response to a current snapshot being the only remaining snapshot and the current snapshot is readable by all readers, the system collapses the anchor object. At 1430, the system provides an indication that the cleanup operation is complete with respect to the particular location. At 1435, a determination is made as to whether process 1400 is complete. In some embodiments, process 1400 is determined to be complete in response to a determination that a cleanup operation has been completed, no further snapshots are to be cleaned up, a particular location has no further snapshots to be cleaned up (e.g., the corresponding anchor object does not have a corresponding snapshot chain), a predefined cleanup time has lapsed (e.g., a predefined time threshold permitted for the cleanup operation has lapsed since the beginning of a cleanup operation), an administrator indicates that process 1400 is to be paused or stopped, etc. In response to a determination that process 1400 is complete, process 1400 ends. In response to a determination that process 1400 is not complete, process 1400 returns to 1405.

Figure 15:
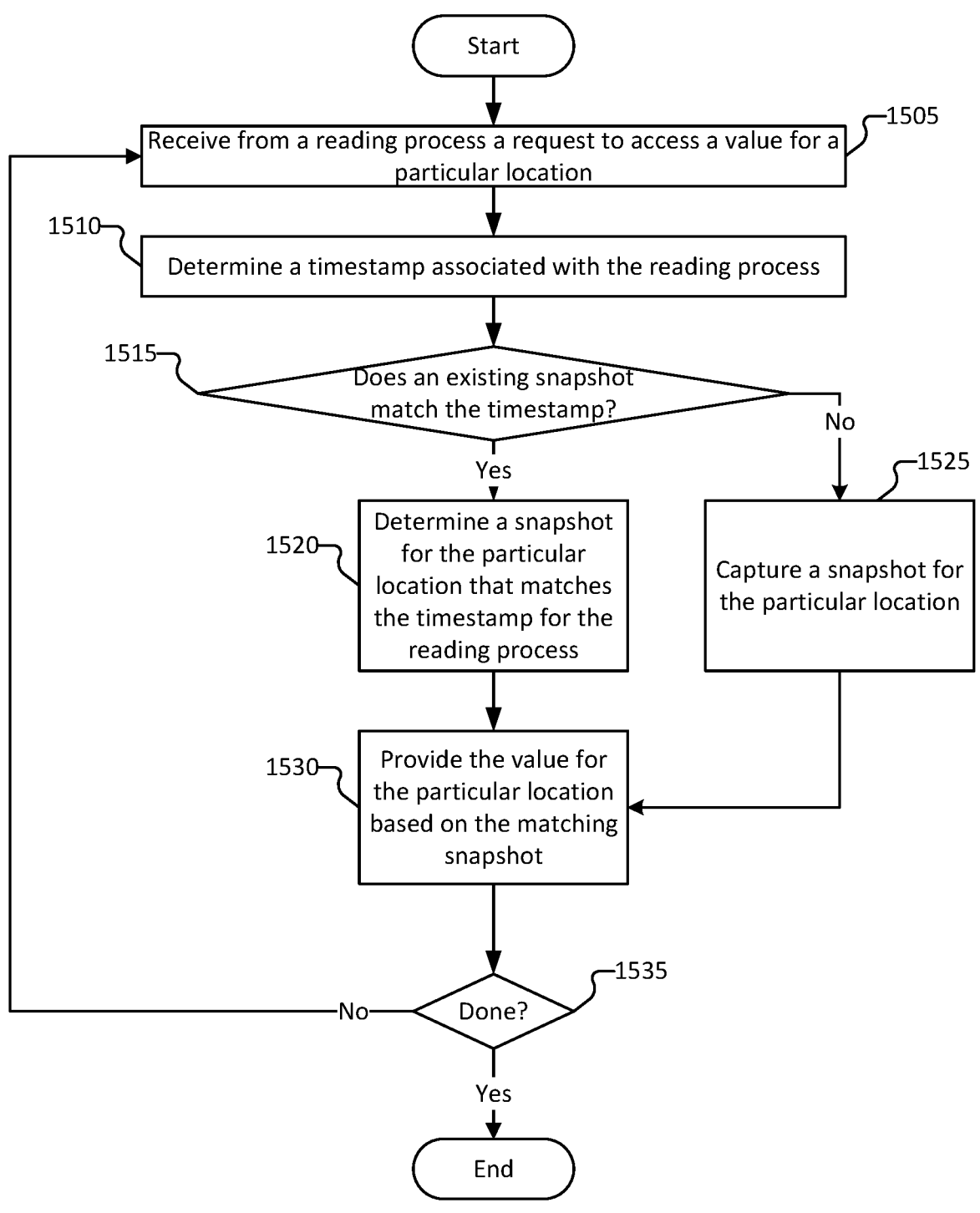
FIG. 15 is a flow diagram of a method for providing a value for a particular location to a reading process according to various embodiments of the present application.

FIG. 15 is a flow diagram of a method for providing a value for a particular location to a reading process according to various embodiments of the present application. In some embodiments, process 1500 is implemented at least in part by system 100 of FIG. 1 and/or system 200 of FIG. 2. In some embodiments, the process of FIG. 15 is used to cover the non-formula/pure input case. In this case, the system always finds a matching snapshot. If NO matching snap can be found it must be that the reader is earlier than the creation of the first snap (anchor object) and hence NULL is returned which is interpreted as an EMPTY value.

At 1505, the system receives from a reading process a request to access a value for a particular location. At 1510, the system determines at timestamp associated with the reading process. At 1515, the system determines whether an existing snapshot (e.g., for the particular location) matches the timestamp associated with the reading process. For example, the system determines whether the timestamp intersects with the validity period for any of the existing snapshots in the snapshot chain. In response to determining that an existing snapshot matches the timestamp, process 1500 proceeds to 1520 at which the system determines a snapshot for the particular location that matches the timestamp for the reading process. Conversely, in response to determining that no existing snapshot matching the timestamp exists, process 1500 proceeds to 1525. At 1525, the system returns a null, which is interpreted as an EMPTY value. At 1530, the system provides the value for the particular location based on the snapshot (e.g., the matching snapshot or the snapshot captured at 1525). The system may provide the value to a system, service, or process (e.g., the reading process) that requested to access the value for the particular location. At 1535, a determination is made as to whether process 1500 is complete. In some embodiments, process 1500 is determined to be complete in response to a determination that no further values are to be returned to a reading process(es), no further snapshots are to be captured, no further queries or requests are to be processed, no further reading processes exist, the user has exited the system, an administrator indicates that process 1500 is to be paused or stopped, etc. In response to a determination that process 1500 is complete, process 1500 ends. In response to a determination that process 1500 is not complete, process 1500 returns to 1505.

In some embodiments, for computed chains (containing formula values), if a matching snap is not found, it means formula values have not been evaluated for the given read time, so we will evaluate the formula and capture a new snapshot as shown in the next figure.

Figure 16:
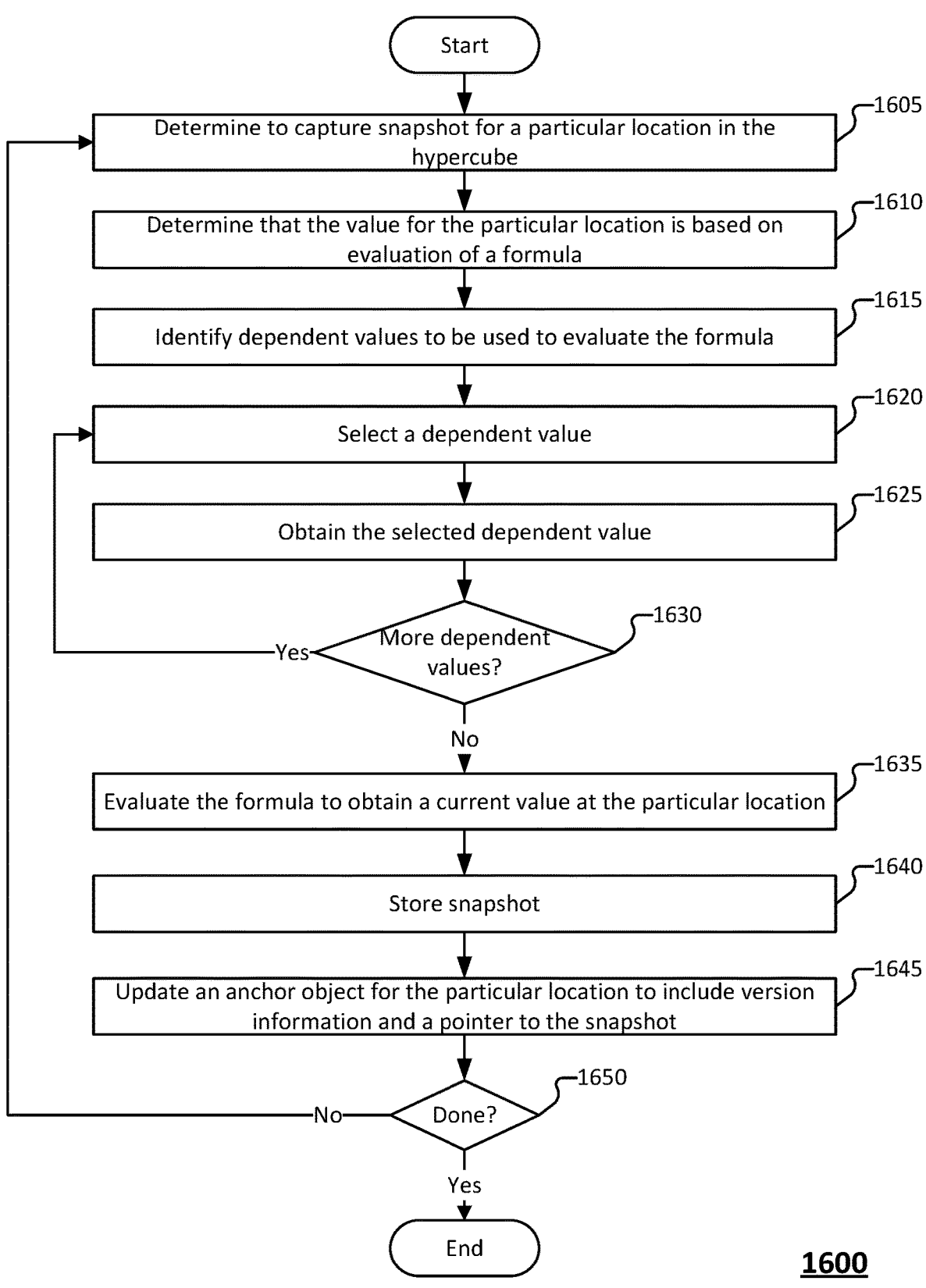
FIG. 16 is a flow diagram of a method for capturing a snapshot at a particular location comprising a formula to be evaluated according to various embodiments of the present application.

FIG. 16 is a flow diagram of a method for capturing a snapshot at a particular location comprising a formula to be evaluated according to various embodiments of the present application. In some embodiments, process 1600 is implemented at least in part by system 100 of FIG. 1 and/or system 200 of FIG. 2.

At 1605, the system determines to capture a snapshot for a particular location in the hypercube. At 1610, the system determines that the value for the particular location is based at least in part on an evaluation of a formula. For example, the system determines that the particular location in the hypercube comprises a formula. At 1615, the system evaluates the formula by identifying dependent values to be used to evaluate the formula. For example, the system identifies values on which the formula depends (e.g., inputs to the formula). The values may correspond to other locations in the hypercube and/or values computed based on values at other locations in the hypercube. At 1620, the system selects a dependent value. At 1625, the system calculates the selected dependent value. For example, the system determines the dependent values or if the dependent value is a result of a formula, the system evaluates the formula. For example, if the value at a first location is based on evaluation of a first formula that is dependent on a value at a second location and the value at the second location is further based on a second formula, the system may evaluate the second formula to obtain a result and use that result in connection with evaluating the first formula. In some embodiments, the value calculated is a value consistent with respect to the reader doing the calculation—for example, it is NOT always a current value—it can be a value in the PAST if the reader was a long running reader for example. At 1630, the system determines whether additional dependent values are to be obtained. For example, the system determines whether all the dependent values needed to evaluate the formula at the particular location have been obtained so that the formula may be evaluated. In response to determining that additional dependent values are to be obtained, process 1600 proceeds to 1620 and process 1600 iterates over 1620-1630 until no further dependent values are to be obtained. Conversely, in response to determining that no further dependent values are to be obtained, process 1600 proceeds to 1635. At 1635, the system evaluates the formula to obtain a current value at the particular location. At 1635, the system stores a snapshot. At 1640, the system creates a snapshot with a snapshot time range derived from the intersection of snapshot time ranges of all dependent values and stores the current value as a snapshot (e.g., in memory or in a snapshot database). At 1645, the system updates an anchor object to the particular location to include version information and a pointer to the snapshot. At 1650, a determination is made as to whether process 1600 is complete. In some embodiments, process 1600 is determined to be complete in response to a determination that no further snapshots are to be captured, no further queries or requests are to be processed, no further reading processes exist, the user has exited the system, an administrator indicates that process 1600 is to be paused or stopped, etc. In response to a determination that process 1600 is complete, process 1600 ends. In response to a determination that process 1600 is not complete, process 1600 returns to 1605.

FIG. 17 is a flow diagram of a method for updating an anchor object based on a request to obtain a value for a particular location comprising a formula to be evaluated according to various embodiments of the present application. In some embodiments, process 1700 is implemented at least in part by system 100 of FIG. 1 and/or system 200 of FIG. 2. In some embodiments, the process of FIG. 17 comprises a variation of the process of FIG. 16.

At 1705, the system obtains a hypercube comprising a plurality of locations. At 1710, the system receives a request to obtain a value for a first location. At 1715, the system determines that a value for the first location is based on an evaluation of a formula.

At 1720, the system evaluates the formula at the first location to obtain a result. At 1725, the system creates a snapshot and stores the result for the first location. At 1730, the system updates an anchor object for the first location to store a pointer to the result for the first location and associated version information. At 1735, a determination is made as to whether process 1700 is complete. In some embodiments, process 1700 is determined to be complete in response to a determination that no further queries or requests are to be processed, the value has been returned to a requesting reading process, no further formulas are to be evaluated, the user has exited the system, an administrator indicates that process 1700 is to be paused or stopped, etc. In response to a determination that process 1700 is complete, process 1700 ends. In response to a determination that process 1700 is not complete, process 1700 returns to 1705.

Figure 18:
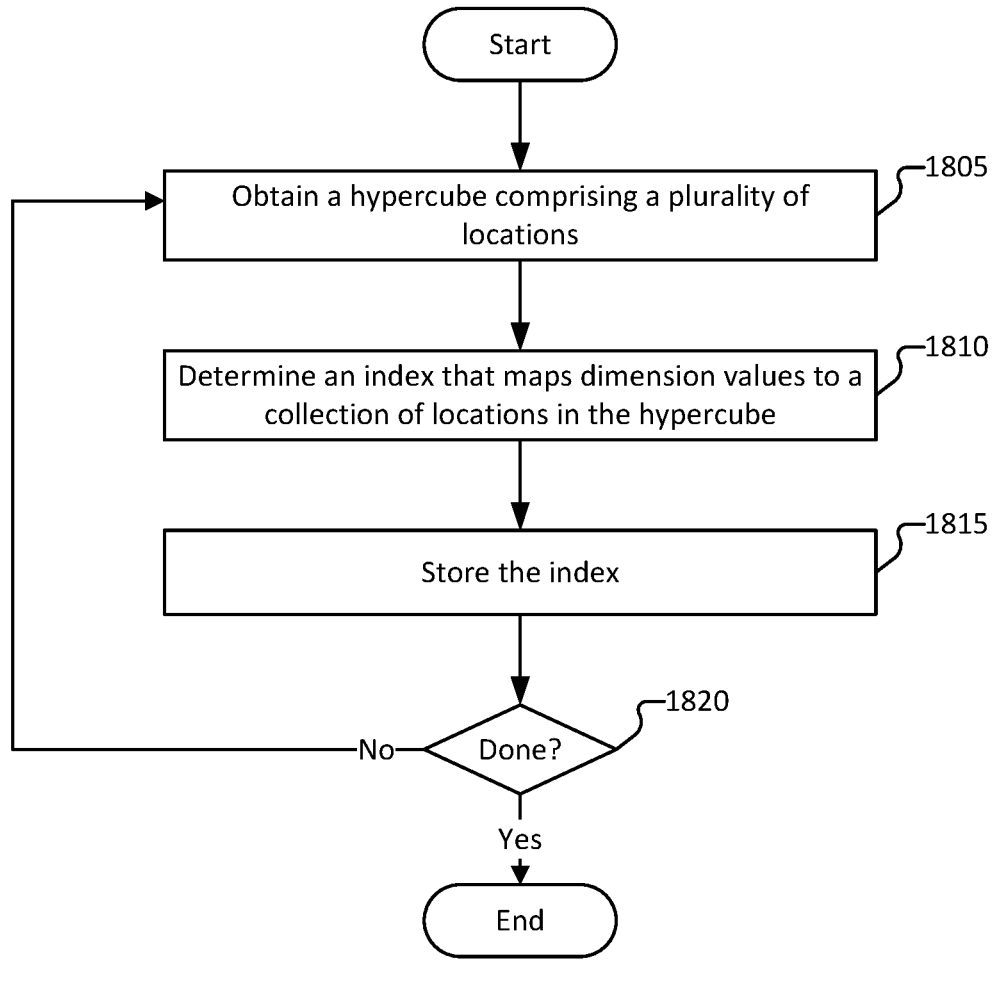
FIG. 18 is a flow diagram of a method for indexing a hypercube according to various embodiments of the present application.

FIG. 18 is a flow diagram of a method for indexing a hypercube according to various embodiments of the present application. In some embodiments, process 1800 is implemented at least in part by system 100 of FIG. 1 and/or system 200 of FIG. 2.

At 1805, the system obtains a hypercube comprising a plurality of locations. At 1810, the system determines an index that maps dimension values to a collection of locations in the hypercube. At 1815, the system stores the index. At 1820, a determination is made as to whether process 1800 is complete. In some embodiments, process 1800 is determined to be complete in response to a determination that no further indexes are to be determined or generated for a hypercube, the user has exited the system, an administrator indicates that process 1800 is to be paused or stopped, etc. In response to a determination that process 1800 is complete, process 1800 ends. In response to a determination that process 1800 is not complete, process 1800 returns to 1805.

Figure 19:
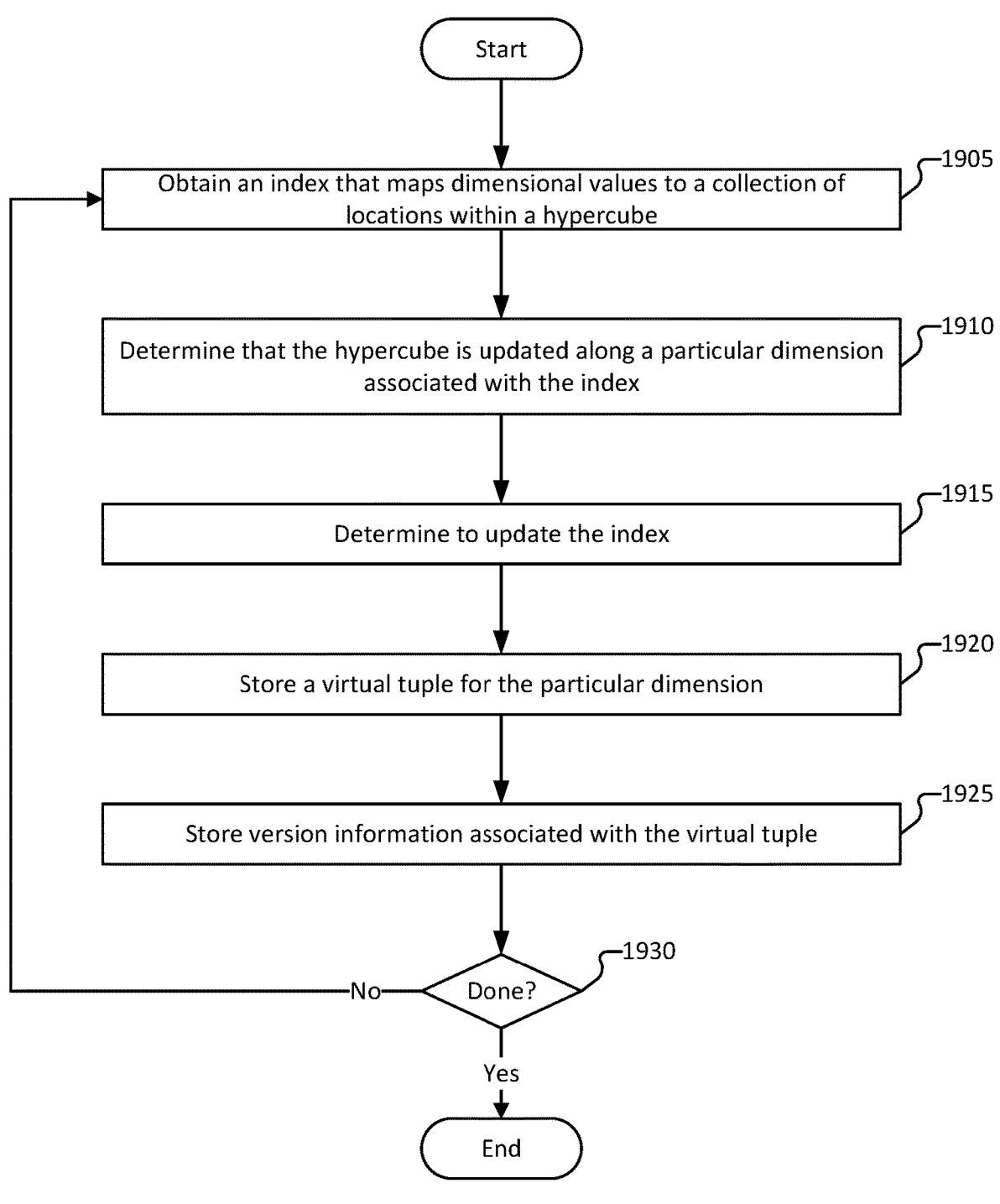
FIG. 19 is a flow diagram of a method for updating an index based at least in part on an update to the hypercube according to various embodiments of the present application.

FIG. 19 is a flow diagram of a method for updating an index based at least in part on an update to the hypercube according to various embodiments of the present application. In some embodiments, process 1900 is implemented at least in part by system 100 of FIG. 1 and/or system 200 of FIG. 2.

At 1905, the system obtains an index that maps dimensional values to a collection of locations within the hypercube. At 1910, the system determines that one or more tuples (rows) of the hypercube is/are updated so that a particular dimension value is changed. At 1915, the system creates a new virtual tuple for each updated row and updates the index to store a pointer to the new virtual tuple for a new particular dimension value, wherein the virtual tuple comprises a pointer to a tuple in the index and a version information for the tuple. For example, the system creates a new virtual tuple associated with the location that is updated corresponding to the new dimension value and a new validity range from (txn.commit_time. INF) and updates the index such that the set of tuples for the changed/new dimension value include the newly created virtual tuple. In some embodiments, the new validity range implicitly terminates the preceding virtual tuple end time from INF to txn.commit, and the virtual tuple is appended/added to the list of tuples associated with the new dimension value in the dimension index. At 1920, the system stores a virtual tuple for the updated row/tuple which snapshots the dimension value associated with the updated dimension. Note that virtual tuples are associated with a single container row of a configurable model. As such they are snapshots inside a snapshot chain which hangs off the container row and behave like snapshots of input accounts. At 1925, the system stores version information associated with the virtual tuple. At 1930, a determination is made as to whether process 1900 is complete. In some embodiments, process 1900 is determined to be complete in response to a determination that no further updates to the hypercube are to be processed, no further updates to an index for the hypercube is to be performed, the user has exited the system, an administrator indicates that process 1900 is to be paused or stopped, etc. In response to a determination that process 1900 is complete, process 1900 ends. In response to a determination that process 1900 is not complete, process 1900 returns to 1905.

Figure 20:
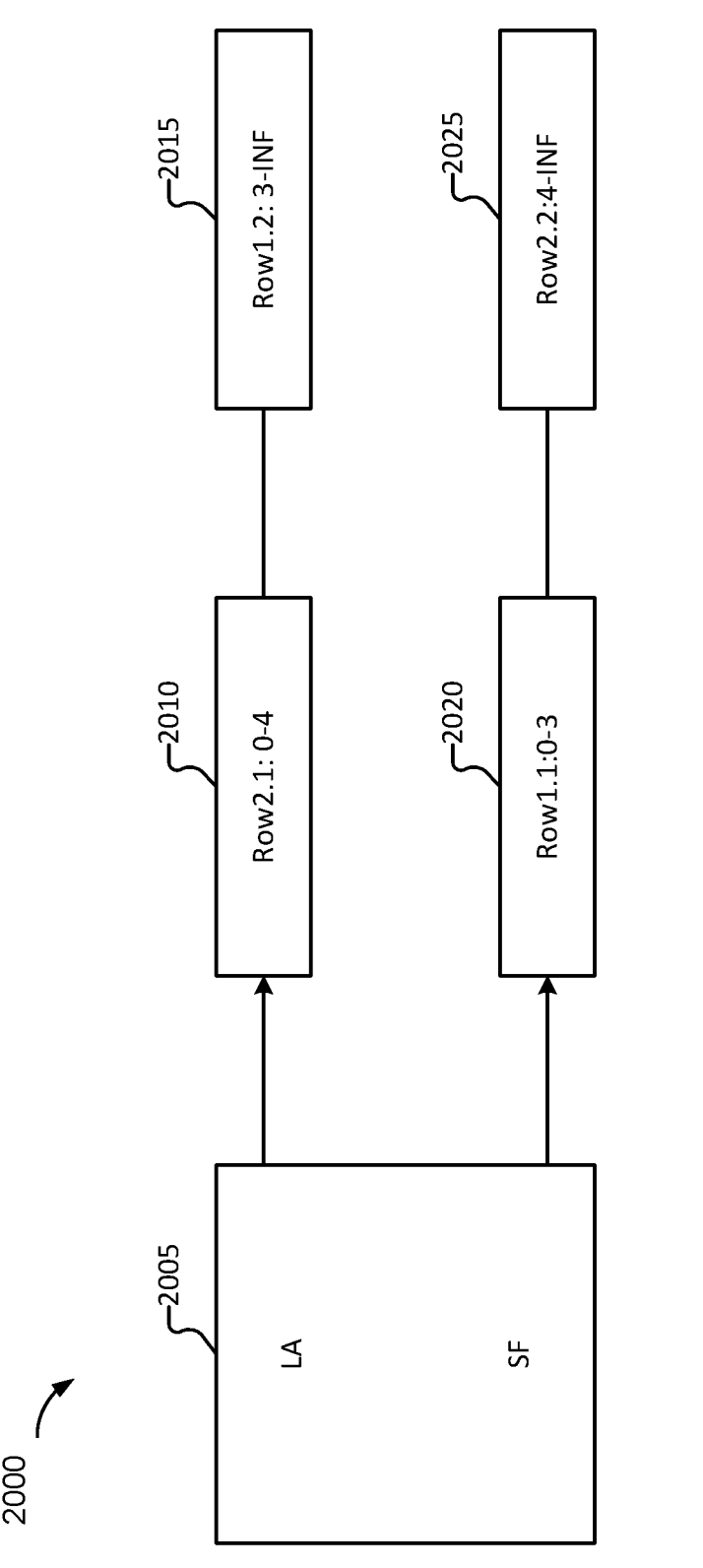
FIG. 20 illustrates an example of a virtual tuple according to various embodiments of the present application.

FIG. 20 illustrates an example of a virtual tuple according to various embodiments of the present application. In the example shown, tuple-space index 2000 comprises a set of tuples 2005 (e.g., a tuple for value "LA" and a tuple for value "SF"). The system creates virtual tuples for each tuple in the tuple-space index 2000 as the dimension value is changed to/from the value associated with the tuple. For example, in response to a lookup for the value "SF" in tuple-space index 2000, the system returns two virtual tuples: virtual tuple 2020 and virtual tuple 2025. As illustrated, virtual tuple 2020 corresponds to the period when row 1 has a value of "SF". As another example, in response to a lookup for the value "LA" in tuple-space index 2000, the system returns two virtual tuples: virtual tuple 2010 and virtual tuple 2015. As illustrated, virtual tuple 2010 corresponds to the period when row 2 has a value of "LA". In some embodiments, the virtual tuples have respective validity periods. For example, virtual tuple 2010 has a validity period of 0-4 and virtual tuple 2015 has a validity period of 3-INF. Similarly, virtual tuple 2020 has a validity period of 0-3 and virtual tuple 2025 has a validity period of 4-INF.

Figure 21:
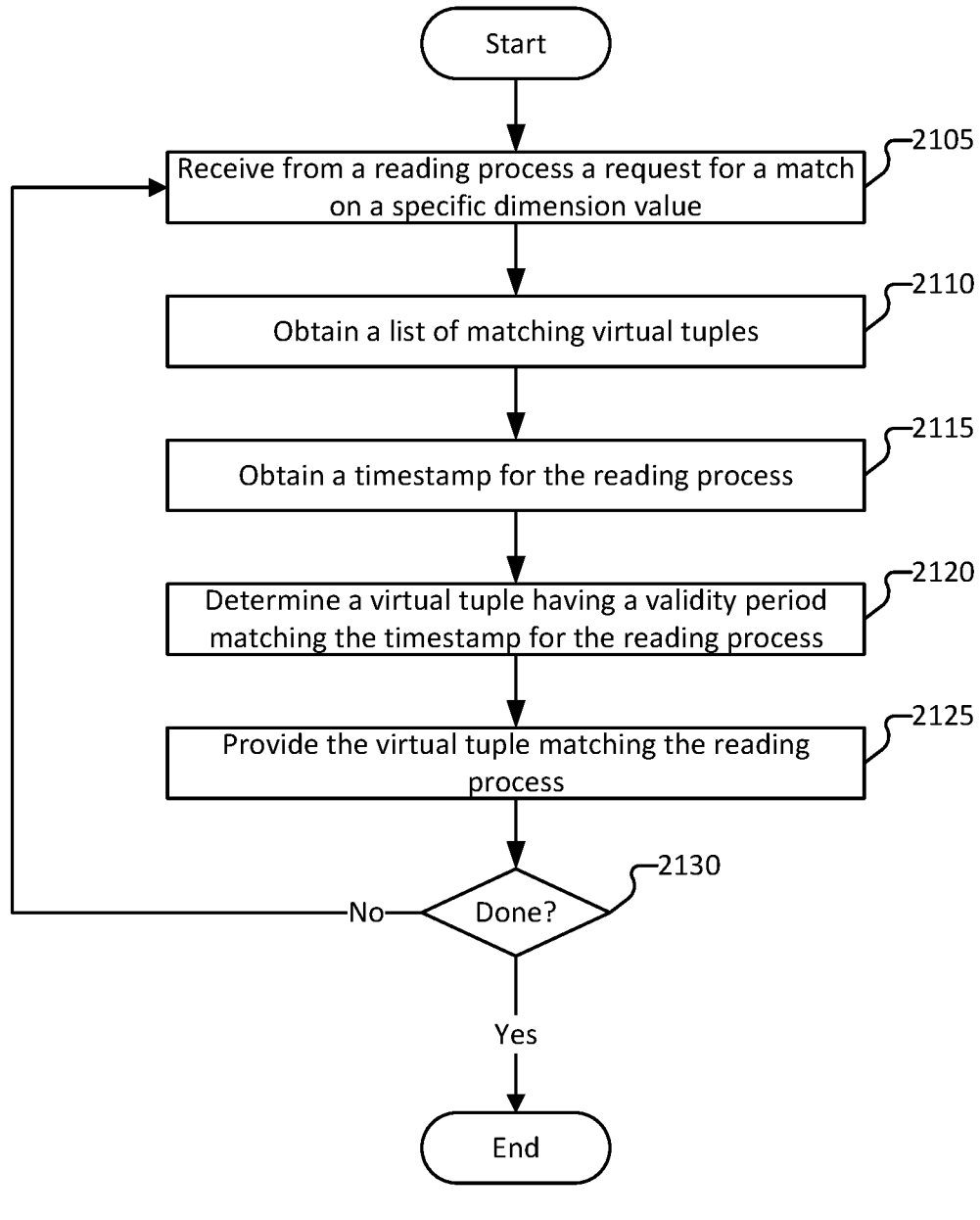
FIG. 21 is a flow diagram of a method for providing a reading process a match on a specific dimension value according to various embodiments of the present application.

FIG. 21 is a flow diagram of a method for providing a reading process a match on a specific dimension value according to various embodiments of the present application. In some embodiments, process 2100 is implemented at least in part by system 100 of FIG. 1 and/or system 200 of FIG. 2.

At 2105, the system receives from a reading process a request for a match on a specific dimension value. For example, the system receives a request for locations along a dimension indexed by an index that matches the particular dimension value. At 2110, the system obtains a list of matching virtual tuples. At 2115, the system obtains a timestamp for the reading process. At 2120, the system determines a virtual tuple having a validity period matching the timestamp for the reading process. In some embodiments, the system queries the index map of virtual tuples to determine a virtual tuple having a validity period with which the timestamp intersects. At 2125, the system provides the virtual tuple matching the reading process. In some embodiments, the system provides the virtual tuple to a system, method, or process that invoked process 2100. For example, the system returns the virtual tuple to the reading process that requested the match on the specific dimension value. At 2130, a determination is made as to whether process 2100 is complete. In some embodiments, process 2100 is determined to be complete in response to a determination that no further queries are to be processed, the response to the query has been successfully communicated, the user has exited the system, an administrator indicates that process 2100 is to be paused or stopped, etc. In response to a determination that process 2100 is complete, process 2100 ends. In response to a determination that process 2100 is not complete, process 2100 returns to 2105.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

obtain a hypercube comprising a plurality of locations, wherein each of the plurality of locations has a uniquely associated anchor object comprising a snapshot chain object that indexes a set of one or more snapshots for that location, wherein:

(i) each snapshot has an associated validity period defined by a start timestamp and an end timestamp;

(ii) each location in the hypercube corresponds to a coordinate tuple; and (iii) each anchor object is a data structure record comprising (a) a location identifier that uniquely identifies the corresponding coordinate for the location in the hypercube, (b) a snapshot-chain reference comprising at least one pointer to the snapshot chain object, and (c) version metadata for the location;

receive a request to store an updated value for the particular location; and store the updated value for the particular location of the hypercube, wherein storing the updated value comprises adding a snapshot corresponding to the updated value comprises adding a new snapshot corresponding to the updated value to the snapshot chain object in the anchor object for the location and setting the validity period for the new snapshot;

receive a request to obtain data from the hypercube with respect to a planning model;

determine a set of locations within the hypercube comprising data to be used in connection with providing a response to the request;

obtain the data for the set of locations based at least in part on a set of anchor objects for the set of locations by selecting, for each location, the snapshot from the corresponding anchor object's snapshot chain object having a validity period matching a timestamp associated with the request; and provide a response to the request based at least in part on the data for the set of locations; and a memory coupled to the processor and configured to provide the processor with instructions.

2. The system of claim 1, wherein the one or more snapshots for the particular location comprises a pointer to snapshot information for the particular location, and the snapshot information is associated with a corresponding validity period.

3. The system of claim 2, wherein the corresponding validity period comprises a start date and an end date.

4. The system of claim 3, wherein the start date for the snapshot information corresponding to the updated value stored for the particular location is a date at which the updated value is stored for the particular location.

5. The system of claim 4, wherein the end date for the snapshot information corresponding to the updated value stored for the particular location is set as a time at which a next update to a value for the particular location is modified or as an undefined period if the updated value is a most recent value for the particular location.

6. The system of claim 2, wherein the one or more processors are further configured to:

receive, from a reading process, a request to obtain a corresponding value for the particular location;

determine a timestamp associated with the reading process;

determine that a snapshot chain indexed in the anchor object for the particular location has as an associated snapshot having a validity period matching the timestamp; and in response to determining that the snapshot chain indexed in the anchor object for the particular location has the associated snapshot, obtain a value for the particular location based at least in part on the associated snapshot.

7. The system of claim 2, wherein the one or more processors are further configured to:

receive, from a reading process, a request to obtain a corresponding value for the particular location; and take a snapshot of a current value for the particular location and store the snapshot in the anchor object for the particular location.

8. The system of claim 2, wherein the one or more processors are further configured to:

receive, from a reading process, a request to obtain a corresponding value for the particular location;

determine a timestamp associated with the reading process;

determine that a snapshot chain indexed in the anchor object has as a snapshot having a validity period matching the timestamp; and in response to determining that the snapshot chain indexed in the anchor object has the snapshot matching the timestamp, provide a value for the particular location based at least in part on the snapshot matching the timestamp.

9. The system of claim 2, wherein the one or more processors are further configured to:

receive, from a reading process, a request to obtain a corresponding value for the particular location;

determine a timestamp associated with the reading process;

determine that a snapshot chain index in the anchor object for the particular location does not have a first snapshot having a validity period matching the timestamp; and capture a second snapshot of a value at the particular location in response to determining that the snapshot chain does not comprise the snapshot; and store the second snapshot for the particular location.

10. The system of claim 9, wherein the version information comprised in the anchor object is updated to include a validity period for the second snapshot.

11. The system of claim 9, wherein the validity period for the first snapshot is updated based at least in part on the second snapshot being captured.

12. The system of claim 1, wherein the version information comprises a snapshot chain object that indexes a set of snapshots for the particular location.

13. The system of claim 1, wherein the anchor object stores a set of pointers to a set of snapshots that form a history of changes of the value at the particular location over time.

14. The system of claim 1, wherein the anchor object is used for a location containing at least one of a defined alphanumeric value and a formula from which a derived value for the particular location is determined, and storing the value for a location comprising a formula entails the creation of a hybrid input-computed chain object which has separate inner chains for user entered values and for reader generated snapshots for derived values.

15. The system of claim 1, wherein the processor is further configured to search for a matching snapshot comprising (a) first searching a computed chain and in response to finding a matching snapshot, returning the matching snapshot, and (b) second, in the absence of a matching snapshot in the computed chain, searching an input chain, and in response to finding a matching snapshot in the input chain, evaluating a formula and adding a new snapshot in the computed chain.

16. The system of claim 1, wherein the anchor object for the particular location comprises a set of pointers for a set of snapshots stored in a snapshot database, and a cleanup operation is performed with respect to the set of snapshots.

17. The system of claim 16, wherein the cleanup operation includes removing a subset of the snapshots from snapshot database in response to a determination that a predefined criteria is satisfied.

18. The system of claim 17, wherein performing the cleanup operation comprises:

determining an earliest reading process among a set of current reading processes that read data stored in the hypercube;

determining the subset snapshots having a respective validity period that terminates before a timestamp associated with the earliest reading process; and removing the subset snapshots from the anchor object.

19. The system of claim 17, wherein the predefined criteria is a lapsing of a predefined time period since a last cleanup operation was performed with respect to the set of snapshots.

20. The system of claim 17, wherein the predefined criteria is an available memory being less than a predefined memory threshold.

21. The system of claim 17, wherein in response to removing the subset of snapshots the anchor object is updated to remove from a snapshot chain indexing snapshots for the particular location a subset of pointers to the subset of snapshots.

22. The system of claim 16, wherein the cleanup operation ensures that available snapshots are reclaimed within a fixed time interval and creates multiple threads until the time required to perform the cleanup operation falls within a predefined time.

23. The system of claim 16, wherein the cleanup operation packs each thread such that a thread gets an equal amount of work from each container.

24. The system of claim 1, wherein storing of a live snapshot in the anchor object is ensured via a remap.

25. The system of claim 1, wherein in response to a current snapshot being the only remaining snapshot and the current snapshot is readable by all readers, the processor is further configured to delete earlier snapshots stored in the anchor object.

26. A method, comprising:

obtaining, by one or more processors, a hypercube comprising a plurality of locations, wherein each of the plurality of locations has a uniquely associated anchor object comprising a snapshot chain object that indexes a set of one or more snapshots for that location, wherein:

(i) each snapshot has an associated validity period defined by a start timestamp and an end timestamp;

(ii) each location in the hypercube corresponds to a coordinate tuple; and (iii) each anchor object is a data structure record comprising (a) a location identifier that uniquely identifies the corresponding location in the hypercube, (b) a snapshot-chain reference comprising at least one pointer to the snapshot chain object, and (c) version metadata for the location;

receiving, by the one or more processors, a request to store an updated value for the particular location;

storing, by the one or more processors, the updated value for the particular location of the hypercube, wherein storing the updated value comprises adding a snapshot corresponding to the updated value comprises adding a new snapshot corresponding to the updated value to the snapshot chain object in the anchor object for the location and setting the validity period for the new snapshot;

receiving, by the one or more processors, a request to obtain data from the hypercube with respect to a planning model;

determining, by the one or more processors, a set of locations within the hypercube comprising data to be used in connection with providing a response to the request;

obtaining, by the one or more processors, the data for the set of locations based at least in part on a set of anchor objects for the set of locations by selecting, for each location, the snapshot from the corresponding anchor object's snapshot chain object having a validity period matching a timestamp associated with the request; and providing, by the one or more processors, a response to the request based at least in part on the data for the set of locations.

27. A computer program product embodied in a non-transitory computer readable medium and comprising computer instructions for:

obtaining a hypercube comprising a plurality of locations, wherein each of the plurality of locations has a uniquely associated anchor object comprising a snapshot chain object that indexes a set of one or more snapshots for that location, wherein:

(i) each snapshot has an associated validity period defined by a start timestamp and an end timestamp;

(ii) each location in the hypercube corresponds to a coordinate tuple; and (iii) each anchor object is a data structure record comprising (a) a location identifier that uniquely identifies the corresponding location in the hyper-cube, (b) a snapshot-chain reference comprising at least one pointer to the snapshot chain object, and (c) version metadata for the location;

receiving a request to store an updated value for the particular location; and storing the updated value for the particular location of the hypercube, wherein storing the updated value comprises adding a snapshot corresponding to the updated value comprises adding a new snapshot corresponding to the updated value to the snapshot chain object in the anchor object for the location and setting the validity period for the new snapshot;

receiving a request to obtain data from the hypercube with respect to a planning model;

determining a set of locations within the hypercube comprising data to be used in connection with providing a response to the request;

obtaining the data for the set of locations based at least in part on a set of anchor objects for the set of locations by selecting, for each location, the snapshot from the corresponding anchor object's snapshot chain object having a validity period matching a timestamp associated with the request; and providing a response to the request based at least in part on the data for the set of locations.

28. The system of claim 1, wherein for locations comprising a derived value generated from a formula, the anchor object comprises separate input and snapshot chains, and the system selects between the snapshot chains based on whether a requested timestamp matches an input value change or a computed value change.

* * * * *